US012791322B2

(12) United States Patent
Kivila et al.

(10) Patent No.: US 12,791,322 B2
(45) Date of Patent: Nov. 10, 2026

(54) TECHNIQUES AND USER INTERFACES FOR PROVIDING NAVIGATION ASSISTANCE

(71) Applicant: Apple Inc., Cupertino, CA (US)

(72) Inventors: Arto Kivila, Santa Clara, CA (US); Brendan J. Till, San Jose, CA (US); Matthew J. Allen, Menlo Park, CA (US); Tommaso Novi, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 56 days.

(21) Appl. No.: 18/896,680

(22) Filed: Sep. 25, 2024

(65) Prior Publication Data

US 2025/0109945 A1 Apr. 3, 2025

Related U.S. Application Data

(60) Provisional application No. 63/587,108, filed on Sep. 30, 2023, provisional application No. 63/541,810, filed on Sep. 30, 2023, provisional application No. 63/541,821, filed on Sep. 30, 2023.

(51) Int. Cl.

| | |
|---|---|
| ***G01C 21/20*** | (2006.01) |
| ***G01C 21/00*** | (2006.01) |
| ***G06F 3/04847*** | (2022.01) |

(52) U.S. Cl.
CPC ......... *G01C 21/20* (2013.01); *G01C 21/3856* (2020.08); *G06F 3/04847* (2013.01)

(58) Field of Classification Search
CPC .. G01C 21/20; G01C 21/3856; G06F 3/04847
See application file for complete search history.

(56) References Cited

U.S. PATENT DOCUMENTS

| | | | |
|---|---|---|---|
| 6,323,846 | B1 | 11/2001 | Westerman et al. |
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |

(Continued)

FOREIGN PATENT DOCUMENTS

| | | | |
|---|---|---|---|
| CN | 116954534 | A | 10/2023 |
| DE | 102015212652 | A1 | 1/2017 |

(Continued)

OTHER PUBLICATIONS

International Patent Application No. PCT/US2024/049121; Invitation to Pay Add'l Fees; dated Dec. 18, 2024; 17 pages.

(Continued)

*Primary Examiner* — Ramsey Refai
(74) *Attorney, Agent, or Firm* — BAKERHOSTETLER LLP; Kyle B. Morse

(57) ABSTRACT

The present disclosure generally relates user interfaces and techniques for providing navigation assistance in accordance with some embodiments, such as configuring a moveable computer system, selectively modifying a movement component of a moveable computer system based on a current mode, providing feedback based on an orientation of a movable computer system, and/or redirecting a movable computer system.

45 Claims, 15 Drawing Sheets

(56) References Cited

U.S. PATENT DOCUMENTS

| | | | |
|---|---|---|---|
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,348,458 | B2 | 5/2016 | Hotelling et al. |
| 9,933,937 | B2 | 4/2018 | Lemay et al. |
| 10,303,257 | B2 | 5/2019 | Hillis et al. |
| 11,275,405 | B2 | 3/2022 | Hotelling |
| 2002/0015024 | A1 | 2/2002 | Westerman et al. |
| 2005/0190059 | A1 | 9/2005 | Wehrenberg |
| 2006/0017692 | A1 | 1/2006 | Wehrenberg et al. |
| 2006/0033724 | A1 | 2/2006 | Chaudhri et al. |
| 2012/0143496 | A1 | 6/2012 | Chitre et al. |
| 2014/0309924 | A1 | 10/2014 | Varoglu et al. |
| 2016/0007158 | A1 | 1/2016 | Venkatraman et al. |
| 2016/0132030 | A1 | 5/2016 | Marti et al. |
| 2016/0170494 | A1* | 6/2016 | Bonnet ................. G06F 3/0416 345/173 |
| 2016/0231718 | A1 | 8/2016 | Logan et al. |
| 2017/0164293 | A1 | 6/2017 | Hwang |
| 2018/0088887 | A1 | 3/2018 | LeBlanc et al. |
| 2018/0374002 | A1 | 12/2018 | Li |
| 2019/0180485 | A1 | 6/2019 | Kim et al. |
| 2020/0124428 | A1* | 4/2020 | Hamilton ............... G06Q 10/02 |
| 2021/0284159 | A1 | 9/2021 | Koike et al. |
| 2021/0380137 | A1 | 12/2021 | Domeyer et al. |
| 2022/0066405 | A1 | 3/2022 | Harvey |
| 2022/0084374 | A1 | 3/2022 | Dour et al. |
| 2022/0238083 | A1 | 7/2022 | Sasayama et al. |
| 2023/0118074 | A1 | 4/2023 | Park et al. |
| 2023/0174062 | A1 | 6/2023 | Eswaran |
| 2025/0013683 | A1* | 1/2025 | Granieri ................ G06F 16/338 |

FOREIGN PATENT DOCUMENTS

| | | | |
|---|---|---|---|
| WO | WO 2013/169849 | A2 | 11/2013 |
| WO | WO 2014/105276 | A1 | 7/2014 |

OTHER PUBLICATIONS

International Patent Application No. PCT/US2024/040128; Invitation to Pay Add'l Fees; dated Dec. 19, 2024; 10 pages.

International Patent Application No. PCT/US2024/049096; Invitation to Pay Add's Fees; dated Jan. 20, 2025; 16 pages.

U.S. Appl. No. 60/936,562, filed Jun. 20, 2007, Lemay et al.

International Patent Application No. PCT/US2024/040128; Int'l Search Report and the Written Opinion; dated Feb. 10, 2025; 17 pages.

International Patent Application No. PCT/US2024/049121; Int'l Search Report and the Written Opinion; dated Feb. 13, 2025; 24 pages.

International Patent Application No. PCT/US2023/033559; Int'l Search Report and the Written Opinion; dated Feb. 12, 2024; 22 pages.

International Patent Application No. PCT/US2024/049096; Int'l Search Report and the Written Opinion; dated Mar. 13, 2025; 23 pages.

Meschtscherjakov et al.; "Bubble Margin: Motion Sickness Prevention While Reading on Smartphones in Vehicles"; Human—Computer Interaction—2019; 18 pages.

International Patent Application No. PCT/US2025/011891; Invitation to Pay Add'l Fees; dated Apr. 22, 2025; 14 pages.

International Patent Application No. PCT/US2025/014962; Invitation to Pay Add'I Fees; dated May 28, 2025; 11 pages.

International Patent Application No. PCT/US2023/033558; Invitation to Pay Add'I Fees; dated Jan. 19, 2024; 11 pages.

International Patent Application No. PCT/US2023/033558; Int'l Search Report and the Written Opinion; dated Mar. 13, 2024; 18 pages.

International Patent Application No. PCT/US2025/011891; Int'l Search Report and the Written Opinion; dated Jun. 13, 2025; 21 pages.

International Patent Application No. PCT/US2025/014962; Int'l Search Report and the Written Opinion; dated Jul. 21, 2025; 19 pages.

* cited by examiner

TECHNIQUES AND USER INTERFACES FOR PROVIDING NAVIGATION ASSISTANCE

CROSS-REFERENCE TO RELATED APPLICATIONS

The present application claims priority to 63/587,108, entitled "TECHNIQUES AND USER INTERFACES FOR PROVIDING NAVIGATION ASSISTANCE," filed Sep. 30, 2023, to 63/541,810 entitled "TECHNIQUES FOR CONFIGURING NAVIGATION OF A DEVICE," filed Sep. 30, 2023, and to 63/541,821 entitled "USER INPUT FOR INTERACTING WITH DIFFERENT MAP DATA," filed Sep. 30, 2023, which are hereby incorporated by reference in their entireties for all purposes.

BACKGROUND

Computer systems sometimes provide users with navigation assistance. Such assistance can assist a user in navigating to a target destination.

SUMMARY

Some techniques for providing navigation assistance, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides computer systems with faster, more efficient methods and interfaces for providing navigation assistance. Such methods and interfaces optionally complement or replace other methods for providing navigation assistance. Such methods and interfaces reduce the cognitive burden on a user and produce a more efficient human-machine interface. For battery-operated computing devices, such methods and interfaces conserve power and increase the time between battery charges.

In some embodiments, a method that is performed at a computer system that is in communication with a first movement component and a second movement component different from the first movement component is described. In some embodiments, the method comprises: while detecting a target location in a physical environment, detecting an event with respect to the target location; and in response to detecting the event and in accordance with a determination that a first set of one or more criteria is satisfied, configuring one or more angles of one or more movement components, wherein, after configuring the one or more angles of the one or more movement components in response to detecting the event and in accordance with the determination that the first set of one or more criteria is satisfied: an angle of the first movement component is configured to be controlled in an automatic manner; and an angle of the second movement component is configured to be controlled in a manual manner different from the automatic manner.

In some embodiments, a non-transitory computer-readable storage medium storing one or more programs configured to be executed by one or more processors of a computer system that is in communication with a first movement component and a second movement component different from the first movement component is described. In some embodiments, the one or more programs includes instructions for: while detecting a target location in a physical environment, detecting an event with respect to the target location; and in response to detecting the event and in accordance with a determination that a first set of one or more criteria is satisfied, configuring one or more angles of one or more movement components, wherein, after configuring the one or more angles of the one or more movement components in response to detecting the event and in accordance with the determination that the first set of one or more criteria is satisfied: an angle of the first movement component is configured to be controlled in an automatic manner; and an angle of the second movement component is configured to be controlled in a manual manner different from the automatic manner.

In some embodiments, a transitory computer-readable storage medium storing one or more programs configured to be executed by one or more processors of a computer system that is in communication with a first movement component and a second movement component different from the first movement component is described. In some embodiments, the one or more programs includes instructions for: while detecting a target location in a physical environment, detecting an event with respect to the target location; and in response to detecting the event and in accordance with a determination that a first set of one or more criteria is satisfied, configuring one or more angles of one or more movement components, wherein, after configuring the one or more angles of the one or more movement components in response to detecting the event and in accordance with the determination that the first set of one or more criteria is satisfied: an angle of the first movement component is configured to be controlled in an automatic manner; and an angle of the second movement component is configured to be controlled in a manual manner different from the automatic manner.

In some embodiments, a computer system that is in communication with a first movement component and a second movement component different from the first movement component is described. In some embodiments, the computer system comprises one or more processors and memory storing one or more programs configured to be executed by the one or more processors. In some embodiments, the one or more programs includes instructions for: while detecting a target location in a physical environment, detecting an event with respect to the target location; and in response to detecting the event and in accordance with a determination that a first set of one or more criteria is satisfied, configuring one or more angles of one or more movement components, wherein, after configuring the one or more angles of the one or more movement components in response to detecting the event and in accordance with the determination that the first set of one or more criteria is satisfied: an angle of the first movement component is configured to be controlled in an automatic manner; and an angle of the second movement component is configured to be controlled in a manual manner different from the automatic manner.

In some embodiments, a computer system that is in communication with a first movement component and a second movement component different from the first movement component is described. In some embodiments, the computer system comprises means for performing each of the following steps: while detecting a target location in a physical environment, detecting an event with respect to the target location; and in response to detecting the event and in accordance with a determination that a first set of one or more criteria is satisfied, configuring one or more angles of one or more movement components, wherein, after configuring the one or more angles of the one or more movement components in response to detecting the event and in accordance with the determination that the first set of one or more criteria is satisfied: an angle of the first movement component is configured to be controlled in an automatic manner; and an angle of the second movement component is configured to be controlled in a manual manner different from the automatic manner.

In some embodiments, a computer program product is described. In some embodiments, the computer program product comprises one or more programs configured to be executed by one or more processors of a computer system that is in communication with a first movement component and a second movement component different from the first movement component. In some embodiments, the one or more programs include instructions for: while detecting a target location in a physical environment, detecting an event with respect to the target location; and in response to detecting the event and in accordance with a determination that a first set of one or more criteria is satisfied, configuring one or more angles of one or more movement components, wherein, after configuring the one or more angles of the one or more movement components in response to detecting the event and in accordance with the determination that the first set of one or more criteria is satisfied: an angle of the first movement component is configured to be controlled in an automatic manner; and an angle of the second movement component is configured to be controlled in a manual manner different from the automatic manner.

In some embodiments, a method that is performed at a computer system that is in communication with a first movement component and a second movement component different from the first movement component is described. In some embodiments, the method comprises: detecting a target location in a physical environment; and while detecting the target location in the physical environment: in accordance with a determination that a first set of one or more criteria is satisfied, wherein the first set of one or more criteria includes a criterion that is satisfied when the computer system is operating in a first mode: automatically modifying the first movement component; and forgoing automatically modifying the second movement component; in accordance with a determination that a second set of one or more criteria is satisfied, wherein the second set of one or more criteria includes a criterion that is satisfied when the computer system is operating in a second mode different from the first mode, automatically modifying the first movement component and the second movement component, wherein the second set of one or more criteria is different from the first set of one or more criteria; and in accordance with a determination that a third set of one or more criteria is satisfied, wherein the third set of one or more criteria includes a criterion that is satisfied when the computer system is operating in a third mode different from the second mode and the first mode, forgoing automatically modifying the first movement component and the second movement component, wherein the third set of one or more criteria is different from the first set of one or more criteria and the second set of one or more criteria.

In some embodiments, a non-transitory computer-readable storage medium storing one or more programs configured to be executed by one or more processors of a computer system that is in communication with a first movement component and a second movement component different from the first movement component is described. In some embodiments, the one or more programs includes instructions for: detecting a target location in a physical environment; and while detecting the target location in the physical environment: in accordance with a determination that a first set of one or more criteria is satisfied, wherein the first set of one or more criteria includes a criterion that is satisfied when the computer system is operating in a first mode: automatically modifying the first movement component; and forgoing automatically modifying the second movement component; in accordance with a determination that a second set of one or more criteria is satisfied, wherein the second set of one or more criteria includes a criterion that is satisfied when the computer system is operating in a second mode different from the first mode, automatically modifying the first movement component and the second movement component, wherein the second set of one or more criteria is different from the first set of one or more criteria; and in accordance with a determination that a third set of one or more criteria is satisfied, wherein the third set of one or more criteria includes a criterion that is satisfied when the computer system is operating in a third mode different from the second mode and the first mode, forgoing automatically modifying the first movement component and the second movement component, wherein the third set of one or more criteria is different from the first set of one or more criteria and the second set of one or more criteria.

In some embodiments, a transitory computer-readable storage medium storing one or more programs configured to be executed by one or more processors of a computer system that is in communication with a first movement component and a second movement component different from the first movement component is described. In some embodiments, the one or more programs includes instructions for: detecting a target location in a physical environment; and while detecting the target location in the physical environment: in accordance with a determination that a first set of one or more criteria is satisfied, wherein the first set of one or more criteria includes a criterion that is satisfied when the computer system is operating in a first mode: automatically modifying the first movement component; and forgoing automatically modifying the second movement component; in accordance with a determination that a second set of one or more criteria is satisfied, wherein the second set of one or more criteria includes a criterion that is satisfied when the computer system is operating in a second mode different from the first mode, automatically modifying the first movement component and the second movement component, wherein the second set of one or more criteria is different from the first set of one or more criteria; and in accordance with a determination that a third set of one or more criteria is satisfied, wherein the third set of one or more criteria includes a criterion that is satisfied when the computer system is operating in a third mode different from the second mode and the first mode, forgoing automatically modifying the first movement component and the second movement component, wherein the third set of one or more criteria is different from the first set of one or more criteria and the second set of one or more criteria.

In some embodiments, a computer system that is in communication with a first movement component and a second movement component different from the first movement component is described. In some embodiments, the computer system comprises one or more processors and memory storing one or more programs configured to be executed by the one or more processors. In some embodiments, the one or more programs includes instructions for: detecting a target location in a physical environment; and while detecting the target location in the physical environment: in accordance with a determination that a first set of one or more criteria is satisfied, wherein the first set of one or more criteria includes a criterion that is satisfied when the computer system is operating in a first mode: automatically modifying the first movement component; and forgoing automatically modifying the second movement component; in accordance with a determination that a second set of one or more criteria is satisfied, wherein the second set of one or more criteria includes a criterion that is satisfied when the computer system is operating in a second mode different from the first mode, automatically modifying the first movement component and the second movement component, wherein the second set of one or more criteria is different from the first set of one or more criteria; and in accordance with a determination that a third set of one or more criteria is satisfied, wherein the third set of one or more criteria includes a criterion that is satisfied when the computer system is operating in a third mode different from the second mode and the first mode, forgoing automatically modifying the first movement component and the second movement component, wherein the third set of one or more criteria is different from the first set of one or more criteria and the second set of one or more criteria.

In some embodiments, a computer system that is in communication with a first movement component and a second movement component different from the first movement component is described. In some embodiments, the computer system comprises means for performing each of the following steps: detecting a target location in a physical environment; and while detecting the target location in the physical environment: in accordance with a determination that a first set of one or more criteria is satisfied, wherein the first set of one or more criteria includes a criterion that is satisfied when the computer system is operating in a first mode: automatically modifying the first movement component; and forgoing automatically modifying the second movement component; in accordance with a determination that a second set of one or more criteria is satisfied, wherein the second set of one or more criteria includes a criterion that is satisfied when the computer system is operating in a second mode different from the first mode, automatically modifying the first movement component and the second movement component, wherein the second set of one or more criteria is different from the first set of one or more criteria; and in accordance with a determination that a third set of one or more criteria is satisfied, wherein the third set of one or more criteria includes a criterion that is satisfied when the computer system is operating in a third mode different from the second mode and the first mode, forgoing automatically modifying the first movement component and the second movement component, wherein the third set of one or more criteria is different from the first set of one or more criteria and the second set of one or more criteria.

In some embodiments, a computer program product is described. In some embodiments, the computer program product comprises one or more programs configured to be executed by one or more processors of a computer system that is in communication with a first movement component and a second movement component different from the first movement component. In some embodiments, the one or more programs include instructions for: detecting a target location in a physical environment; and while detecting the target location in the physical environment: in accordance with a determination that a first set of one or more criteria is satisfied, wherein the first set of one or more criteria includes a criterion that is satisfied when the computer system is operating in a first mode: automatically modifying the first movement component; and forgoing automatically modifying the second movement component; in accordance with a determination that a second set of one or more criteria is satisfied, wherein the second set of one or more criteria includes a criterion that is satisfied when the computer system is operating in a second mode different from the first mode, automatically modifying the first movement component and the second movement component, wherein the second set of one or more criteria is different from the first set of one or more criteria; and in accordance with a determination that a third set of one or more criteria is satisfied, wherein the third set of one or more criteria includes a criterion that is satisfied when the computer system is operating in a third mode different from the second mode and the first mode, forgoing automatically modifying the first movement component and the second movement component, wherein the third set of one or more criteria is different from the first set of one or more criteria and the second set of one or more criteria.

In some embodiments, a method that is performed at a computer system that is in communication with an input component and an output component, wherein the input component is configured to control an orientation of the output component is described. In some embodiments, the method comprises: detecting a target location in a physical environment; and while detecting the target location in the physical environment: in accordance with a determination that a first set of one or more criteria is satisfied, wherein the first set of one or more criteria includes a criterion that is satisfied when the computer system is in a first orientation with respect to the target location, providing first feedback with respect to the input component; and in accordance with a determination that a second set of one or more criteria is satisfied, wherein the second set of one or more criteria includes a criterion that is satisfied when the computer system is in a second orientation with respect to the target location, providing second feedback with respect to the input component, wherein the second set of one or more criteria is different from the first set of one or more criteria, wherein the second orientation is different from the first orientation, and wherein the second feedback is different from the first feedback.

In some embodiments, a non-transitory computer-readable storage medium storing one or more programs configured to be executed by one or more processors of a computer system that is in communication with an input component and an output component, wherein the input component is configured to control an orientation of the output component is described. In some embodiments, the one or more programs includes instructions for: detecting a target location in a physical environment; and while detecting the target location in the physical environment: in accordance with a determination that a first set of one or more criteria is satisfied, wherein the first set of one or more criteria includes a criterion that is satisfied when the computer system is in a first orientation with respect to the target location, providing first feedback with respect to the input component; and in accordance with a determination that a second set of one or more criteria is satisfied, wherein the second set of one or more criteria includes a criterion that is satisfied when the computer system is in a second orientation with respect to the target location, providing second feedback with respect to the input component, wherein the second set of one or more criteria is different from the first set of one or more criteria, wherein the second orientation is different from the first orientation, and wherein the second feedback is different from the first feedback.

In some embodiments, a transitory computer-readable storage medium storing one or more programs configured to be executed by one or more processors of a computer system that is in communication with an input component and an output component, wherein the input component is configured to control an orientation of the output component is described. In some embodiments, the one or more programs includes instructions for: detecting a target location in a physical environment; and while detecting the target location in the physical environment: in accordance with a determination that a first set of one or more criteria is satisfied, wherein the first set of one or more criteria includes a criterion that is satisfied when the computer system is in a first orientation with respect to the target location, providing first feedback with respect to the input component; and in accordance with a determination that a second set of one or more criteria is satisfied, wherein the second set of one or more criteria includes a criterion that is satisfied when the computer system is in a second orientation with respect to the target location, providing second feedback with respect to the input component, wherein the second set of one or more criteria is different from the first set of one or more criteria, wherein the second orientation is different from the first orientation, and wherein the second feedback is different from the first feedback.

In some embodiments, a computer system that is in communication with an input component and an output component, wherein the input component is configured to control an orientation of the output component, is described. In some embodiments, the computer system comprises one or more processors and memory storing one or more programs configured to be executed by the one or more processors. In some embodiments, the one or more programs includes instructions for: detecting a target location in a physical environment; and while detecting the target location in the physical environment: in accordance with a determination that a first set of one or more criteria is satisfied, wherein the first set of one or more criteria includes a criterion that is satisfied when the computer system is in a first orientation with respect to the target location, providing first feedback with respect to the input component; and in accordance with a determination that a second set of one or more criteria is satisfied, wherein the second set of one or more criteria includes a criterion that is satisfied when the computer system is in a second orientation with respect to the target location, providing second feedback with respect to the input component, wherein the second set of one or more criteria is different from the first set of one or more criteria, wherein the second orientation is different from the first orientation, and wherein the second feedback is different from the first feedback.

In some embodiments, a computer system that is in communication with an input component and an output component, wherein the input component is configured to control an orientation of the output component, is described. In some embodiments, the computer system comprises means for performing each of the following steps: detecting a target location in a physical environment; and while detecting the target location in the physical environment: in accordance with a determination that a first set of one or more criteria is satisfied, wherein the first set of one or more criteria includes a criterion that is satisfied when the computer system is in a first orientation with respect to the target location, providing first feedback with respect to the input component; and in accordance with a determination that a second set of one or more criteria is satisfied, wherein the second set of one or more criteria includes a criterion that is satisfied when the computer system is in a second orientation with respect to the target location, providing second feedback with respect to the input component, wherein the second set of one or more criteria is different from the first set of one or more criteria, wherein the second orientation is different from the first orientation, and wherein the second feedback is different from the first feedback.

In some embodiments, a computer program product is described. In some embodiments, the computer program product comprises one or more programs configured to be executed by one or more processors of a computer system that is in communication with an input component and an output component, wherein the input component is configured to control an orientation of the output component. In some embodiments, the one or more programs include instructions for: detecting a target location in a physical environment; and while detecting the target location in the physical environment: in accordance with a determination that a first set of one or more criteria is satisfied, wherein the first set of one or more criteria includes a criterion that is satisfied when the computer system is in a first orientation with respect to the target location, providing first feedback with respect to the input component; and in accordance with a determination that a second set of one or more criteria is satisfied, wherein the second set of one or more criteria includes a criterion that is satisfied when the computer system is in a second orientation with respect to the target location, providing second feedback with respect to the input component, wherein the second set of one or more criteria is different from the first set of one or more criteria, wherein the second orientation is different from the first orientation, and wherein the second feedback is different from the first feedback.

In some embodiments, a method that is performed at a computer system in communication with an input component is described. In some embodiments, the method comprises: after detecting, via the input component, a first set of one or more inputs corresponding to selection of a first target location and while navigating to the first target location, detecting an error; and in response to detecting the error, initiating a process to select a respective target location.

In some embodiments, a non-transitory computer-readable storage medium storing one or more programs configured to be executed by one or more processors of a computer system in communication with an input component is described. In some embodiments, the one or more programs includes instructions for: after detecting, via the input component, a first set of one or more inputs corresponding to selection of a first target location and while navigating to the first target location, detecting an error; and in response to detecting the error, initiating a process to select a respective target location.

In some embodiments, a transitory computer-readable storage medium storing one or more programs configured to be executed by one or more processors of a computer system in communication with an input component is described. In some embodiments, the one or more programs includes instructions for: after detecting, via the input component, a first set of one or more inputs corresponding to selection of a first target location and while navigating to the first target location, detecting an error; and in response to detecting the error, initiating a process to select a respective target location.

In some embodiments, a computer system in communication with an input component is described. In some embodiments, the computer system comprises one or more processors and memory storing one or more programs configured to be executed by the one or more processors. In some embodiments, the one or more programs includes instructions for: after detecting, via the input component, a first set of one or more inputs corresponding to selection of a first target location and while navigating to the first target location, detecting an error; and in response to detecting the error, initiating a process to select a respective target location.

In some embodiments, a computer system in communication with an input component is described. In some embodiments, the computer system comprises means for performing each of the following steps: after detecting, via the input component, a first set of one or more inputs corresponding to selection of a first target location and while navigating to the first target location, detecting an error; and in response to detecting the error, initiating a process to select a respective target location.

In some embodiments, a computer program product is described. In some embodiments, the computer program product comprises one or more programs configured to be executed by one or more processors of a computer system in communication with an input component. In some embodiments, the one or more programs include instructions for: after detecting, via the input component, a first set of one or more inputs corresponding to selection of a first target location and while navigating to the first target location, detecting an error; and in response to detecting the error, initiating a process to select a respective target location.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for providing navigation assistance, thereby increasing the effectiveness, efficiency, and user satisfaction with such devices. Such methods and interfaces may complement or replace other methods for providing navigation assistance.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

The following description sets forth exemplary techniques for providing navigation assistance. This description is not intended to limit the scope of this disclosure but is instead provided as a description of example implementations.

Users need electronic devices that provide effective techniques for providing navigation assistance. Efficient techniques can reduce a user's mental load when providing navigation assistance. This reduction in mental load can enhance user productivity and make the device easier to use. In some embodiments, the techniques described herein can reduce battery usage and processing time (e.g., by providing user interfaces that require fewer user inputs to operate).

Figure 1:
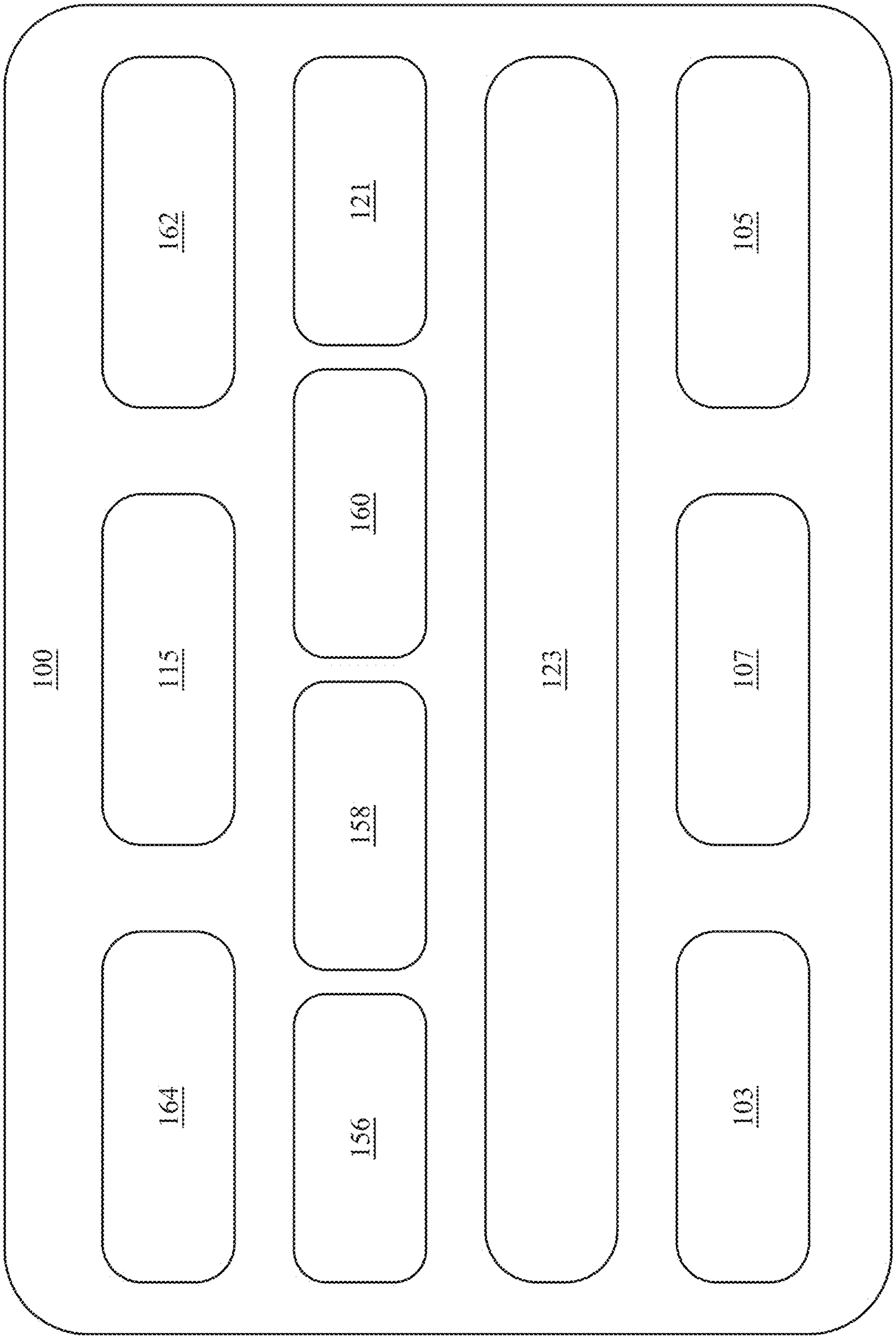
FIG. 1 is a block diagram illustrating a system with various components in accordance with some embodiments.
Figure 2A:
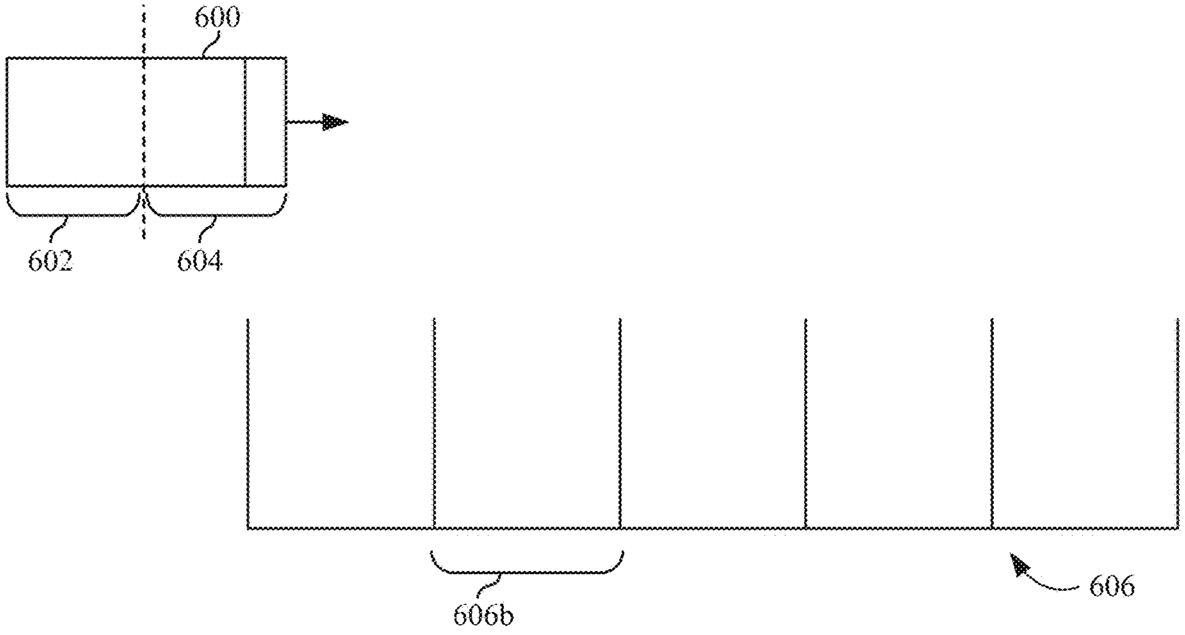
FIGS. 2A-2F illustrate exemplary diagrams for navigating a movable computer system to a target destination in accordance with some embodiments.
Figure 3A:
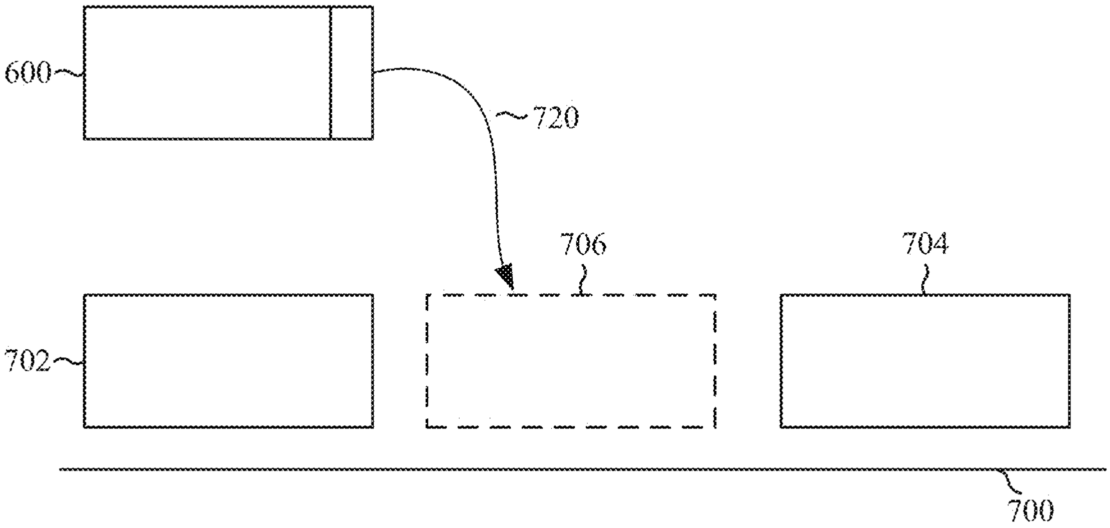
FIGS. 3A-3C illustrate exemplary diagrams for navigating between objects in a forward manner in accordance with some embodiments.
Figure 3B:
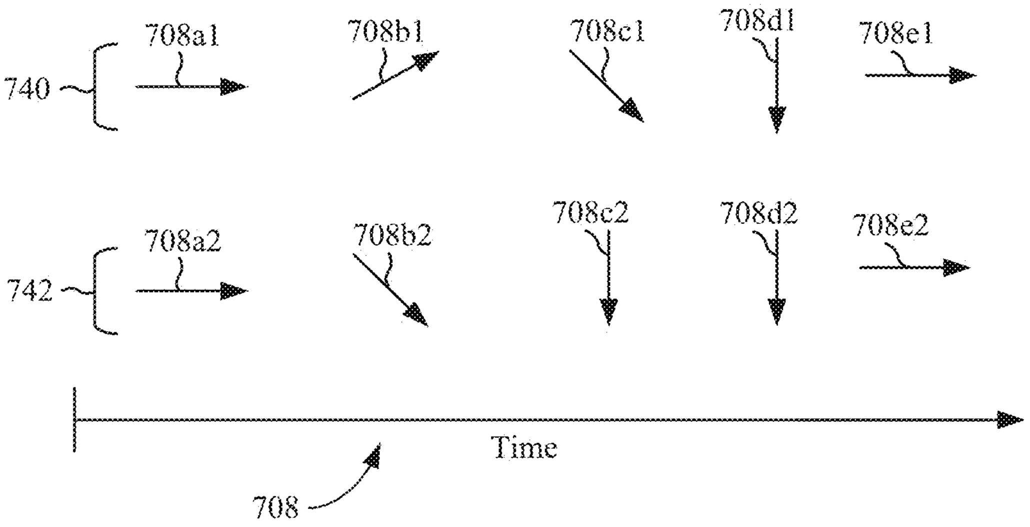
Figure 3C:
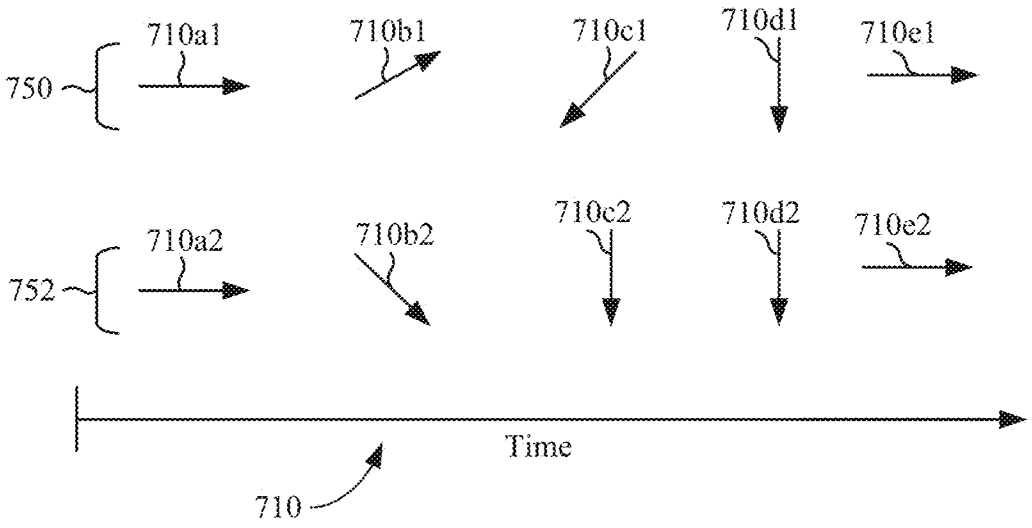
Figure 4A:
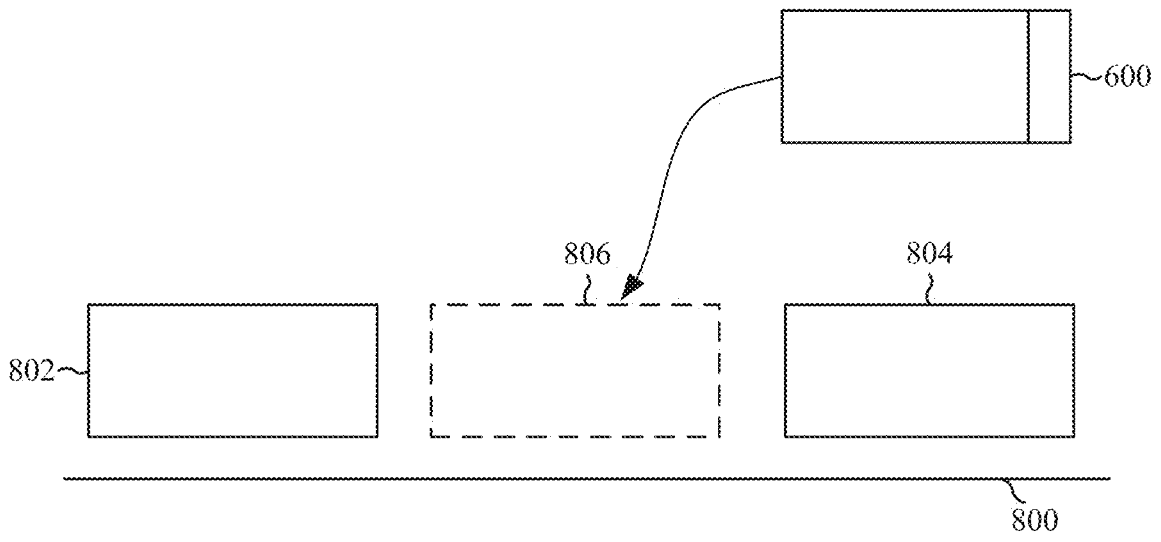
FIGS. 4A-4C illustrate exemplary diagrams for navigating between objects in a backward manner in accordance with some embodiments.
Figure 4B:
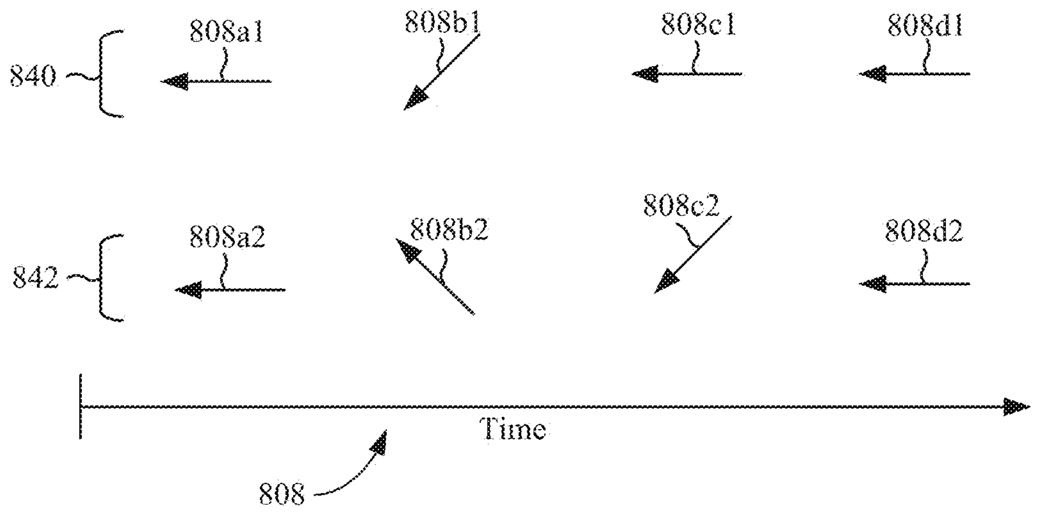
Figure 4C:
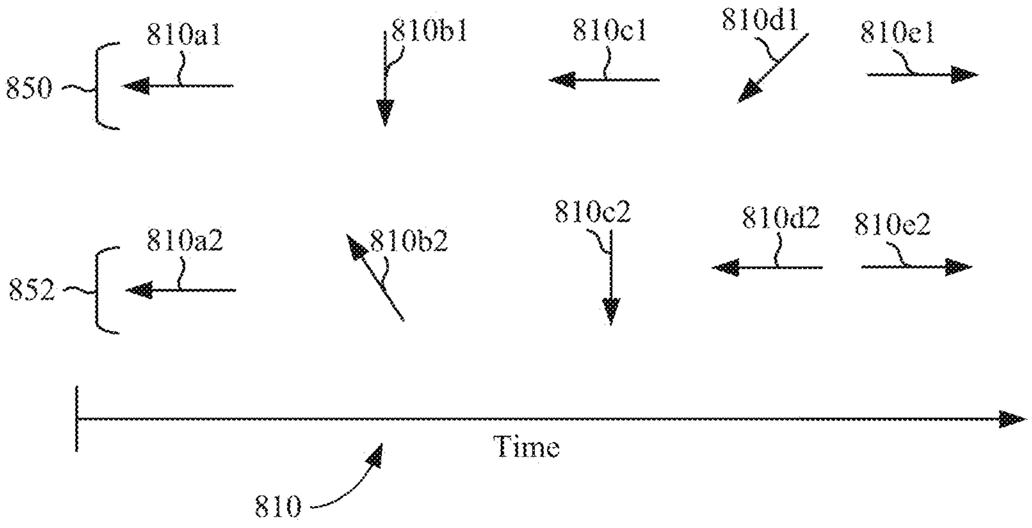
Figure 5:
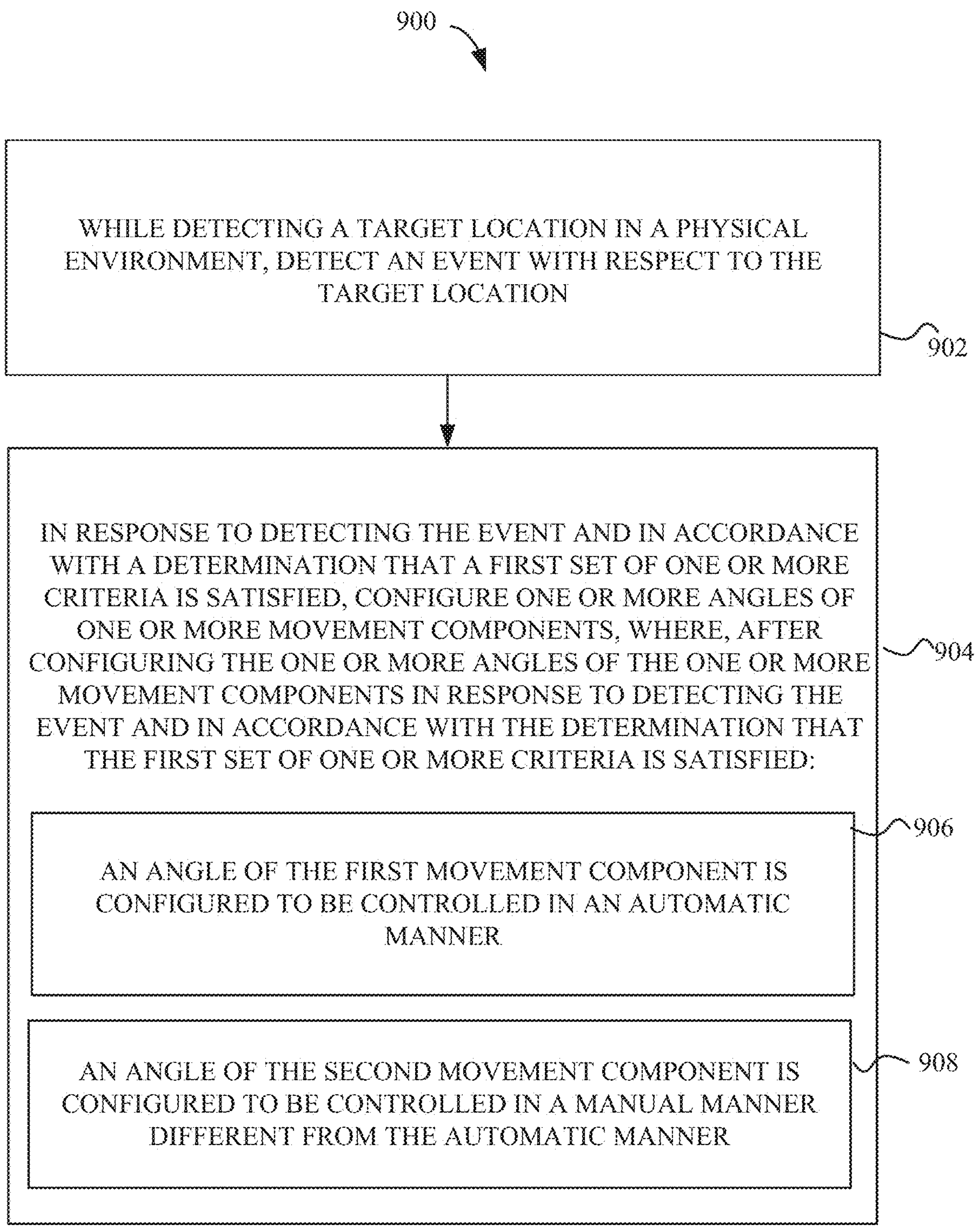
FIG. 5 is a flow diagram illustrating a method for configuring a movable computer system in accordance with some embodiments.
Figure 6A:
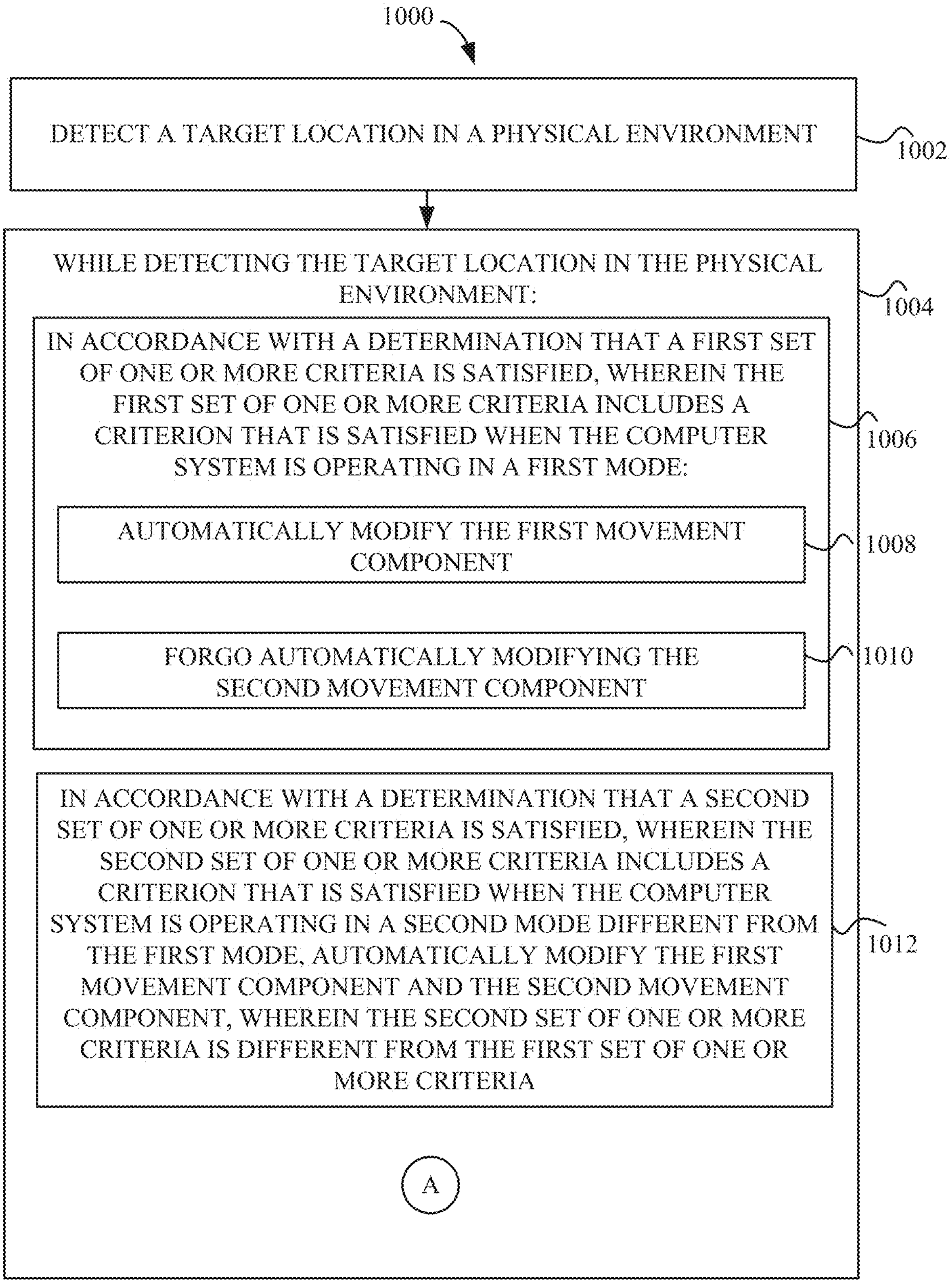
FIGS. 6A-6B is a flow diagram illustrating a method for selectively modifying movement components of a movable computer system in accordance with some embodiments.
Figure 6B:
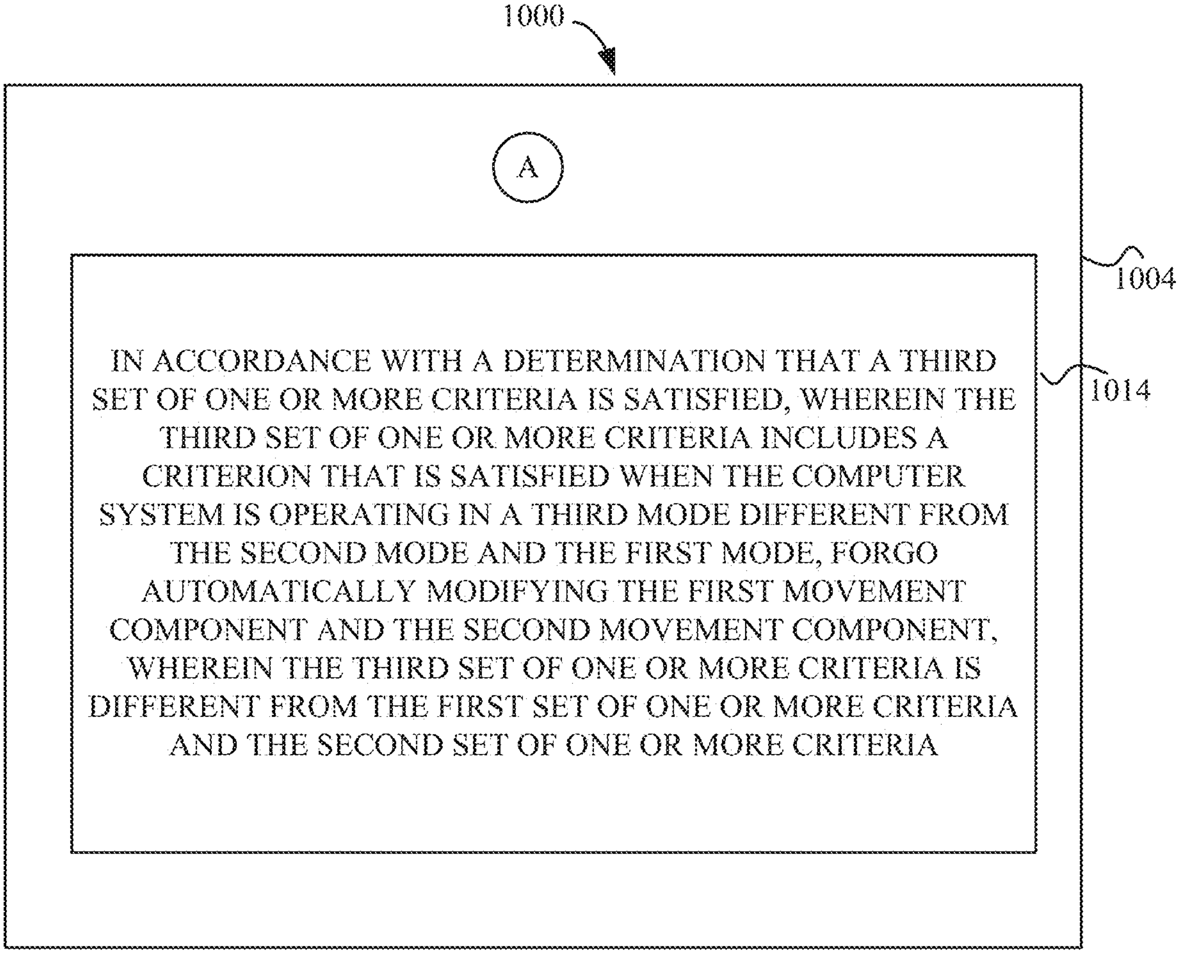
Figure 8:
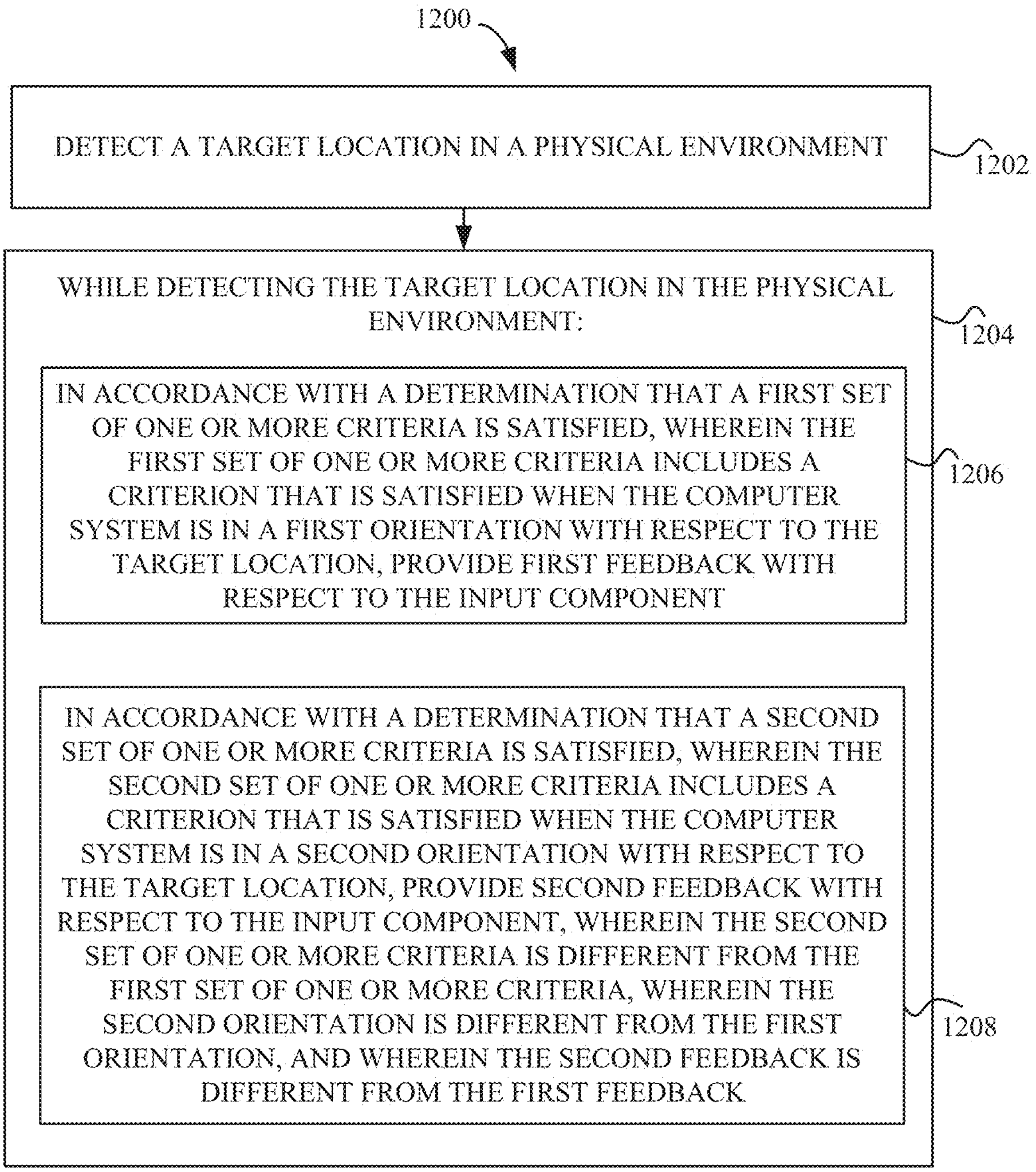
FIG. 8 is a flow diagram illustrating a method for providing feedback based on an orientation of a movable computer system in accordance with some embodiments.
Figure 9:
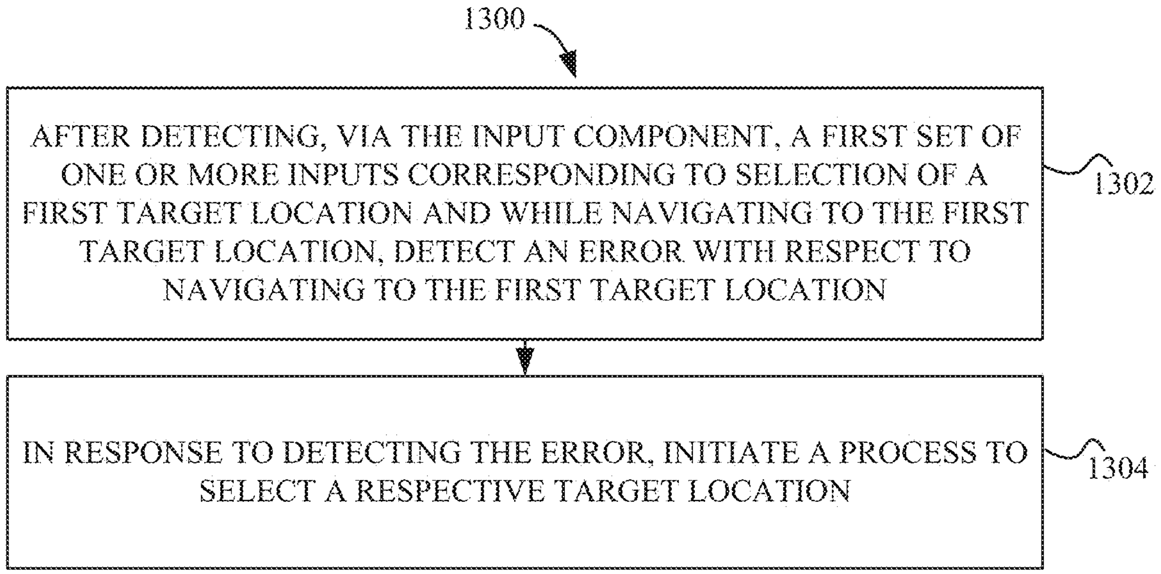
FIG. 9 is a flow diagram illustrating a method for redirecting a movable computer system in accordance with some embodiments.

FIG. 1 provides illustrations of exemplary devices for performing techniques for providing navigation assistance. FIGS. 2A-2F illustrate exemplary diagrams for navigating a movable computer system to a target destination in accordance with some embodiments. FIGS. 3A-3C illustrate exemplary diagrams for navigating between objects in a forward manner in accordance with some embodiments. FIGS. 4A-4C illustrate exemplary diagrams for navigating between objects in a backward manner in accordance with some embodiments. FIG. 5 is a flow diagram illustrating a method for configuring a movable computer system in accordance with some embodiments. FIGS. 6A-6B is a flow diagram illustrating a method for selectively modifying movement components of a movable computer system in accordance with some embodiments. The diagrams in FIGS. 2A-2F, 3A-3C, and 4A-4C are used to illustrate the processes described below, including the processes in FIGS. 5, 6A-6B, and 8. FIGS. 7A-7D illustrate exemplary diagrams for redirecting a movable computer system in accordance with some embodiments. FIG. 8 is a flow diagram illustrating a method for providing feedback based on an orientation of a movable computer system in accordance with some embodiments. FIG. 9 is a flow diagram illustrating a method for redirecting a movable computer system in accordance with some embodiments. The diagrams in FIGS. 7A-7D are used to illustrate the processes described below, including the processes in FIGS. 8-9.

The processes below describe various techniques for making user interfaces and/or human-computer interactions more efficient (e.g., by helping the user to quickly and easily provide inputs and preventing user mistakes when operating a device). These techniques sometimes reduce the number of inputs needed for a user (e.g., a person and/or a user) to perform an operation, provide clear and/or meaningful feedback (e.g., visual, acoustic, and/or haptic feedback) to the user so that the user knows what has happened or what to expect, provide additional information and controls without cluttering the user interface, and/or perform certain operations without requiring further input from the user. Since the user can use a device more quickly and easily, these techniques sometimes improve battery life and/or reduce power usage of the device.

In methods described where one or more steps are contingent on one or more conditions having been satisfied, it should be understood that the described method can be repeated in multiple repetitions so that over the course of the repetitions all of the conditions upon which steps in the method are contingent have been satisfied in different repetitions of the method. For example, if a method requires performing a first step if a condition is satisfied, and a second step if the condition is not satisfied, it should be appreciated that the steps are repeated until the condition has been both satisfied and not satisfied, in no particular order. Thus, a method described with one or more steps that are contingent upon one or more conditions having been satisfied could be rewritten as a method that is repeated until each of the conditions described in the method has been satisfied. This multiple repetition, however, is not required of system or computer readable medium claims where the system or computer readable medium contains instructions for performing conditional operations that require that one or more conditions be satisfied before the operations occur. A person having ordinary skill in the art would also understand that, similar to a method with conditional steps, a system or computer readable storage medium can repeat the steps of a method as many times as are needed to ensure that all of the conditional steps have been performed.

The terminology used in the description of the various embodiments is for the purpose of describing particular embodiments only and is not intended to be limiting.

User interfaces for electronic devices, and associated processes for using these devices, are described below. In some embodiments, the device is a desktop computer with a touch-sensitive surface (e.g., a touch screen display and/or a touchpad). In other embodiments, the device is a portable, movable, and/or mobile electronic device (e.g., a processor, a smart phone, a smart watch, a tablet, a fitness tracking device, a laptop, a head-mounted display (HMD) device, a communal device, a vehicle, a media device, a smart speaker, a smart display, a robot, a television and/or a personal computing device).

In some embodiments, the electronic device is a computer system that is in communication with a display component (e.g., by wireless or wired communication). The display component may be integrated into the computer system or may be separate from the computer system. Additionally, the display component may be configured to provide visual output to a display (e.g., a liquid crystal display, an OLED display, or CRT display). As used herein, "displaying" content includes causing to display the content (e.g., video data rendered or decoded by a display controller) by transmitting, via a wired or wireless connection, data (e.g., image data or video data) to an integrated or external display component to visually produce the content. In some embodiments, visual output is any output that is capable of being perceived by the human eye, including, and not limited to images, videos, graphs, charts, and other graphical representations of data.

In some embodiments, the electronic device is a computer system that is in communication with an audio generation component (e.g., by wireless or wired communication). The audio generation component may be integrated into the computer system or may be separate from the computer system. Additionally, the audio generation component may be configured to provide audio output. Examples of an audio generation component include a speaker, a home theater system, a soundbar, a headphone, an earphone, an earbud, a television speaker, an augmented reality headset speaker, an audio jack, an optical audio output, a Bluetooth audio output, and/or an HDMI audio output). In some embodiments, audio output is any output that is capable of being perceived by the human ear, including, and not limited to sound waves, music, speech, and/or other audible representations of data.

In the discussion that follows, an electronic device that includes particular input and output devices is described. It should be understood, however, that the electronic device optionally includes one or more other input and/or output devices, such as physical user-interface devices (e.g., a physical keyboard, a mouse, and/or a joystick).

FIG. 1 illustrates an example system 100 for implementing techniques described herein. System 100 can perform any of the methods described in FIGS. 5, 6, 8, and/or 9 (e.g., methods 900, 1000, 1200, and/or 1300) and/or portions of these methods.

In FIG. 1, system 100 includes various components, such as processor(s) 103, RF circuitry(ies) 105, memory(ies) 107, sensors 156 (e.g., image sensor(s), orientation sensor(s), location sensor(s), heart rate monitor(s), temperature sensor(s)), input component(s) 158 (e.g., camera(s) (e.g., a periscope camera, a telephoto camera, a wide-angle camera, and/or an ultra-wide-angle camera), depth sensor(s), microphone(s), touch sensitive surface(s), hardware input mechanism(s), and/or rotatable input mechanism(s)), mobility components (e.g., actuator(s) (e.g., pneumatic actuator(s), hydraulic actuator(s), and/or electric actuator(s)), motor(s), wheel(s), movable base(s), rotatable component(s), translation component(s), and/or rotatable base(s)) and output component(s) 160 (e.g., speaker(s), display component(s), audio generation component(s), haptic output device(s), display screen(s), projector(s), and/or touch-sensitive display(s)). These components optionally communicate over communication bus(es) 123 of the system. Although shown as separate components, in some implementations, various components can be combined and function as a single component, such as a sensor can be an input component.

In some embodiments, system 100 is a mobile and/or movable device (e.g., a tablet, a smart phone, a laptop, head-mounted display (HMD) device, and or a smartwatch). In other embodiments, system 100 is a desktop computer, an embedded computer, and/or a server.

In some embodiments, processor(s) 103 includes one or more general processors, one or more graphics processors, and/or one or more digital signal processors. In some embodiments, memory(ies) 107 is one or more non-transitory computer-readable storage mediums (e.g., flash memory and/or random-access memory) that store computer-readable instructions configured to be executed by processor(s) 103 to perform techniques described herein.

In some embodiments, RF circuitry(ies) 105 includes circuitry for communicating with electronic devices and/or networks (e.g., the Internet, intranets, and/or a wireless network, such as cellular networks and wireless local area networks (LANs)). In some embodiments, RF circuitry(ies) 105 includes circuitry for communicating using near-field communication and/or short-range communication, such as Bluetooth® or Ultra-wideband.

In some embodiments, display(s) 121 includes one or more monitors, projectors, and/or screens. In some embodiments, display(s) 121 includes a first display for displaying images to a first eye of a user and a second display for displaying images to a second eye of the user. In such embodiments, corresponding images can be simultaneously displayed on the first display and the second display. Optionally, the corresponding images include the same virtual objects and/or representations of the same physical objects from different viewpoints, resulting in a parallax effect that provides the user with the illusion of depth of the objects on the displays. In some embodiments, display(s) 121 is a single display. In such embodiments, corresponding images are simultaneously displayed in a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some embodiments, system 100 includes touch-sensitive surface(s) 115 for receiving user inputs, such as tap inputs and swipe inputs. In some embodiments, display(s) 121 and touch-sensitive surface(s) 115 form touch-sensitive display(s).

In some embodiments, sensor(s) 156 includes sensors for detecting various conditions. In some embodiments, sensor(s) 156 includes orientation sensors (e.g., orientation sensor(s) 111) for detecting orientation and/or movement of platform 150. For example, system 100 uses orientation sensors to track changes in the location and/or orientation (sometimes collectively referred to as position) of system 100, such as with respect to physical objects in the physical environment. In some embodiments, sensor(s) 156 includes one or more gyroscopes, one or more inertial measurement units, and/or one or more accelerometers. In some embodiments, sensor(s) 156 includes a global positioning sensor (GPS) for detecting a GPS location of platform 150. In some embodiments, sensor(s) 156 includes a radar system, LIDAR system, sonar system, image sensors (e.g., image sensor(s) 109, visible light image sensor(s), and/or infrared sensor(s)), depth sensor(s), rangefinder(s), and/or motion detector(s). In some embodiments, sensor(s) 156 includes sensors that are in an interior portion of system 100 and/or sensors that are on an exterior of system 100. In some embodiments, system 100 uses sensor(s) 156 (e.g., interior sensors) to detect a presence and/or state (e.g., location and/or orientation) of a passenger in the interior portion of system 100. In some embodiments, system 100 uses sensor(s) 156 (e.g., external sensors) to detect a presence and/or state of an object external to system 100. In some embodiments, system 100 uses sensor(s) 156 to receive user inputs, such as hand gestures and/or other air gesture. In some embodiments, system 100 uses sensor(s) 156 to detect the location and/or orientation of system 100 in the physical environment. In some embodiments, system 100 uses sensor(s) 156 to navigate system 100 along a planned route, around obstacles, and/or to a destination location. In some embodiments, sensor(s) 156 include one or more sensors for identifying and/or authenticating a user of system 100, such as a fingerprint sensor and/or facial recognition sensor.

In some embodiments, image sensor(s) includes one or more visible light image sensor, such as charged coupled device (CCD) sensors, and/or complementary metal-oxide-semiconductor (CMOS) sensors operable to obtain images of physical objects. In some embodiments, image sensor(s) includes one or more infrared (IR) sensor(s), such as a passive IR sensor or an active IR sensor, for detecting infrared light. For example, an active IR sensor can include an IR emitter, such as an IR dot emitter, for emitting infrared light. In some embodiments, image sensor(s) includes one or more camera(s) configured to capture movement of physical objects. In some embodiments, image sensor(s) includes one or more depth sensor(s) configured to detect the distance of physical objects from system 100. In some embodiments, system 100 uses CCD sensors, cameras, and depth sensors in combination to detect the physical environment around system 100. In some embodiments, image sensor(s) includes a first image sensor and a second image sensor different form the first image sensor. In some embodiments, system 100 uses image sensor(s) to receive user inputs, such as hand gestures and/or other air gestures. In some embodiments, system 100 uses image sensor(s) to detect the location and/or orientation of system 100 in the physical environment.

In some embodiments, system 100 uses orientation sensor(s) for detecting orientation and/or movement of system 100. For example, system 100 can use orientation sensor(s) to track changes in the location and/or orientation of system 100, such as with respect to physical objects in the physical environment. In some embodiments, orientation sensor(s) includes one or more gyroscopes, one or more inertial measurement units, and/or one or more accelerometers.

In some embodiments, system 100 uses microphone(s) to detect sound from one or more users and/or the physical environment of the one or more users. In some embodiments, microphone(s) includes an array of microphones (including a plurality of microphones) that optionally operate in tandem, such as to identify ambient noise or to locate the source of sound in space (e.g., inside system 100 and/or outside of system 100) of the physical environment.

In some embodiments, input device(s) 158 includes one or more mechanical and/or electrical devices for detecting input, such as button(s), slider(s), knob(s), switch(es), remote control(s), joystick(s), touch-sensitive surface(s), keypad(s), microphone(s), and/or camera(s). In some embodiments, input device(s) 158 include one or more input devices inside system 100. In some embodiments, input device(s) 158 include one or more input devices (e.g., a touch-sensitive surface and/or keypad) on an exterior of system 100.

In some embodiments, output device(s) 160 include one or more devices, such as display(s), monitor(s), projector(s), speaker(s), light(s), and/or haptic output device(s). In some embodiments, output device(s) 160 includes one or more external output devices, such as external display screen(s), external light(s), and/or external speaker(s). In some embodiments, output device(s) 160 includes one or more internal output devices, such as internal display screen(s), internal light(s), and/or internal speaker(s).

In some embodiments, environment controls 162 includes mechanical and/or electrical systems for monitoring and/or controlling conditions of an internal portion (e.g., cabin) of system 100. In some embodiments, environmental controls 162 includes fan(s), heater(s), air conditioner(s), and/or thermostat(s) for controlling the temperature and/or airflow within the interior portion of system 100.

In some embodiments, mobility component(s) includes mechanical and/or electrical components that enable a platform to move and/or assist in the movement of the platform. In some embodiments, mobility system 164 includes powertrain(s), drivetrain(s), motor(s) (e.g., an electrical motor), engine(s), power source(s) (e.g., battery(ies)), transmission(s), suspension system(s), speed control system(s), and/or steering system(s). In some embodiments, one or more elements of mobility component(s) are configured to be controlled autonomously or manually (e.g., via system 100 and/or input device(s) 158).

In some embodiments, system 100 performs monetary transactions with or without another computer system. For example, system 100, or another computer system associated with and/or in communication with system 100 (e.g., via a user account described below), is associated with a payment account of a user, such as a credit card account or a checking account. To complete a transaction, system 100 can transmit a key to an entity from which goods and/or services are being purchased that enables the entity to charge the payment account for the transaction. As another example, system 100 stores encrypted payment account information and transmits this information to entities from which goods and/or services are being purchased to complete transactions.

System 100 optionally conducts other transactions with other systems, computers, and/or devices. For example, system 100 conducts transactions to unlock another system, computer, and/or device and/or to be unlocked by another system, computer, and/or device. Unlocking transactions optionally include sending and/or receiving one or more secure cryptographic keys using, for example, RF circuitry(ies) 105.

In some embodiments, system 100 is capable of communicating with other computer systems and/or electronic devices. For example, system 100 can use RF circuitry(ies) 105 to access a network connection that enables transmission of data between systems for the purpose of communication. Example communication sessions include phone calls, e-mails, SMS messages, and/or videoconferencing communication sessions.

In some embodiments, videoconferencing communication sessions include transmission and/or receipt of video and/or audio data between systems participating in the videoconferencing communication sessions, including system 100. In some embodiments, system 100 captures video and/or audio content using sensor(s) 156 to be transmitted to the other system(s) in the videoconferencing communication sessions using RF circuitry(ies) 105. In some embodiments, system 100 receives, using the RF circuitry(ies) 105, video and/or audio from the other system(s) in the videoconferencing communication sessions, and presents the video and/or audio using output component(s) 160, such as display(s) 121 and/or speaker(s). In some embodiments, the transmission of audio and/or video between systems is near real-time, such as being presented to the other system(s) with a delay of less than 0.1, 0.5, 1, or 3 seconds from the time of capturing a respective portion of the audio and/or video.

In some embodiments, the system 100 generates tactile (e.g., haptic) outputs using output component(s) 160. In some embodiments, output component(s) 160 generates the tactile outputs by displacing a moveable mass relative to a neutral position. In some embodiments, tactile outputs are periodic in nature, optionally including frequency(ies) and/or amplitude(s) of movement in two or three dimensions. In some embodiments, system 100 generates a variety of different tactile outputs differing in frequency(ies), amplitude(s), and/or duration/number of cycle(s) of movement included. In some embodiments, tactile output pattern(s) includes a start buffer and/or an end buffer during which the movable mass gradually speeds up and/or slows down at the start and/or at the end of the tactile output, respectively.

In some embodiments, tactile outputs have a corresponding characteristic frequency that affects a "pitch" of a haptic sensation that a user feels. For example, higher frequency(ies) corresponds to faster movement(s) by the moveable mass whereas lower frequency(ies) corresponds to slower movement(s) by the moveable mass. In some embodiments, tactile outputs have a corresponding characteristic amplitude that affects a "strength" of the haptic sensation that the user feels. For example, higher amplitude(s) corresponds to movement over a greater distance by the moveable mass, whereas lower amplitude(s) corresponds to movement over a smaller distance by the moveable mass. In some embodiments, the "pitch" and/or "strength" of a tactile output varies over time.

In some embodiments, tactile outputs are distinct from movement of system 100. For example, system 100 can includes tactile output device(s) that move a moveable mass to generate tactile output and can include other moving part(s), such as motor(s), wheel(s), axel(s), control arm(s), and/or brakes that control movement of system 100. Although movement and/or cessation of movement of system 100 generates vibrations and/or other physical sensations in some situations, these vibrations and/or other physical sensations are distinct from tactile outputs. In some embodiments, system 100 generates tactile output independent from movement of system 100 For example, system 100 can generate a tactile output without accelerating, decelerating, and/or moving system 100 to a new position.

In some embodiments, system 100 detects gesture input(s) made by a user. In some embodiments, gesture input(s) includes touch gesture(s) and/or air gesture(s), as described herein. In some embodiments, touch-sensitive surface(s) 115 identify touch gestures based on contact patterns (e.g., different intensities, timings, and/or motions of objects touching or nearly touching touch-sensitive surface(s) 115). Thus, touch-sensitive surface(s) 115 detect a gesture by detecting a respective contact pattern. For example, detecting a finger-down event followed by detecting a finger-up (e.g., liftoff) event at (e.g., substantially) the same position as the finger-down event (e.g., at the position of a user interface element) can correspond to detecting a tap gesture on the user interface element. As another example, detecting a finger-down event followed by detecting movement of a contact, and subsequently followed by detecting a finger-up (e.g., liftoff) event can correspond to detecting a swipe gesture. Additional and/or alternative touch gestures are possible.

In some embodiments, an air gesture is a gesture that a user performs without touching input component(s) 158. In some embodiments, air gestures are based on detected motion of a portion (e.g., a hand, a finger, and/or a body) of a user through the air. In some embodiments, air gestures include motion of the portion of the user relative to a reference. Example references include a distance of a hand of a user relative to a physical object, such as the ground, an angle of an arm of the user relative to the physical object, and/or movement of a first portion (e.g., hand or finger) of the user relative to a second portion (e.g., shoulder, another hand, or another finger) of the user. In some embodiments, detecting an air gesture includes detecting absolute motion of the portion of the user, such as a tap gesture that includes movement of a hand in a predetermined pose by a predetermined amount and/or speed, or a shake gesture that includes a predetermined speed or amount of rotation of a portion of the user.

In some embodiments, detecting one or more inputs includes detecting speech of a user. In some embodiments, system 100 uses one or more microphones of input component(s) 158 to detect the user speaking one or more words. In some embodiments, system 100 parses and/or communicates information to one or more other systems to determine contents of the speech of the user, including identifying words and/or obtaining a semantic understanding of the words. For example, system processor(s) 103 can be configured to perform natural language processing to detect one or more words and/or determine a likely meaning of the one or more words in the sequence spoken by the user. Additionally or alternatively, in some embodiments, the system 100 determines the meaning of the one or more words in the sequence spoken based upon a context of the user determined by the system 100.

In some embodiments, system 100 outputs spatial audio via output component(s) 160. In some embodiments, spatial audio is output in a particular position. For example, system 100 can play a notification chime having one or more characteristics that cause the notification chime to be generated as if emanating from a first position relative to a current viewpoint of a user (e.g., "spatializing" and/or "spatialization" including audio being modified in amplitude, filtered, and/or delayed to provide a perceived spatial quality to the user).

In some embodiments, system 100 presents visual and/or audio feedback indicating a position of a user relative to a current viewpoint of another user, thereby informing the other user about an updated position of the user. In some embodiments, playing audio corresponding to a user includes changing one or more characteristics of audio obtained from another computer system to mimic an effect of placing an audio source that generates the play back of audio within a position corresponding to the user, such as a position within a three-dimensional environment that the user moves to, spawns at, and/or is assigned to. In some embodiments, a relative magnitude of audio at one or more frequencies and/or groups of frequencies is changed, one or more filters are applied to audio (e.g., directional audio filters), and/or the magnitude of audio provided via one or more channels are changed (e.g., increased or decreased) to create the perceived effect of the physical audio source. In some embodiments, the simulated position of the simulated audio source relative to a floor of the three-dimensional environment matches an elevation of a head of a participant providing audio that is generated by the simulated audio source, or is a predetermined one or more elevations relative to the floor of the three-dimensional environment. In some embodiments, in accordance with a determination that the position of the user will correspond to a second position, different from the first position, and that one or more first criteria are satisfied, system 100 presents feedback including generating audio as if emanating from the second position.

In some embodiments, system 100 communicates with one or more accessory devices. In some embodiments, one or more accessory devices is integrated with system 100. In some embodiments, one or more accessory devices is external to system 100. In some embodiments, system 100 communicates with accessory device(s) using RF circuitry(ies) 105 and/or using a wired connection. In some embodiments, system 100 controls operation of accessory device(s), such as door(s), window(s), lock(s), speaker(s), light(s), and/or camera(s). For example, system 100 can control operation of a motorized door of system 100. As another example, system 100 can control operation of a motorized window included in system 100. In some embodiments, accessory device(s), such as remote control(s) and/or other computer systems (e.g., smartphones, media players, tablets, computers, and/or wearable devices) functioning as input devices control operations of system 100. For example, a wearable device (e.g., a smart watch) functions as a key to initiate operation of an actuation system of system 100. In some embodiments, system 100 acts as an input device to control operations of another system, device, and/or computer, such as the platform 100 functioning as a key to initiate operation of an actuation system of a platform associated with another system, device, and/or computer.

In some embodiments, digital assistant(s) help a user perform various functions using system 100. For example, a digital assistant can provide weather updates, set alarms, and perform searches locally and/or using a network connection (e.g., the Internet) via a natural-language interface. In some embodiments, a digital assistant accepts requests at least partially in the form of natural language commands, narratives, requests, statements, and/or inquiries. In some embodiments, a user requests an informational answer and/or performance of a task using the digital assistant. For example, in response to receiving the question "What is the current temperature?," the digital assistant answers "It is 30 degrees." As another example, in response to receiving a request to perform a task, such as "Please invite my family to dinner tomorrow," the digital assistant can acknowledge the request by playing spoken words, such as "Yes, right away," and then send the requested calendar invitation on behalf of the user to each family member of the user listed in a contacts list for the user. In some embodiments, during performance of a task requested by the user, the digital assistant engages with the user in a sustained conversation involving multiple exchanges of information over a period of time. Other ways of interacting with a digital assistant are possible to request performance of a task and/or request information. For example, the digital assistant can respond to the user in other forms, e.g., displayed alerts, text, videos, animations, music, etc. In some embodiments, the digital assistant includes a client-side portion executed on system 100 and a server-side portion executed on a server in communication with system 100. The client-side portion can communicate with the server through a network connection using RF circuitry(ies) 105. The client-side portion can provide client-side functionalities, input and/or output processing and/or communication with the server, for example. In some embodiments, the server-side portion provides server-side functionalities for any number client-side portions of multiple systems.

In some embodiments, system 100 is associated with one or more user accounts. In some embodiments, system 100 saves and/or encrypts user data, including files, settings, and/or preferences in association with particular user accounts. In some embodiments, user accounts are password-protected and system 100 requires user authentication before accessing user data associated with an account. In some embodiments, user accounts are associated with other system(s), device(s), and/or server(s). In some embodiments, associating one user account with multiple systems enables those systems to access, update, and/or synchronize user data associated with the user account. For example, the systems associated with a user account can have access to purchased media content, a contacts list, communication sessions, payment information, saved passwords, and other user data. Thus, in some embodiments, user accounts provide a secure mechanism for a customized user experience.

Attention is now directed towards embodiments of techniques that are implemented on an electronic device, such as a movable computer system, and/or system 100.

FIGS. 2A-2F illustrate exemplary diagrams for navigating a movable computer system to a target destination in accordance with some embodiments. The diagrams in these figures are used to illustrate the processes described below, including the processes in FIGS. 5, 6A-6B, and 8.

In some embodiments, one or more of the diagrams of FIGS. 2A-2F are displayed by a display of movable computer system 600 and serve as a visual aid to assist a user in navigating to the target destination. In some embodiments, one or more of the diagrams of FIGS. 2A-2F are representative of different positions of movable computer system 600 while navigating to the target destination and are not displayed by a display of movable computer system 600.

FIGS. 2A-2D illustrate movable computer system 600 and set of parking spots 606. In some embodiments, movable computer system 600 is a vehicle, such as an automobile (e.g., sedan, coupe, scooter, or truck). However, it should be recognized that the following discussion is equally applicable to other types of movable computer systems, such as a trailer, a skateboard, an airplane, and/or a boat.

In some embodiments, movable computer system 600 includes (1) a back set of wheels (e.g., one or more wheels) that is coupled to rear half 602 of movable computer system 600 and (2) a front set of wheels (e.g., one or more wheels) that is coupled to front half 604 of movable computer system 600. In some embodiments, the back set of wheels includes two or more wheels. In some embodiments, the front set of wheels includes two or more wheels. In some embodiments, movable computer system 600 is configured for steering with the back set of wheels and the front set of wheels (e.g., four-wheel steering when two wheels are coupled to the back of movable computer system 600 and two wheels are coupled to the front of movable computer system 600).

In some embodiments, the back set of wheels and/or the front set of wheels are configured to be independently controlled. In such embodiments, a direction of the back set of wheels and/or the front set of wheels can be changed (e.g., rotated) independently. In some embodiments, the back set of wheels can be steered together and the front set of wheels can be steered together such that steering of the back set of wheels is independent of steering the front set of wheels. In some embodiments, each wheel in the back set of wheels can be steered independently and each wheel in the front set of wheels can be steered independently.

As illustrated in FIGS. 2A-2D, set of parking spots 606 includes target parking spot 606*b*. In some embodiments, target parking spot 606*b* is a parking spot that has been identified (e.g., by movable computer system 600 and/or by a user of movable computer system 600) as the target destination of movable computer system 600. That is, in FIGS. 2A-2D, movable computer system 600 is navigating to target parking spot 606*b*. In some embodiments, through FIGS. 2A-2D, movable computer system 600 causes the back set of wheels to converge on a single angle as movable computer system 600 navigates to target parking spot 606*b* (e.g., an angle that is parallel to target parking spot 606*b*, such as illustrated by arrow **608*f*1 in FIG. 2**E).

In some embodiments, target parking spot 606*b* is identified as the target destination by a user (e.g., an owner (e.g., inside and/or outside of movable computer system 600), a driver, and/or a passenger) of movable computer system 600. For example, the user can identify target parking spot 606*b* as the target destination by (1) gazing at target parking spot 606*b* for a predetermined amount of time (e.g., 1-30 seconds), (2) pointing movable computer system 600 towards target parking spot 606*b*, (3) providing input on a representation of target parking spot 606*b*, and/or (4) inputting a location (e.g., GPS coordinates and/or an address) that corresponds to and/or includes target parking spot 606*b* into a navigation application installed on movable computer system 600 and/or another computer system (e.g., a personal device of the user) in communication with movable computer system 600. These examples should not be construed as limiting and other techniques can be used for identifying the target parking spot for the moveable computer system.

In some embodiments, target parking spot 606*b* is identified as the target destination in response to movable computer system and/or another computer system (e.g., the personal device of the user) detecting an input (e.g., a voice command, a tap input, a hardware button press, and/or an air gesture). In some embodiments, target parking spot 606*b* is identified as the target destination when a determination is made that a set of wheels (e.g., the front set of wheels and/or the back set of wheels) of movable computer system 600 is rotated by the user to an angle towards target parking spot 606*b*. In some embodiments, target parking spot 606*b* is identified as the target destination when a determination is made that a set of wheels (e.g., the front set of wheels and/or the back set of wheels) of movable computer system 600 is rotated by the user to an angle away from target parking spot 606*b* (e.g., while movable computer system 600 is within a predefined distance from target parking spot 606*b*).

In some embodiments, target parking spot 606*b* is identified as the target destination via one or more sensors of movable computer system 600. For example, one or more cameras of movable computer system 600 can identify that target parking spot 606*b* is vacant and/or closest (e.g., when movable computer system 600 determines to identify a parking spot, such as in response to detecting input corresponding to a request to park) and thus identify target parking spot 606*b* as the target destination. For example, one or more depth sensors of movable computer system 600 can identify that a size of target parking spot 606*b* is large enough to accommodate movable computer system 600 and thus identify target parking spot 606*b* as the target destination.

In some embodiments, movable computer system 600 is configurable to operate in one of three different modes as movable computer system 600 approaches target parking spot 606*b*. While movable computer system 600 is in a first mode (e.g., a manual mode), both the back set of wheels and the front set of wheels are configured to be controlled by the user of movable computer system 600. While movable computer system 600 is in a second mode (e.g., a semi-automatic mode), the back set of wheels or the front set of wheels is configured to be controlled by the user while the other set of wheels is configured to not be controlled by the user (e.g., the other set of wheels is configured to be controlled by movable computer system 600 and not the user). In some embodiments, while operating in the second mode, movable computer system 600 can change which set of wheels is being controlled by the user and which set of wheels is not being controlled by the user. In some embodiments, the change for which set of wheels is being controlled by the user is based on positioning of movable computer system 600 (e.g., where movable computer 600 is located and/or oriented) and/or positioning of movable computer system 600 relative to a target destination (e.g., how close and/or in what direction the target destination is relative to movable computer system 600). For example, if movable computer system 600 leaves a densely occupied area, the front set of wheels and/or the back set of wheels can transition from being configured to be controlled by the user to not being controlled by the user, or if movable computer system 600 enters a densely occupied area, the front set of wheels and/or the back set of wheels can transition from being configured to not be controlled by the user to being configured to be controlled by the user. While movable computer system 600 is in a third mode (e.g., an automatic mode), the back set of wheels and the front set of wheels are configured to not be controlled by the user (e.g., the back set of wheels and front set wheels are configured to be controlled by movable computer system 600 and not the user).

In some embodiments, movable computer system 600 transitions between different modes as movable computer system 600 approaches target parking spot 606*b*. For example, movable computer system 600 can transition from the first mode to the third mode or second mode once movable computer system 600 is within a predetermined distance (e.g., 0.1-50 feet) and/or a predetermined time (e.g., 1-10 seconds) from target parking spot 606*b*. In some embodiments, movable computer system 600 transitions to a mode (e.g., the first mode, the second mode, or the third mode) based on a target destination of the moveable object. For example, if the target destination is in a densely populated area, movable computer system 600 can transition to the first mode, or if the target destination is in an open field, movable computer system 600 can transition to the third mode. In some embodiments, movable computer system 600 transitions to a mode based on one or more conditions (e.g., wind, rain, and/or brightness) of a physical environment. For example, if the physical environment is experiencing heavy rain, movable computer system 600 can transition to the first mode, or if the physical environment is experiencing an above average amount of brightness, movable computer system 600 can transition to the third mode. In some embodiments, movable computer system 600 transitions to a mode based on data (e.g., amount of data, and/or type of data) about a physical environment that is accessible to movable computer system 600. For example, if movable computer system 600 does not have access to data regarding a physical environment, movable computer system 600 can transition to the first mode of movable computer system 600, or if movable computer system 600 has access to data regarding a physical environment, movable computer system 600 can transition to the third mode of movable computer system 600. In some embodiments, movable computer system 600 transitions to a mode of movable computer system 600 in response to movable computer system 600 detecting an input. For example, if movable computer system 600 detects that the front set of wheels and/or the back set of wheels are manually rotated in a particular direction, movable computer system 600 can transition to the first mode or the second mode. As an additional example, movable computer system 600 can transition to a mode in response to detecting an input that corresponds to the depression of a physical input mechanism of movable computer system 600 and/or in response to movable computer system 600 detecting a change in the conditions of the physical environment (e.g., change in brightness level, noise level, and/or amount of precipitation in the physical environment).

In some embodiments, while movable computer system 600 is in the first mode, the second mode, and/or the third mode, characteristics (e.g., speed, acceleration, and/or direction of travel) of the movement of movable computer system 600 change without intervention from the user. For example, a speed of movable computer system 600 can decrease when a hazard (e.g., pothole and/or construction site) is detected. For another example, the speed of movable computer system 600 can decrease as movable computer system 600 gets within a predetermined distance (e.g., 0.1-50 feet) and/or a predetermined time (e.g., 1-10 seconds) from target parking spot 606*b*. For another example, a direction of travel of movable computer system 600 can change when movable computer system 600 detects an object in a path of movable computer system 600.

In some embodiments, while the back set of wheels is configured to not be controlled by the user, the positioning of the back set of wheels is changed in response to detection of a current path of movable computer system 600. For example, the back set of wheels can be controlled to change the current path of movable computer system 600 when it is determined that the current path is incorrect. In some embodiments, while the back set of wheels is configured to not be controlled by the user, the positioning of the back set of wheels is changed based on detection of weather conditions in the physical environment (e.g., precipitation, a wind level, a noise level, and/or a brightness level of the physical environment). In some embodiments, the back set of wheels is configured to not be controlled by the user when a determination is made that movable computer system 600 is within a predetermined distance (e.g., 0.1-50 feet) and/or a predetermined time (e.g., 1-10 seconds) of target parking spot 606*b*. In some embodiments, the back set of wheels is configured to not be controlled by the user when a determination is made that the back set of wheels is at a predetermined angle with respect to target parking spot 606*b*.

In some embodiments, prior to movable computer system 600 navigating to the target destination, being within a predetermined distance (e.g., 0.1-50 feet) and/or a predetermined time (e.g., 1-10 seconds) from the target destination, and/or detecting input requesting for movable computer system 600 to control at least one movement component, the user is able to control both the front set of wheels and the back set of wheels. In some embodiments, prior to movable computer system 600 navigating to the target destination, being within a predetermined distance (e.g., 0.1-50 feet) and/or a predetermined time (e.g., 1-10 seconds) from the target destination, and/or detecting input requesting for control of at least one movement component, the user is not able to control the front set of wheels and the back set of wheels (e.g., the front set of wheels and the back set of wheels are being automatically controlled by movable computer system 600, such as without requiring user input). In some embodiments, as movable computer system 600 navigates to the target destination, is within a predetermined distance (e.g., 0.1-50 feet) and/or a predetermined time (e.g., 1-10 seconds) from the target destination, and/or detects input requesting for movable computer system 600 to control at least one movement component, the user of movable computer system 600 controls the position of both the back set of wheels and the front set of wheels. In some embodiments, as movable computer system 600 navigates to the target destination, is within a predetermined distance (e.g., 0.1-50 feet) and/or a predetermined time (e.g., 1-10 seconds) from the target destination, and/or detects input requesting for control of at least one movement component, the user is not able to control the position of the front set of wheels and the back set of wheels. In some embodiments, the front set of wheels or the back set of wheels is configured to be controlled by the user based on the direction of travel of movable computer system 600. For example, if movable computer system 600 is moving forward (e.g., as shown in FIG. 2A), the front set of wheels can be configured to be controlled by the user, or if movable computer system 600 is moving in a reverse direction (e.g., the opposite of the direction of direction indicator 620 in FIG. 2A), the back set of wheels can be configured to be controlled by the user. In some embodiments, the front set of wheels or the back set of wheels is configured to be controlled by the user based on the direction that the user is looking. For example, if the user is looking towards the front set of wheels, the front set of wheels can be configured to be controlled by the user while the back set of wheels is configured to not be controlled by the user, or if the user is looking towards the back set of wheels, the back set of wheels is configured to be controlled by the user while the front set of wheels is configured to not be controlled by the user.

As illustrated in FIG. 2A, direction indicator 620 in pointing to the right of movable computer system 600. In some embodiments, direction indicator 620 indicates the direction that movable computer system 600 is currently traveling. Accordingly, at FIG. 2A, movable computer system 600 is moving along a path that is perpendicular to target parking spot 606*b*.

At FIG. 2A, the front set of wheels is configured to be controlled by the user of movable computer system 600 while the back set of wheels is not configured to be controlled by the user of movable computer system 600 (e.g., the positioning of the back set of wheels is fixed and/or the positioning of the back set of wheels is controlled by movable computer system 600). That is, as movable computer system 600 navigates to a target destination (and/or is within a predetermined distance (e.g., 0.1-50 feet) and/or a predetermined time (e.g., 1-10 seconds) from the target destination), the user of movable computer system 600 is not able to directly control the set of wheels that is furthest from the target destination and the user is able to directly control the set of wheels that is closest to the target destination. It should be recognized that, in other embodiments, the user is able to directly control the set of wheels that is furthest from the target destination and the user is not able to directly control the set of wheels that is closest to the target destination.

At FIG. 2A, movable computer system 600 detects an input (e.g., a voice command, the rotation of a steering mechanism, the depression of a physical input mechanism, and/or a hand gesture) that corresponds to a request to rotate the front set of wheels towards target parking spot 606*b*.

Figure 2B:
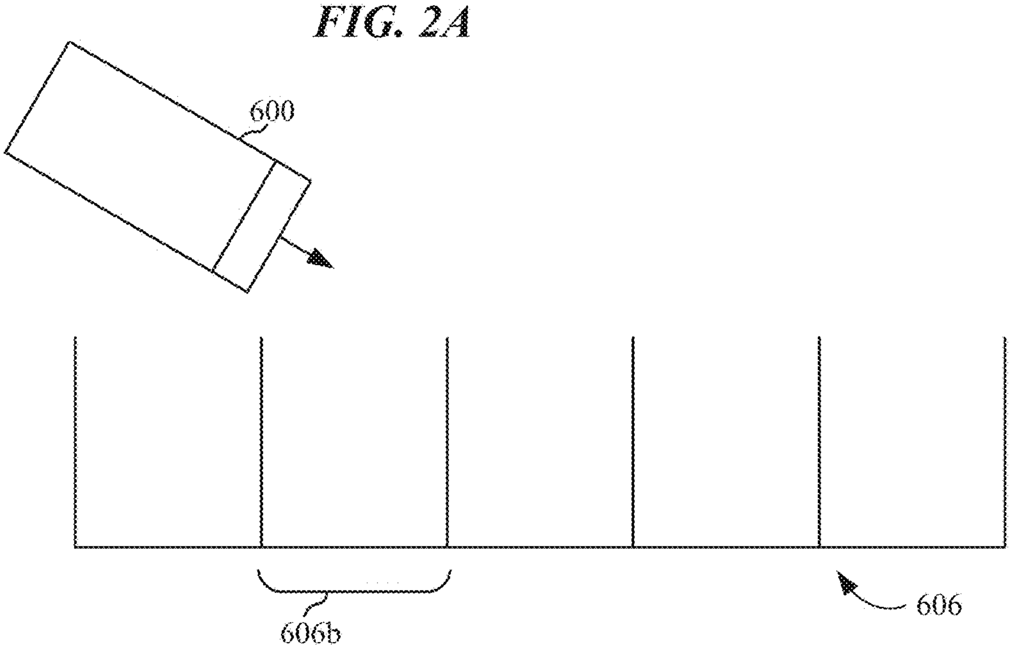

At FIG. 2B, in response to movable computer system 600 detecting the input that corresponds to the request to rotate the front set of wheels, the front set of wheels is rotated such that the front set of wheels is directed towards (e.g., pointed towards and/or facing) target parking spot 606*b*. While the back set of wheels is configured to not be controlled by the user and the front set of wheels is configured to be controlled by the user, the angle (and/or the position) of the back set of wheels relative to target parking spot 606*b* is based on an angle (and/or position) of the front set of wheels relative to target parking spot 606*b*. For example, movable computer system 600 can set different angles (and/or positions) of the back set of wheels depending on the angle of the front set of wheels relative to target parking spot 606*b*. In some embodiments, the angle of the back set of wheels is set (e.g., by movable computer system 600 and/or another computer system that is in communication with movable computer system 600) such that movable computer system 600 navigates along the most efficient, comfortable, and/or safest path to reach target parking spot 606*b*. In some embodiments, the angle of the back set of wheels is set based on a relative position of movable computer system 600 with respect to target parking spot 606*b* (e.g., the angle of the back set of wheels with respect to target parking spot 606*b* gradually decreases as a greater amount of movable computer system 600 is positioned within target parking spot 606*b*). In some embodiments, the angle of the back set of wheels is set based on the positioning of one or more external objects (e.g., individuals, animals, construction signs, and/or road conditions, such as potholes and/or accumulation of water) that are in a navigation path of movable computer system 600. For example, the angle of the back set of wheels can be adjusted such that movable computer system 600 does not contact and/or come within a threshold distance (e.g., 0.1 feet-5 feet) of an external object.

At FIG. 2B, as indicated by direction indicator 620, movable computer system 600 is navigating in a direction that is angled towards target parking spot 606*b*. In some embodiments, as movable computer system 600 navigates towards target parking spot 606*b*, movable computer system 600 accelerates and/or decelerates (e.g., without detecting an input from the user) to better align and/or to stop movable computer system 600 within target parking spot 606*b*.

In some embodiments, movable computer system 600 provides (e.g., auditory, visual, and/or tactile) feedback based on a determination that movable computer system 600 is not aligned with target parking spot 606*b*. For example, movable computer system 600 can provide a tone through one or more playback devices that are in communication with movable computer system 600, display a flashing user interface via one or more displays that are in communication with movable computer system 600, and/or vibrate one or more hardware elements of movable computer system 600 when a determination is made that movable computer system 600 is not aligned within target parking spot 606*b* (1) after movable computer system 600 has come to rest within target parking spot 606*b* or (2) while navigating to target parking spot 606*b* but before after movable computer system 600 has come to rest within target parking spot 606*b*.

In some embodiments, movable computer system 600 provides (e.g., auditory, visual, and/or tactile) feedback based on a determination that movable computer system 600 will be misaligned within target parking spot 606*b* if movable computer system 600 continues along the current path of movable computer system 600. For example, movable computer system 600 can cause a steering mechanism of movable computer system 600 to rotate, vibrate at least a portion of the steering mechanism, apply a braking mechanism to the front set of tires and/or the back set of tires, and/or display a warning message, via a display of movable computer system 600, when a determination is made that the angle of approach of movable computer system 600 with respect to target parking spot 606*b* is too steep or shallow.

In some embodiments, feedback can grow in intensity as misalignment between movable computer system 600 and target parking spot 606*b* grows and/or persists. In some embodiments, movable computer system 600 can provide a series of different types of feedback (e.g., first visual feedback, then audio feedback, then haptic feedback) as misalignment between movable computer system 600 and target parking spot 606*b* grows and/or persists.

In some embodiments, movable computer system 600 stops providing feedback based on a determination (e.g., a determination made by movable computer system 600 and/or by another computer system that is in communication with movable computer system 600) that movable computer system 600 transitions from being and/or will be misaligned with target parking spot 606*b* to being and/or will be aligned with target parking spot 606*b*.

Figure 2C:
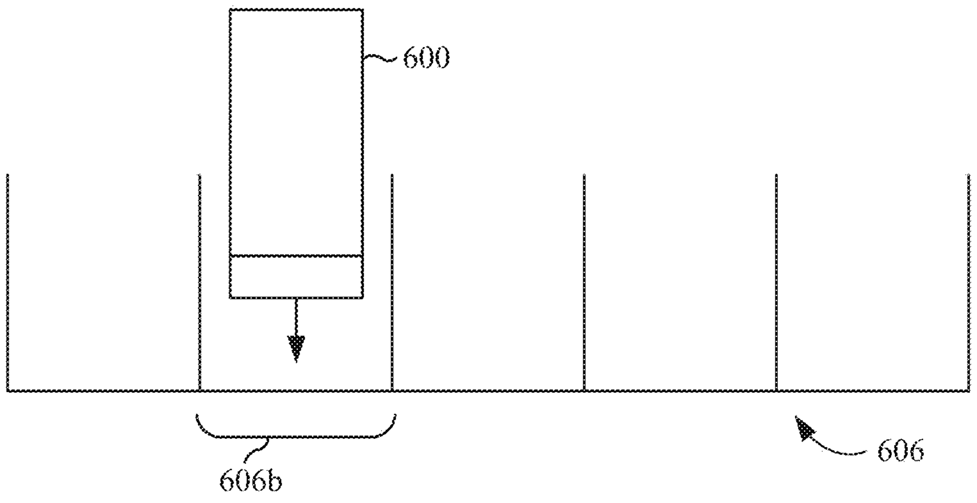

After FIG. 2B and before FIG. 2C, movable computer system 600 detects an input (e.g., a voice command, the rotation of a steering mechanism, the depression of a physical input mechanism, and/or a hand gesture) that corresponds to a request to rotate the front set of wheels to be parallel with target parking spot 606*b*. In some embodiments, after FIG. 2B and before FIG. 2C, movable computer system 600 causes the back set of wheels to change direction such that the back set of wheels is parallel with target parking spot 606*b*.

At FIG. 2C, in response to detecting the input that corresponds to a request to rotate the front set of wheels to be parallel with target parking spot 606*b*, the front set of wheels are rotated such that the front set of wheels are parallel with target parking spot 606*b*. At FIG. 2C, both the back set of wheels and the front set of wheels are parallel to target parking spot 606*b*. At FIG. 2C, as indicated by direction indicator 620, movable computer system 600 moves in a direction that is parallel to target parking spot 606*b*. In some embodiments, movable computer system 600 performs one or more operations (e.g., unlocks doors of movable computer system 600, powers off an air conditioning device of movable computer system 600, closes one or more windows of movable computer system 600, decreases a speed of movable computer system 600 (e.g., gradually decreases to a stop), and/or increases a speed of movable computer system 600) when a determination is made that movable computer system 600 is parallel to target parking spot 606*b*.

In some embodiments, a mode (e.g., the first mode, the second mode, and/or the third mode as described above) of movable computer system 600 is based on the orientation of movable computer system 600 relative to target parking spot 606*b*. For example, movable computer system 600 can transition from the second mode to the first mode or the third mode when a determination is made that movable computer system 600 is parallel to target parking spot 606*b*.

Figure 2D:
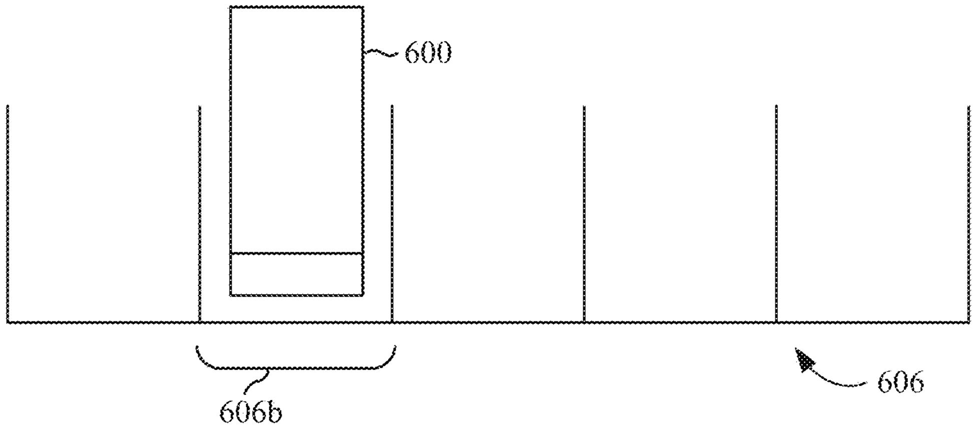

At FIG. 2D, as indicated by the absence of direction indicator 620, movable computer system 600 comes to rest within target parking spot 606*b*. At FIG. 2D, movable computer system 600 is correctly aligned within target parking spot 606*b*. In some embodiments, movable computer system 600 comes to rest within target parking spot 606*b* without detecting that the user has caused a brake to be applied to the front set of wheels and/or the back set of wheels. In some embodiments, movable computer system 600 performs one or more operations (e.g., unlocks doors of movable computer system 600, powers of an air conditioning device of movable computer system 600 and/or closes one or more windows of movable computer system 600) when a determination is made that movable computer system 600 has come to rest within target parking spot 606*b*.

In some embodiments, movable computer system 600 transitions between different modes of movable computer system 600 when a determination is made that movable computer system 600 has come to rest within target parking spot 606*b*. For example, movable computer system 600 can transition from the second mode to the third mode to allow movable computer system 600 make any adjustments to the positioning of movable computer system 600. For another example, movable computer system 600 can transition from the second mode to the first mode to allow the user to rotate the front set of wheels and/or the back set of wheels after movable computer system 600 has stopped. In some embodiments, movable computer system 600 transitions, without user intervention, between respective drive states (e.g., reverse, park, neutral, and/or drive) when a determination is made that movable computer system 600 has come to rest within target parking spot 606*b*. In some embodiments, after movable computer system 600 comes to rest within target parking spot 606*b*, movable computer system 600 rotates the front set of wheels and/or the back set of wheels to respective angles (e.g., based on a current context, such as an incline of a surface and/or weather) without user intervention. In some embodiments, rotating the front set of wheels and/or the back set of wheels to the respective angles helps prevent movable computer system 600 from moving (e.g., because of weather conditions (e.g., ice and/or rain) and/or because of a slope of target parking spot 606*b*) while movable computer system 600 is at rest within target parking spot 606*b*.

Figure 2E:
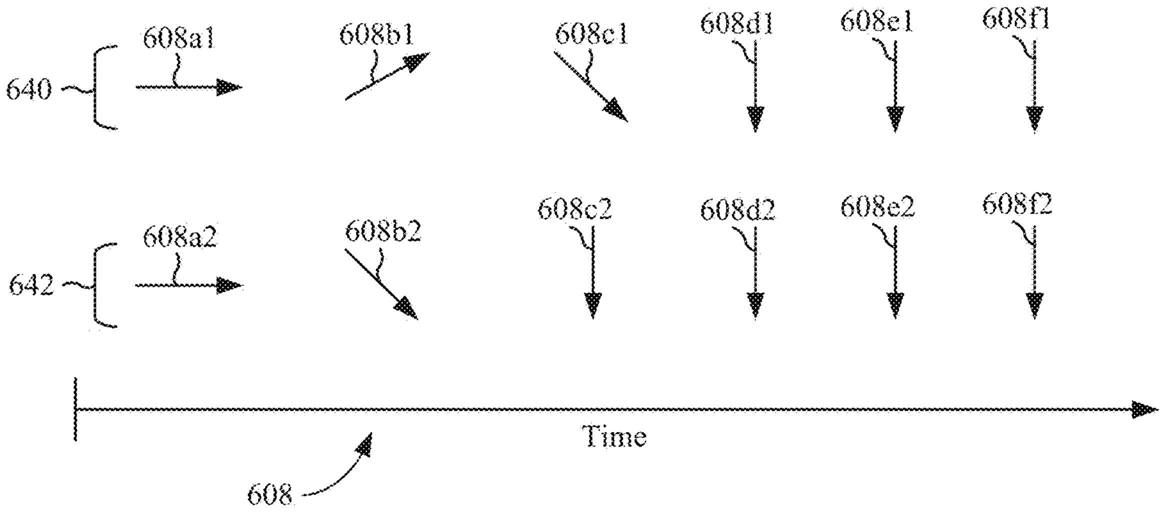

FIG. 2E illustrates diagram 608, which includes set of arrows 640 and set of arrows 642. In some embodiments, set of arrows 640 and set of arrows 642 correspond to movable computer system 600 navigating to target parking spot 606*b* where movable computer system 600 does not deviate from a navigation path of movable computer system 600.

At FIG. 2E, set of arrows 640 is a sequence of arrows that represents the positioning of the back set of wheels relative to the position of target parking spot 606*b* (e.g., an upward facing arrow indicates that the back set of wheels is directed away from target parking spot 606*b* and a downward facing arrow indicates that the back set of wheels is directed towards target parking spot 606*b*). In some embodiments, the back set of wheels is configured to not be controlled by a user (e.g., and/or be controlled by movable computer system 600 instead of the user) throughout at least a portion of set of arrows 640 as discussed above. In some embodiments, movable computer system 600 causes the back set of wheels to converge on a single target angle (e.g., the angle of arrow 608*f*1) throughout diagram 608. For example, the single target angle can be parallel to sides of target parking spot 606*b*.

At FIG. 2E, set of arrows 642 is a sequence of arrows that represents the positioning of the front set of wheels relative to the position of target parking spot 606*b* (e.g., an upward facing arrow indicates that the front set of wheels is directed away from target parking spot 606*b* and a downward facing arrow indicates that the front set of wheels is directed towards target parking spot 606*b*). In some embodiments, the front set of wheels is configured to be controlled by the user throughout at least a portion of set of arrows 642 as discussed above.

Turning the attention to each individual arrow included in set of arrows 640 and set of arrows 642, arrow 608*al* and arrow 608*a*2 correspond to a first point in time where the back set of wheels and the front set of wheels are perpendicular to target parking spot 606*b* (e.g., movable computer system 600 is approaching target parking spot 606*b*). In some embodiments, because movable computer system 600 is configured for four-wheel steering, the back set of wheels is not in fixed positional relationship with movable computer system 600. That is, the back set of wheels is configured to turn independent of the direction of travel of movable computer system 600 (e.g., and/or the front set of wheels). Accordingly, arrow 608*al* (e.g., and the remaining arrows in set of arrows 640) does not represent a fixed positional relationship between movable computer system 600 and the back set of wheels. Arrow 608*b*1 and arrow 608*b*2 correspond to a second point in time, that follows the first point in time, where movable computer system 600 is turning into target parking spot 606*b*. At the second point in time the back set of wheels is angled away from target parking spot 606*b* and the front set of wheels is angled towards target parking spot 606*b*1. As explained above, movable computer system 600 is configured for four-wheel steering. Accordingly, when movable computer system 600 makes turns at low speeds, the first set of wheels can be directed in an opposite direction than the second set of wheels to reduce the turning radius of movable computer system 600. In some embodiments, when movable computer system 600 is configured for two-wheel steering, the back set of wheels and movable computer system 600 have a fixed positional relationship. In examples where the back set of wheels and the body of movable computer system 600 have a fixed positional relationship, the arrows included in set of arrows 640 can be directed in a direction that mimics the direction of travel of movable computer system 600.

Arrow 608*c*1 and arrow 608*c*2 correspond to a third point in time that follows the second point in time where movable computer system 600 continues to turn into target parking spot 606*b*. At the third point in time the back set of wheels is angled towards target parking spot 606*b*1 and the front set of wheels is parallel to target parking spot 606*b*1. Arrow 608*d*1 and arrow 608*d*2 correspond to a fourth point in time that follows the third point in time where movable computer system 600 navigates towards the rear of target parking spot 606*b*1. At the fourth point in time both the front set of wheels and the back set of wheels are parallel to target parking spot 606*b*. Arrow 608*e*1 and arrow 608*e*2 correspond to a fifth point in time that follows the fourth point in time where movable computer system 600 continues to navigate towards the rear of target parking spot 606*b*1. At the fifth point in time both the front set of wheels and the back set of wheels are parallel to target parking spot 606*b* as movable computer system 600 pulls further into target parking spot 606*b*. Arrow 608*f*1 and arrow 608*f*2 correspond to a sixth point in time that follows the fifth point in time as movable computer system 600 comes to a rest within target parking spot 606*b*. At the sixth point in time both the front set of wheels and the back set of wheels are parallel to target parking spot 606*b* as movable computer system 600

At FIG. 2E, at each respective position of the back set of wheels that is represented by the arrows included in set of arrows 640, a determination is made (e.g., by movable computer system 600 and/or by another computer system that is in communication with movable computer system 600) that continuing along a current path of movable computer system 600 will cause movable computer system 600 to be correctly aligned within target parking spot 606*b*. Because a determination is made that continuing along the current path of movable computer system 600 will cause movable computer system 600 to be correctly aligned within target parking spot 606*b*, at each position represented by a respective arrow included in set of arrows 640, movable computer system 600 causes the back set of wheels to be positioned at an angle such that the back set of wheels does not cause movable computer system 600 to deviate from the current path of movable computer system 600.

In some embodiments, between the positioning of movable computer system 600 that corresponds to arrow 608*e*1 and arrow 608*f*1, movable computer system 600 deaccelerates in response to the user applying pressure to a brake pedal of movable computer system 600. In some embodiments, between the positioning of movable computer system 600 that corresponds to arrow 608*e*1 and arrow 608*f*1, movable computer system 600 deaccelerates without user intervention.

Figure 2F:
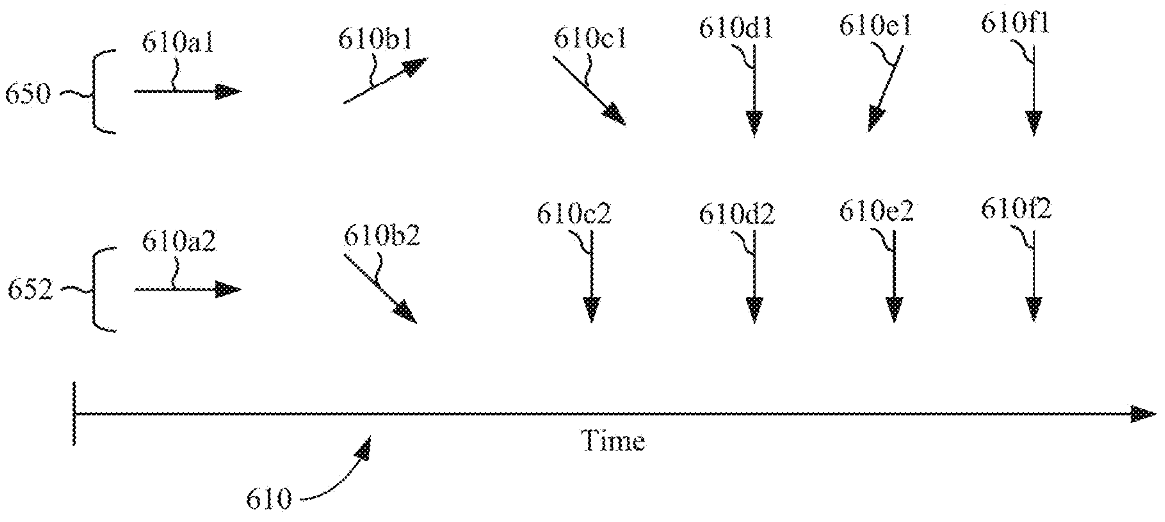

FIG. 2F illustrates diagram 610, which includes set of arrows 650 and set of arrows 652. In some embodiments, set of arrows 650 and set of arrows 652 correspond to movable computer system 600 navigating to another parking spot that is different from target parking spot 606*b* where movable computer system 600 deviates from a navigation path of movable computer system 600.

At FIG. 2F, set of arrows 650 is a sequence of arrows that represents the positioning of the back set of wheels relative to the position of the other parking spot (e.g., an upward facing arrow indicates that the back set of wheels is directed away from the other parking spot and a downward facing arrow indicates that the back set of wheels is directed towards the other parking spot). In some embodiments, the back set of wheels is configured to not be controlled by a user (e.g., and/or be controlled by movable computer system 600 instead of the user) throughout at least a portion of set of arrows 650 as discussed above. In some embodiments, movable computer system 600 causes the back set of wheels to converge on a single target angle (e.g., the angle of arrow 610*f*1) throughout diagram 610. For example, the single target angle can be parallel to sides of the other parking spot.

At FIG. 2F, set of arrows 652 is a sequence of arrows that represents the positioning of the front set of wheels relative to the position of the other parking spot (e.g., an upward facing arrow indicates that the front set of wheels is directed away from the other parking and a downward facing arrow indicates that the front set of wheels is directed towards the other parking spot). In some embodiments, the front set of wheels is configured to be controlled by the user throughout at least a portion of set of arrows 652 as discussed above.

In some embodiments, the positioning of the front set of wheels as movable computer system 600 navigates to the other parking spot at FIG. 2F mimics the positioning of the front set of wheels as movable computer system 600 navigates to target parking spot 606*b* at FIG. 2E. Accordingly, at FIG. 2F, set of arrows 652 is the same as set of arrows 642 at FIG. 2E.

At FIG. 2F, at each respective position of the back set of wheels that is represented by arrows 610*a*1-610*d*1, a determination is made (e.g., by movable computer system 600 and/or by another computer system that is in communication with movable computer system 600) that continuing along a current path of movable computer system 600 will cause movable computer system 600 to be correctly aligned within the other parking spot. Because a determination is made that continuing along a current path of movable computer system 600 will cause movable computer system 600 to be correctly aligned within the other parking spot, movable computer system 600 causes the back set of wheels to be positioned at an angle at each of the positions represented by arrows 610*a*1-610*d*1 that does not cause movable computer system 600 to deviate from the navigation path (e.g., the same path of movable computer system 600 at FIG. 2E). In some embodiments, movable computer system 600 causes the back set of wheels to be positioned at an angle that does not cause movable computer system 600 to deviate from the navigation path based on a determination that if movable computer system 600 continues along the navigation path of movable computer system 600 then movable computer system 600 will not come into contact with and/or be within a predefined distance of an external object and/or be aligned with the other parking spot.

Between the positioning of the back set of wheels that corresponds to arrow 610*d*1 and arrow 610*e*1, a determination is made (e.g., by movable computer system 600 and/or by another computer system that is in communication with movable computer system 600) that continuing along the navigation path of movable computer system 600 will cause movable computer system 600 to be misaligned within the other parking spot. Because a determination is made that continuing along the navigation path of movable computer system 600 will cause movable computer system 600 to be misaligned within the other parking spot, movable computer system 600 causes the back set of wheels to be adjusted to an angle such that causes movable computer system 600 to deviate from the navigation path to a new path. That is, when a determination is made that continuing along the navigation path of movable computer system 600 will cause movable computer system 600 to be misaligned within the other parking spot, the positioning of the back set of wheels (e.g., the set of wheels that is configured to not be controlled by the user) is adjusted, without user intervention, such that movable computer system 600 deviates from the navigation path to the new path. In some embodiments, the angle of the back set of wheels is (e.g., by movable computer system 600 and/or another computer system that is in communication with movable computer system 600) adjusted to an angle to offset an error made by the user in controlling the front set of wheels. Accordingly, the orientation of arrow **610*e*1 at FIG. 2F is different than the orientation of arrow 608*e*1 at FIG. 2E. More specifically, at FIG. 2E, the back set of wheels is parallel to target parking spot 606*b* at arrow 608*e*1, and at FIG. 2F, the back set of wheels is angled to the left of the other parking spot. The back set of wheels is angled at arrow 610*e*1 such that rear half 602 of movable computer system 600** is moved to the left within the other parking spot.

At FIG. 2F, at the position of the back set of wheels that is represented by arrow **610*f*1, a determination is made that (e.g., by movable computer system 600 and/or by another computer system that is in communication with movable computer system 600) that continuing along the new path of movable computer system 600 will cause movable computer system 600 to be correctly aligned within the other parking spot (and/or reach the single target angle). Because a determination is made that continuing along the new path of movable computer system 600 will cause movable computer system 600 to be aligned within the other parking spot, movable computer system 600** causes the back set of wheels to be positioned at the single target angle.

FIGS. 3A-3C illustrate exemplary diagrams for navigating between objects in a forward manner in accordance with some embodiments. The diagrams in these figures are used to illustrate the processes described below, including the processes in FIGS. 5, 6A-6B, and 8.

FIG. 3A includes a diagram that illustrates movable computer system 600 navigating towards target parking spot 706. At FIG. 3A, target parking spot 706 is a parking spot that is parallel to the direction of travel of movable computer system 600.

In some embodiments, the diagram of FIG. 3A is displayed by a display of movable computer system 600 and serves as a visual aid to assist a user in navigating to the target destination. In some embodiments, the diagram of FIG. 3A is representative of a position of movable computer system 600 while navigating to the target destination and is not displayed by a display of movable computer system 600.

As illustrated in FIG. 3A, target parking spot 706 is positioned between object 702 and object 704. In some embodiments, object 702 and object 704 are inanimate objects such as automobiles, construction signs, trees, and/or road hazards, such as a pot hole and/or a speed bump. In some embodiments, object 702 and object 704 are animate objects, such as an individual and/or an animal.

At FIG. 3A, direction indicator 720 indicates the path that movable computer system 600 will travel to arrive at target parking spot 706. Accordingly, as indicated by direction indicator 720, movable computer system 600 will travel forward before angling downwards towards target parking spot 706.

At FIG. 3A, movable computer system 600 causes the back set of wheels to converge on a first angle as movable computer system 600 travels in the forward direction towards target parking spot 706 (e.g., an angle that is parallel or substantially parallel to curb 700, such as illustrated by arrow **708*d*1) and movable computer system 600 causes the back set of wheels to converge on a second angle (e.g., an angle that is perpendicular or approximately perpendicular to curb 700, such as illustrated by arrow 708*e*1) as movable computer system 600 angles downwards towards target parking spot 706**.

In some embodiments, as explained above, as movable computer system 600 navigates towards target parking spot 706, the set of wheels of movable computer system 600 that is closest to target parking spot 706 is configured to be controlled by the user of movable computer system 600. At FIG. 3A, a determination is made that the front set of wheels is positioned closer to target parking spot 706 than the back set of wheels. At FIG. 3A, because a determination is made that the front set of wheels is positioned closer to target parking spot 706 than the back set of wheels, the front set of wheels is configured to be controlled by the user and the back set of wheels is configured to not be controlled by the user as movable computer system 600 navigates towards target parking spot 706. In some embodiments, the front set of wheels is configured to not be controlled by the user when a determination is made that movable computer system 600 is within a predetermined distance (e.g., 0.1-50 feet) and/or a predetermined time (e.g., 1-10 seconds) of object 702, object 704, and/or target parking spot 706. In some embodiments, as movable computer system 600 navigates towards target parking spot 706, the front set of wheels is configured to not be controlled by the user of movable computer system 600 and the back set of wheels is configured to be controlled by the user of movable computer system 600 when a determination is made that the back set of wheels is positioned closer to target parking spot 706 than the front set of wheels.

In some embodiments, a navigation path of movable computer system 600 and/or a speed of movable computer system 600 changes (e.g., without detecting a user input) when a determination is made that the positioning of object 702 and/or object 704 changes (e.g., object 702 and/or object 704 moves (1) towards and/or moves away from movable computer system 600 and/or (2) relative to parking spot 706).

FIG. 3B illustrates diagram 708, which includes set of arrows 740 and set of arrows 742. In some embodiments, set of arrows 740 and set of arrows 742 correspond to movable computer system 600 navigating to target parking spot 706 where movable computer system 600 does not deviate from a navigation path of movable computer system 600.

At FIG. 3B, set of arrows 740 is a sequence of arrows that represents the positioning of the back set of wheels relative to the position of target parking spot 706 (e.g., a rightward facing arrow indicates that the back set of wheels is directed towards target parking spot 706, an upward facing arrow indicates that the back set of wheels is directed away from target parking spot 706, and a downward facing arrow indicates that the back set of wheels is directed towards target parking spot 706) (e.g., a horizontal arrow indicates that the back set of wheels is parallel to target parking spot 706 and a vertical arrow indicates that the back set of wheels is perpendicular to target parking spot 706). In some embodiments, the back set of wheels is configured to not be controlled by a user (e.g., and/or be controlled by movable computer system 600 instead of the user) throughout at least a portion of set of arrows 740 as discussed above. In some embodiments, movable computer system 600 causes the back set of wheels to converge on a first angle as movable computer system 600 travels in the forward direction towards target parking spot 706 (e.g., an angle that is perpendicular or approximately perpendicular to curb 700, such as illustrated by arrow **708*d*1) and movable computer system 600 causes the back set of wheels to converge on a second angle (e.g., an angle that is parallel or substantially parallel to curb 700, such as illustrated by arrow 708*e*1) as movable computer system 600 angles downwards towards target parking spot 706**.

At FIG. 3B, set of arrows 742 is a sequence of arrows that represents the positioning of the front set of wheels relative to the position of target parking spot 706 (e.g., a rightward facing arrow indicates that the front set of wheels is directed towards target parking spot 706, an upward facing arrow indicates that the front of wheels is directed away from target parking spot 706, and a downward facing arrow indicates that the front set of wheels is directed towards target parking spot 706) (e.g., a horizontal arrow indicates that the front set of wheels is parallel to target parking spot 706 and a vertical arrow indicates that the back set of wheels is perpendicular to target parking spot 706). In some embodiments, the front set of wheels is configured to be controlled by the user throughout at least a portion of set of arrows 742 as discussed above.

At FIG. 3B, at each position of the back set of wheels that is represented by the arrows included in set of arrows 740, a determination is made (e.g., by movable computer system 600 and/or by another computer system that is in communication with movable computer system 600) that continuing along the respective path of movable computer system 600 will cause movable computer system 600 to be correctly aligned within target parking spot 706. Because a determination is made that continuing along the respective path of movable computer system 600 will cause movable computer system 600 to be correctly aligned within target parking spot 706 at each position represented by a respective arrow included in set of arrows 740, movable computer system 600 causes the back set of wheels to be positioned at an angle such that movable computer system 600 does not deviate from the navigation path of movable computer system 600.

In some embodiments, between the positioning of movable computer system 600 that corresponds to arrow **708*d*1 and arrow 708*e*1, movable computer system 600 deaccelerates in response to the user applying pressure to a brake pedal of movable computer system 600. In some embodiments, between the positioning of movable computer system 600 that corresponds to arrow 708*d*1 and arrow 708*e*1, movable computer system 600** deaccelerates without user intervention.

FIG. 3C illustrates diagram 710, which includes set of arrows 750 and set of arrows 752. In some embodiments, set of arrows 750 and set of arrows 752 correspond to movable computer system 600 navigating to another parking spot that is different from target parking spot 706 where movable computer system 600 deviates from a navigation path of movable computer system 600.

At FIG. 3C, set of arrows 750 is a sequence of arrows that represents the positioning of the back set of wheels relative to the position of the other parking spot (e.g., a rightward facing arrow indicates that the back set of wheels is directed towards the other parking spot, an upward facing arrow indicates that the back set of wheels is directed away from the other parking spot and a downward facing arrow indicates that the back set of wheels is directed towards the other parking spot) (e.g., a horizontal arrow indicates that the back set of wheels is parallel to the other parking spot and a vertical arrow indicates that the back set of wheels is perpendicular to the other parking spot). In some embodiments, the back set of wheels is configured to not be controlled by the user throughout at least a portion of set of arrows 750 as discussed above. In some embodiments, movable computer system 600 causes the back set of wheels to converge on a first angle as movable computer system 600 travels in the forward direction towards target parking spot 706 (e.g., an angle that is perpendicular or approximately perpendicular to curb 700, such as illustrated by arrow **708*d*1) and movable computer system 600 causes the back set of wheels to converge on a second angle (e.g., an angle that is parallel or substantially parallel to curb 700, such as illustrated by arrow 708*e*1) as movable computer system 600 angles downwards towards target parking spot 706**.

At FIG. 3C, set of arrows 752 is a sequence of arrows that represents the positioning of the front set of wheels relative to the position of the other parking spot (e.g., an upward facing arrow indicates that the back set of wheels is directed away from the other parking spot and a downward facing arrow indicates that the back set of wheels is directed towards the other parking spot) (e.g., a horizontal arrow indicates that the front set of wheels is parallel to the other parking spot and a vertical arrow indicates that the back set of wheels is perpendicular to the other parking spot) as movable computer system 600 navigates to the other parking spot. In some embodiments, the front set of wheels is configured to be controlled by the user throughout at least a portion of set of arrows 752 as discussed above.

For FIG. 3C, a length of the other parking spot is shorter in length than target parking spot 706 at FIGS. 3A-3B. Accordingly, performing the same navigation sequence that was performed at FIG. 3B will cause movable computer system 600 to be misaligned within the other parking spot. As illustrated in FIG. 3C, the positioning of the front set of wheels as movable computer system 600 navigates to the other parking spot mimics the positioning of the front set of wheels as movable computer system 600 navigates to target parking spot 706 at FIG. 3B. Accordingly, at FIG. 3C, set of arrows 752 is the same as set of arrows 742 at FIG. 3B.

At FIG. 3C, at the positions of the back set of wheels that is represented by arrow **710*al* and arrow 710*b*1, a determination is made (e.g., by movable computer system 600 and/or by another computer system that is in communication with movable computer system 600) that continuing along the navigation path of movable computer system 600 will cause movable computer system 600 to be correctly aligned within the other parking spot. Because a determination is made that continuing along the navigation path of movable computer system 600 will cause movable computer system 600 to be correctly aligned within the other parking spot, movable computer system 600 causes the back set of wheels to be positioned at an angle that does not cause movable computer system 600 to deviate from the navigation path of movable computer system 600 at the positions of the back set of wheels that correspond to arrow 710*al* and arrow 710*b*1**.

Between the positioning of the back set of wheels that corresponds to arrow **710*b*1 and arrow 710*c*1, a determination is made (e.g., by movable computer system 600 and/or by another computer system that is in communication with movable computer system 600) that continuing along the navigation path of movable computer system 600 will cause movable computer system 600 to be misaligned within the other parking spot. Because a determination is made that continuing along the navigation path of movable computer system 600 will cause movable computer system 600 to be misaligned within the other parking spot, movable computer system 600 causes the back set of wheels to be adjusted to an angle that causes movable computer system 600** to deviate from the navigation path to a new path.

That is, as explained above, when a determination is made that continuing along the navigation path of movable computer system 600 will cause movable computer system 600 to be misaligned within the other parking spot, the positioning of the respective set of wheels that is configured to not be controlled by the user is adjusted, without user intervention, such that movable computer system 600 deviates from the navigation path to the new path. Accordingly, the orientation of arrow 710*cl* at FIG. 3C is different than the orientation of arrow 708*c*1 at FIG. 3B. More specifically, at arrow 710*c*1, the back set of wheels is angled towards the rear of the other parking spot such that movable computer system 600 is moved towards the rear of the other parking spot while, at arrow 708*c*1, the back set of wheels is angled towards the front of target parking spot 706 such that movable computer system 600 is moved towards the front of target parking spot 706.

At FIG. 3C, at the position of the back set of wheels that is represented by arrows 710*d*1 and 710*e*1, a determination is made (e.g., by movable computer system 600 and/or by another computer system that is in communication with movable computer system 600) that continuing along the new path of movable computer system 600 will cause movable computer system 600 to be aligned within the other parking spot. Because a determination is made that continuing along the new path of movable computer system 600 will cause movable computer system 600 to be aligned within the other parking spot (and/or reach the second target angle), movable computer system 600 causes the back set of wheels to be positioned at an angle such that movable computer system 600 does not deviate from the new path at arrows 710*d*1 and 710*e*1 (and/or reach the first target angle and the second target angle, respectively).

FIGS. 4A-4C illustrate exemplary diagrams for navigating between objects in a backward manner in accordance with some embodiments. The diagrams in these figures are used to illustrate the processes described below, including the processes in FIGS. 5, 6A-6B, and 8.

FIG. 4A includes diagram 800 that illustrates movable computer system 600 navigating towards target parking spot 806. At FIG. 4A, target parking spot 806 is a parking spot that is parallel to the direction of travel of movable computer system 600 (e.g., the current direction of travel of movable computer system 600 and/or a previous direction of travel of movable computer system 600).

In some embodiments, the diagram of FIG. 4A is displayed by a navigation application of movable computer system 600 and serves as a visual aid to assist a user in navigating to the target destination. In some embodiments, the diagram of FIG. 4A is representative of a position of movable computer system 600 while navigating to the target destination and is not displayed by a navigation application of movable computer system 600.

As illustrated in FIG. 4A, target parking spot 806 is positioned between object 802 and object 804. In some embodiments, object 802 and object 804 are inanimate objects such as automobiles, construction signs, trees, and/or road hazards, such as a pothole or and/or a speed bump. In some embodiments, object 802 and object 804 are animate objects, such as an individual and/or an animal.

At FIG. 4A, direction indicator 820 indicates the path that movable computer system 600 will travel to arrive at target parking spot 806. Accordingly, as indicated by direction indicator 820, movable computer system 600 will travel in a reverse direction before angling downwards at an angle (e.g., a 90-degree angle or an angle that is substantially 90 degrees) towards target parking spot 806.

In some embodiments, as explained above, as movable computer system 600 navigates towards target parking spot 806, the set of wheels of movable computer system 600 that is closest to target parking spot 806 is configured to be controlled by a user of movable computer system 600. At FIG. 4A, a determination is made (e.g., by movable computer system 600 and/or by a computer system that is in communication with movable computer system 600) that the back set of wheels is positioned closer to target parking spot 806 than the front set of wheels. At FIG. 4A, because a determination is made that the back set of wheels is positioned closer to target parking spot 806 than the front set of wheels, the back set of wheels is configured to be controlled by the user and the front set of wheels is configured to not be controlled by the user as movable computer system 600 navigates towards target parking spot 806. In some embodiments, a navigation path of movable computer system 600 and/or a speed of movable computer system 600 changes (e.g., without detecting a user input) when a determination is made that the positioning of object 702 and/or object 704 changes (e.g., object 702 and/or object 704 moves (1) towards and/or moves away from movable computer system 600 and/or (2) relative to parking spot 706).

FIG. 4B illustrates diagram 808, which includes set of arrows 840 and set of arrows 842. In some embodiments, set of arrows 840 and set of arrows 842 correspond to movable computer system 600 navigating to target parking spot 806 where movable computer system 600 does not deviate from a navigation path of movable computer system 600.

At FIG. 4B, set of arrows 840 is a sequence of arrows that represents the positioning of the back set of wheels relative to the position of target parking spot 806 (e.g., a downward facing arrow indicates that the back set of wheels is directed towards from target parking spot 806 and a leftward facing arrow indicates that the back set of wheels is directed towards target parking spot 806) (e.g., a horizontal arrow indicates that the back set of wheels is parallel with target parking spot 806 and a vertical arrow indicates that the back set of wheels is perpendicular with target parking spot 806). In some embodiments, the back set of wheels is configured to be controlled by a user throughout at least a portion of set of arrows 840 as discussed above.

At FIG. 4B, set of arrows 842 is a sequence of arrows that represents the positioning of the front set of wheels relative to the position of target parking spot 806 (e.g., a downward facing arrow indicates that the front set of wheels is directed towards from target parking spot 806 and a leftward facing arrow indicates that the front set of wheels is directed towards target parking spot 806) (e.g., a horizontal arrow indicates that the front set of wheels is parallel with target parking spot 806 and a vertical arrow indicates that the front set of wheels is perpendicular with target parking spot 806). In some embodiments, the front set of wheels is configured to not be controlled by the user (e.g., and/or be controlled by movable computer system 600 instead of the user) throughout at least a portion of set of arrows 842 as discussed above. In some embodiments, movable computer system 600 causes the front set of wheels to converge on a first angle as movable computer system 600 travels in the backward direction towards target parking spot 806 (e.g., an angle that is perpendicular or approximately perpendicular to curb 800, such as illustrated by arrow 808*c*2) and movable computer system 600 causes the back set of wheels to converge on a second angle (e.g., an angle that is parallel or substantially parallel to curb 800, such as illustrated by arrow 808*d*2) as movable computer system 600 angles downwards towards target parking spot 806.

At FIG. 4B, at each respective position of the front set of wheels that is represented by the arrows included in set of arrows 842, a determination is made (e.g., by movable computer system 600 and/or by another computer system that is in communication with movable computer system 600) that continuing along the navigation path of movable computer system 600 will cause movable computer system 600 to be correctly aligned within target parking spot 806. Because a determination is made that continuing along the navigation path of movable computer system 600 will cause movable computer system 600 to be correctly aligned within target parking spot 806, movable computer system 600 causes the front set of wheels to be positioned at an angle such that movable computer system 600 does not deviate from the navigation path. In some embodiments, between the positioning of movable computer system 600 that corresponds to arrow 808*cl* and arrow 808*d*1, movable computer system 600 deaccelerates in response to the user applying pressure to a brake pedal of movable computer system 600. In some embodiments, between the positioning of movable computer system 600 that corresponds to arrow 808*cl* and arrow 808*d*1, movable computer system 600 deaccelerates without user intervention.

FIG. 4C illustrates diagram 810, which includes set of arrows 850 and set of arrows 852. In some embodiments, set of arrows 850 and set of arrows 852 correspond to movable computer system 600 navigating to target parking spot 806 where movable computer system 600 deviates from a navigation path of movable computer system 600. It should be recognized that the deviation in FIG. 4C is a result of an error by the user rather than a different parking spot, as described above with respect to FIGS. 2E-2F and 3B-3C.

At FIG. 4C, set of arrows 850 is a sequence of arrows that represents the positioning of the back set of wheels relative to the position of target parking spot 806 (e.g., a downward facing arrow indicates that the back set of wheels is directed towards from target parking spot 806 and a leftward facing arrow indicates that the back set of wheels is directed towards target parking spot 806) (e.g., a horizontal arrow indicates that the back set of wheels is parallel with target parking spot 806 and a vertical arrow indicates that the back set of wheels is perpendicular with target parking spot 806). In some embodiments, the back set of wheels is configured to be controlled by a user throughout at least a portion of set of arrows 850 as discussed above.

At FIG. 4C, set of arrows 852 is a sequence of arrows that represents the positioning of the front set of wheels relative to the position of target parking spot 806 (e.g., a downward facing arrow indicates that the front set of wheels is directed towards from target parking spot 806 and a leftward facing arrow indicates that the front set of wheels is directed towards target parking spot 806) (e.g., a horizontal arrow indicates that the front set of wheels is parallel with target parking spot 806 and a vertical arrow indicates that the front set of wheels is perpendicular with target parking spot 806). In some embodiments, the front set of wheels is configured to not be controlled by the user (e.g., and/or be controlled by movable computer system 600 instead of the user) throughout at least a portion of set of arrows 852 as discussed above. In some embodiments, movable computer system 600 causes the front set of wheels to converge on a first angle as movable computer system 600 travels in the backward direction towards target parking spot 806 (e.g., an angle that is perpendicular or approximately perpendicular to a curb, such as similar to arrow 808*d*2 in FIG. 4B) and movable computer system 600 causes the back set of wheels to converge on a second angle (e.g., an angle that is parallel or substantially parallel to the curb, such as illustrated by arrow 810*e*2) as movable computer system 600 angles downwards towards target parking spot 806.

The positioning of the back set of wheels as movable computer system 600 navigates to target parking spot 806 at FIG. 4C does not mimic the positioning of the back set of wheels as movable computer system 600 navigates to target parking spot 806 at FIG. 4B. More specifically, arrow 808*b*1 in FIG. 4B indicates that the back set of wheels is angled towards target parking spot for a second point in time while arrow 810*b*1 in FIG. 4C indicates that the back set of wheels is perpendicular to target parking spot 806 for a second point in time. Accordingly, movable computer system 600 navigates along a different path to target parking spot 806 at FIG. 4B in contrast to the path movable computer system 600 navigates along at FIG. 4C.

At FIG. 4C, at both respective positions of the front set of wheels that is represented by arrow 810*a*2 and 810*b*2, a determination is made (e.g., by movable computer system 600 and/or by another computer system that is in communication with movable computer system 600) that continuing along a current path of movable computer system 600 will cause movable computer system 600 to be correctly aligned within target parking spot 806. Because a determination is made that if movable computer system 600 continues along the current path of movable computer system 600 then movable computer system 600 will be correctly aligned within target parking spot 806, movable computer system 600 causes the front set of wheels to be positioned such that movable computer system 600 does not deviate from its current path.

Between the positioning of the front set of wheels that corresponds to arrow 810*b*2 and arrow 810*c*2, a determination is made (e.g., by movable computer system 600 and/or by another computer system that is in communication with movable computer system 600) that continuing along the current path of movable computer system 600 will cause movable computer system 600 to be misaligned within target parking spot 806. Because a determination is made that continuing along the current path of movable computer system 600 will cause movable computer system 600 to be misaligned within target parking spot 806, movable computer system 600 causes the front of wheels to be adjusted to an angle that causes movable computer system 600 to deviate from the current path to a new path.

Accordingly, the orientation of arrow 810*c*2 at FIG. 4C is different than the orientation of arrow 808*c*2 at FIG. 4B. More specifically, at arrow 810*c*2, the front set of wheels is perpendicular with respect to the position of target parking spot 806 such that movable computer system 600 is moved perpendicular to target parking spot 806 while, at arrow 808*c*2, the front set of wheels is angled towards the rear of target parking spot 806 such that movable computer system 600 is moved at an angle with respect to target parking spot 806.

At FIG. 4C, at the position of the front set of wheels that is represented arrows 810*d*2 and 810*e*2, a determination is made (e.g., by movable computer system 600 and/or by another computer system that is in communication with movable computer system 600) that continuing along the new path of movable computer system 600 will cause movable computer system 600 to be aligned within target parking spot 806. Because a determination is made that continuing along the new path of movable computer system 600 will cause movable computer system 600 to be aligned within target parking spot 806, movable computer system 600 causes the front set of wheels to be positioned at an angle such that movable computer system 600 does not deviate from the new path of movable computer system 600.

FIG. 5 is a flow diagram illustrating a method (e.g., method 900) for configuring a movable computer system in accordance with some embodiments. Some operations in method 900 are, optionally, combined, the orders of some operations are, optionally, changed, and some operations are, optionally, omitted.

As described below, method 900 provides an intuitive way for configuring a movable computer system. Method 900 reduces the cognitive burden on a user for configuring a movable computer system, thereby creating a more efficient human-machine interface. For battery-operated computing devices, enabling a user to configure a movable computer system faster and more efficiently conserves power and increases the time between battery charges.

In some embodiments, method 900 is performed at a computer system (e.g., 600 and/or 1100) that is in communication with a first movement component (e.g., 602 and/or 604) (e.g., an actuator, a wheel, and/or an axel) and a second movement component (e.g., 602 and/or 604) different from (e.g., separate from and/or not directly connected to) the first movement component. In some embodiments, the computer system is a watch, a phone, a tablet, a processor, a head-mounted display (HMD) device, a vehicle, and/or a personal computing device. In some embodiments, the computer system is in communication with one or more cameras (e.g., one or more telephoto, wide angle, and/or ultra-wide-angle cameras). In some embodiments, the first movement component is located on a first side of the computer system. In some embodiments, the second movement component is located on a second side different and/or opposite from the first side. In some embodiments, the first side of the computer system is the front and/or front side of the computer system and the second side of the computer system is the back and/or back side of the computer system and/or vice-versa. In some embodiments, the first movement component primarily causes a change in orientation of the first side of the computer system, causes the first side of the computer system to change position more than the second side of the computer system changes position, and/or impacts the first side of the computer system more than the second side of the computer system. In some embodiments, the second movement component primarily causes a change in orientation of the second side of the computer system, causes the second side of the computer system to change position more than the first side of the computer system, and/or impacts the second side of the computer system more than the first side of the computer system changes the position.

While detecting a target location (e.g., 606*b*) (e.g., the destination, a target destination, a stopping location, a parking spot, a demarcated area, and/or a pre-defined area) in a physical environment (e.g., and while the first movement component is moving in a first direction and/or the second movement component is moving in a second direction (e.g., the same as or different from the first direction)) (e.g., and/or in response to detecting a current location of the computer system relative to the target location), the computer system detects (902) an event with respect to the target location (e.g., as described above in relation to FIG. 2A). In some embodiments, detecting the event includes detecting that the computer system is within a predefined distance from the target location. In some embodiments, detecting the event includes detecting, via an input component in communication with the computer system, an input corresponding to a request to assist navigation to the target location. In some embodiments, detecting the event includes detecting a current angle of the first and/or second movement component.

In response to detecting the event and in accordance with a determination that a first set of one or more criteria is satisfied (e.g., the first set of one or more criteria is different from the respective set of one or more criteria), the computer system configures (904) (e.g., maintains configuration or changes configuration of) (e.g., based on a distance, location, and/or direction of the target location relative to the computer system) (e.g., based on an angle of the second movement component) one or more angles of one or more movement components (e.g., 602 and/or 604) (e.g., a set of one or more movement components including the first movement component and the second movement component), wherein, after configuring the one or more angles of the one or more movement components in response to detecting the event and in accordance with the determination that the first set of one or more criteria is satisfied: an angle (e.g., 906) (e.g., a wheel angle, and/or a direction) of the first movement component (e.g., 602 and/or 604) is configured to be controlled in an automatic manner (e.g., an automatically and/or autonomously controlled manner) (e.g., by the computer system) (e.g., the angle corresponding to the first movement component is modified without detecting user input corresponding to a request to modify the angle corresponding to the first movement component and/or the angle corresponding to the first movement component is not modified directly in accordance with detected user input) and an angle (e.g., 908) of the second movement component (e.g., 602 and/or 604) is configured to be controlled in a manual manner (e.g., a manually controlled manner) different from the automatic manner (e.g., in response to detecting input, the computer system modifies the angle of the first movement component and/or the angle of the second movement component in accordance with the input) (e.g., and/or while forgoing configuring the angle of the second movement component to be controlled by the computer system). In some embodiments, the target location is detected via one or more sensors (e.g., a camera, a depth sensor, and/or a gyroscope) in communication with the computer system (e.g., one or more sensors of the computer system). In some embodiments, the target location is detected via (e.g., based on and/or using) a predefined map of the physical environment. In some embodiments, the first set of one or more criteria includes a criterion that is satisfied when the computer system is in a first (e.g., semi-autonomous) mode. In some embodiments, the first set of one or more criteria includes a criterion that is satisfied when the computer system is within a predefined distance from and/or direction to the target location. In some embodiments, the first set of one or more criteria includes a criterion that is satisfied when input was detected that corresponds to a request to navigate to the target location. In some embodiments, the first set of one or more criteria includes a criterion that is satisfied when the computer system is moving in a third direction (e.g., the same as or different from the first and/or second direction) (e.g., at least partially toward the target location). In some embodiments, a steering mechanism (e.g., a steering wheel, a steering yoke, an input device, a touch screen, a physical hardware device, and/or any combination thereof) in communication with the computer system does not directly control the angle of the first movement component when the first set of one or more criteria is satisfied. In some embodiments, the steering mechanism does not directly control the angle of the first movement component when the first set of one or more criteria is satisfied. In some embodiments, the angle of the first movement component is reactive to the angle of the second movement component. In some embodiments, the angle of the first movement component is continued to be automatically modified until the computer system is a predefined distance (e.g., 0-2 feet) from the target location. In some embodiments, the manual manner is the first manner. In some embodiments, the automatic manner is the first manner. In some embodiments, the first manner is the manual manner and is not the automatic manner. In some embodiments, in response to detecting the change with respect to the computer system and the target location and in accordance with a determination that a second set of one or more criteria, different from the first set of one or more criteria is satisfied, the angle (e.g., a wheel angle, and/or a direction) of the first movement component and the angle of the second movement component continues to be controlled in the first manner. In some embodiments, in response to detecting the change with respect to the computer system and the target location and in accordance with a determination that a second set of one or more criteria, the computer system forgoes configuring the angle of the first movement component to be controlled in the automatic manner. In some embodiments, the event is detected while navigating to a destination in the physical environment. In some embodiments, the event is detected while the angle of the first movement component and the angle of the second movement component are configured to be controlled in a first manner (e.g., manually (e.g., by a user of the computer system and/or by a person), semi-manually, semi-autonomously, and/or fully autonomously (e.g., by one or more computer systems and not by a person and/or user of the computer system) (e.g., by the computer system and/or a user of the computer system)). In some embodiments, configuring the angle of the first movement component and the angle of the second movement component to be controlled in the first manner includes forgoing configuring the angle of the first movement component and/or the angle of the second movement component to be controlled by the computer system. In some embodiments, configuring the angle of the first movement component and the angle of the second movement component to be controlled in the first manner includes configuring the angle of the first movement component and/or the angle of the second movement component to be controlled based on input (e.g., user input) detected via one or more sensors in communication with the computer system. In some embodiments, the angle of the first movement component and the angle of the second movement component are configured to be controlled in the first manner when the computer system is configured to be at least partially manually controlled. In some embodiments, the angle of the first movement component and the angle of the second movement component are configured to be controlled in the first manner when the computer system is at least a predefined distance from the destination. In some embodiments, the angle of the first movement component and the angle of the second movement component are configured to be controlled in the first manner when the computer system is within a predefined distance from the destination. In some embodiments, in response to detecting the event and in accordance with a determination that a third set of one or more criteria is satisfied, configuring the angle of the first movement component and/or the angle of the second movement component to be manually controlled. In some embodiments, in response to detecting the event and in accordance with a determination that a fourth set of one or more criteria is satisfied, configuring the angle of the first movement component and/or the angle of the second movement component to be controlled (e.g., automatically, autonomously, and/or at least partially based on a portion (e.g., a detected object and/or a detected symbol) of the physical environment) by the computer system. In some embodiments, navigating includes displaying one or more navigation instructions corresponding to the destination. In some embodiments, navigating includes, at a first time, automatically controlling the first movement component and/or the second movement component based on a determined path to the destination. Causing an angle of the first movement component to be controlled in an automatic manner and an angle of the second movement component to be controlled in a manual manner in response to detecting an event and the first set of one or more criteria being satisfied allows the computer system to partially assist a user in reaching the target location, thereby reducing the number of inputs needed to perform an operation, providing additional control options without cluttering the user interface with additional displayed controls, and/or performing an operation when a set of conditions has been met without requiring further user input.

In some embodiments, after configuring the one or more angles of the one or more movement components (e.g., 602 and/or 604) (e.g., and/or while an angle of the first movement component is configured to be controlled in an automatic manner and an angle of the second movement component is configured to be controlled in a manual manner), the computer system detects a current angle of the second movement component (e.g., 602 and/or 604). In some embodiments, the current angle of the second movement component is set based on input detected via one or more input devices (e.g., a camera and/or a steering mechanism (e.g., a steering wheel, a steering yoke, an input device, a touch screen, a physical hardware device, and/or any combination thereof)) in communication with the computer system. In some embodiments, in response to detecting the current angle of the second movement component and in accordance with a determination that the current angle of the second movement component is a first angle, the computer system automatically modifies (e.g., based on the current angle of the second movement component) a current angle of the first movement component (e.g., 602 and/or 604) to be a second angle (e.g., from an angle to a different angle) (e.g., the first angle or a different angle) (e.g., without automatically modifying a current angle of the second movement component) (e.g., as described above in relation to FIG. 2B). In some embodiments, in response to detecting the current angle of the second movement component, the current angle of the first movement component is automatically modified a first amount in accordance with a determination that the current angle of the second movement component is the first angle. In some embodiments, in response to detecting the current angle of the second movement component and in accordance with a determination that the current angle of the second movement component is a third angle different from the first angle, the computer system automatically modifies (e.g., based on the current angle of the second movement component) the current angle of the first movement component to be a fourth angle (e.g., the second angle or an angle different from the second angle) different from the second angle (e.g., as described above in relation to FIG. 2B) (e.g., without automatically modifying a current angle of the second movement component). In some embodiments, the current angle of the first movement component is automatically modified in accordance with and/or based on the current angle of the second movement component. In some embodiments, the current angle of the first movement component is automatically modified to compensate for, match, offset, be opposite of the current angle of the second movement component. In some embodiments, the current angle of the first movement component is automatically modified relative to the target location (e.g., such that the computer system is directed, positioned, and/or oriented to head to the target location). In some embodiments, in response to detecting the current angle of the second movement component, the current angle of the first movement component is automatically modified a second amount different from the first amount in accordance with a determination that the current angle of the second movement component is the third angle. Automatically modifying a current angle of the first movement component based on a current angle of the second movement component allows the computer system to adapt the current of the first movement component (which, in some embodiments, is being automatically controlled) to the current angle of the second movement component (which, in some embodiments, is being manually controlled), thereby reducing the number of inputs needed to perform an operation, providing additional control options without cluttering the user interface with additional displayed controls, and/or performing an operation when a set of conditions has been met without requiring further user input.

In some embodiments, after configuring the one or more angles of the one or more movement components (e.g., 602 and/or 604) (e.g., and/or while an angle of the first movement component is configured to be controlled in an automatic manner and an angle of the second movement component is configured to be controlled in a manual manner), the computer system detects a current location of the computer system (e.g., 600 and/or 1100). In some embodiments in response to detecting the current location of the computer system and in accordance with a determination that the current location of the computer system is a first orientation (e.g., direction and/or heading) (and/or location) relative to the target location (e.g., 606*b*), the computer system automatically modifies a current angle of the first movement component (e.g., 602 and/or 604) to be a fifth angle (e.g., from an angle to a different angle) (e.g., without automatically modifying a current angle of the second movement component) (e.g., as described above in relation to FIG. 2B). In some embodiments, in response to detecting the current location of the computer system, the current angle of the first movement component is automatically modified a third amount in accordance with a determination that the current location of the computer system is the first orientation relative to the target location. In some embodiments, \In response to detecting the current location of the computer system and in accordance with a determination that the current location of the computer system is a second orientation relative to the target location, wherein the second orientation is different from the first orientation, the computer system automatically modifies (e.g., based on the second orientation) the current angle of the first movement component to be a sixth angle different from the fifth angle (e.g., as describe above in relation to FIG. 2B) (e.g., without automatically modifying a current angle of the second movement component). In some embodiments, the current angle of the first movement component is automatically modified in accordance with and/or based on the current location of the computer system. In some embodiments, the current angle of the first movement component is automatically modified to compensate for, match, offset, be opposite of a current angle of the second movement component. In some embodiments, the current angle of the first movement component is automatically modified relative to the target location (e.g., such that the computer system is directed, positioned, and/or oriented to head to the target location). In some embodiments, in response to detecting the current location of the computer system, the current angle of the first movement component is automatically modified a fourth amount different from the third amount in accordance with a determination that the current location of the computer system is the second orientation relative to the target location. Automatically modifying the current angle of the first movement component based on a current location of the computer system relative to the target location allows the computer system to automatically align the first movement component with the target location, thereby reducing the number of inputs needed to perform an operation, providing additional control options without cluttering the user interface with additional displayed controls, and/or performing an operation when a set of conditions has been met without requiring further user input.

In some embodiments, after configuring the one or more angles of the one or more movement components (e.g., 602 and/or 604) (e.g., and/or while an angle of the first movement component is configured to be controlled in an automatic manner and an angle of the second movement component is configured to be controlled in a manual manner), the computer system detects a current location of an object external to (e.g., and/or separate and/or different from) the computer system (e.g., 600 and/or 1100). In some embodiments, in response to detecting the current location of the object external to the computer system and in accordance with a determination that the current location of the object is a first location, the computer system automatically modifies a current angle of the first movement component (e.g., 602 and/or 604) to be a seventh angle (e.g., from an angle to a different angle) (e.g., without automatically modifying a current angle of the second movement component) (e.g., as described above in relation to FIG. 2B). In some embodiments, in response to detecting the current location of the object, the current angle of the first movement component is automatically modified a fifth amount in accordance with a determination that the current location of the object is the first location. In some embodiments, in response to detecting the current location of the object external to the computer system and in accordance with a determination that the current location of the object is a second location different from the first location, the computer system automatically modifies (e.g., based on the second location) the current angle of the first movement component to be an eighth angle different from the seventh angle (e.g., as described above in relation to FIG. 2B) (e.g., without automatically modifying a current angle of the second movement component). In some embodiments, the current angle of the first movement component is automatically modified in accordance with and/or based on a current location of the computer system. In some embodiments, the current angle of the first movement component is automatically modified to compensate for, match, offset, be opposite of a current angle of the second movement component. In some embodiments, the current angle of the first movement component is automatically modified relative to the target location (e.g., such that the computer system is directed, positioned, and/or oriented to head to the target location). In some embodiments, in response to detecting the current location of the object, the current angle of the first movement component is automatically modified a sixth amount different from the fifth amount in accordance with a determination that the current location of the object is the second location. Automatically modifying the current angle of the first movement component based on a current location of an object external to the computer system allows the computer system to avoid the object, thereby reducing the number of inputs needed to perform an operation, providing additional control options without cluttering the user interface with additional displayed controls, and/or performing an operation when a set of conditions has been met without requiring further user input.

In some embodiments, before detecting the event with respect to the target location (e.g., 606*b*), the computer system detects, via one or more input devices (e.g., the first movement component, the second movement component, a different movement component, a camera, a touch-sensitive surface, a physical input mechanism, a steering mechanism, and/or another computer system separate from the computer system) in communication with (e.g., of and/or integrated with) the computer system (e.g., 600 and/or 1100), an input (e.g., a tap input and/or non-tap input (e.g. a verbal instruction, a hand motion, a swipe motion, and/or a gaze direction) on a location corresponding to the target location and/or a control corresponding to the target location) corresponding to selection of the target location from one or more available locations (e.g., one or more known locations and/or detected locations, such as a location in a map and/or detected via a sensor of the computer system), wherein the event occurs while navigating to the target location (e.g., as described above in relation to FIG. 2A). In some embodiments, after and/or in response to detecting the input corresponding to selection of the target location, the computer system navigates to the target location. Causing an angle of the first movement component to be controlled in an automatic manner and an angle of the second movement component to be controlled in a manual manner while navigating to the target location allows the computer system to partially assist a user in reaching the target location, thereby reducing the number of inputs needed to perform an operation, providing additional control options without cluttering the user interface with additional displayed controls, and/or performing an operation when a set of conditions has been met without requiring further user input.

In some embodiments, the input corresponds to (e.g., manually maintaining when within a threshold distance from the target location, modifying, and/or changing) an angle of the second movement component (e.g., 602 and/or 604) (e.g., as described above in relation to FIG. 2A).

In some embodiments, after configuring the one or more angles of the one or more movement components (e.g., 602 and/or 604): an angle of a third movement component (e.g., 602 and/or 604) is configured to be controlled in the automatic manner (e.g., based on configuring the one or more angles); and an angle of a fourth movement component (e.g., 602 and/or 604) is configured to be controlled in the manual manner (e.g., based on configuring the one or more angles). In some embodiments, the third movement component is different from the first movement component (e.g., 602 and/or 604) and the second movement component (e.g., 602 and/or 604). In some embodiments, the fourth movement component is different from the first movement component, the second movement component, and the third movement component (e.g., as described above in relation to FIGS. 2A and 2B). In some embodiments, the third movement component is automatically modified differently than the first movement component when configured to be controlled in the automatic manner. Causing angles of multiple movement component to be controlled in an automatic manner and angles of multiple movement component to be controlled in a manual manner in response to detecting an event and the first set of one or more criteria being satisfied allows the computer system to partially assist a user in reaching the target location, thereby reducing the number of inputs needed to perform an operation, providing additional control options without cluttering the user interface with additional displayed controls, and/or performing an operation when a set of conditions has been met without requiring further user input.

In some embodiments, configuring the one or more angles of one or more movement components (e.g., 602 and/or 604) includes, in accordance with a determination that the target location (e.g., 606*b*) is a first type of target location (e.g., a parking spot perpendicular to traffic) (e.g., a location with a first orientation), configuring the angle of the first movement component (e.g., 602 and/or 604) to converge to (e.g., be, reach over time, and/or change over time to be) a target angle at the target location (e.g., as described above in relation to FIG. 2A). In some embodiments, configuring the angle of the first movement component to converge to the target angle at the target location includes configuring the angle of the first movement component to be an intermediate angle different from the target angle before reaching the target location. In some embodiments, the intermediate angle is an angle different from an angle of the first movement component when detecting the event. In some embodiments, the intermediate angle is an angle between an angle of the first movement component when detecting the event and the target angle. Configuring the angle of the first movement component to converge to a target angle at the target location allows the computer system to partially assist a user in reaching the target angle at the target location, thereby reducing the number of inputs needed to perform an operation, providing additional control options without cluttering the user interface with additional displayed controls, and/or performing an operation when a set of conditions has been met without requiring further user input.

In some embodiments, configuring the one or more angles of one or more movement components (e.g., 602 and/or 604) includes, in accordance with a determination that the target location (e.g., 606*b*) is a second type (e.g., different from the first type) of target location (e.g., a parking spot parallel to traffic) (e.g., a location with a second orientation different from the first orientation), configuring the angle of the first movement component (e.g., 602 and/or 604) to converge to (e.g., be, reach over time, and/or change over time to be): a first target angle at a first point of navigating to the target location and a second target angle at a second point (e.g., the target location or a different location) of navigating to the target location. In some embodiments, the second target angle is different from the first target angle. In some embodiments, the second point is different from the first point (e.g., as described above in relation to FIG. 2F). In some embodiments, configuring the angle of the first movement component to converge to the first target angle includes configuring the angle of the first movement component to be a first intermediate angle different from the first target angle before reaching the first point. In some embodiments, the first intermediate angle is an angle different from an angle of the first movement component when detecting the event. In some embodiments, the first intermediate angle is an angle between an angle of the first movement component when detecting the event and the first point. In some embodiments, configuring the angle of the first movement component to converge to the second target angle includes configuring the angle of the first movement component to be a second intermediate angle (e.g., different from the first intermediate angle) different from the second target angle before reaching the second point and/or the target location. In some embodiments, the second intermediate angle is an angle different from an angle of the first movement component when detecting the event and/or when at the first point. In some embodiments, the second intermediate angle is an angle between an angle of the first movement component when detecting the event (e.g., and/or when at the first point) and the second point (e.g., and/or the target location). Configuring the angle of the first movement component to converge to different target angles at different points while navigating to the target location allows the computer system to partially assist a user in reaching a final orientation at the target location, thereby reducing the number of inputs needed to perform an operation, providing additional control options without cluttering the user interface with additional displayed controls, and/or performing an operation when a set of conditions has been met without requiring further user input.

In some embodiments, configuring the one or more angles of one or more movement components (e.g., 602 and/or 604) includes, in accordance with a determination that the target location (e.g., 606*b*) is a third type (e.g., different from the first type and/or the second type) (e.g., the second type) of target location, configuring the angle of the first movement component (e.g., 602 and/or 604) to be controlled (1) in an automatic manner for a first portion of a maneuver (e.g., while navigating to the target location (e.g., after detecting the event)) (e.g., a set and/or course of one or more actions and/or movements along a path) and (2) in a manual manner for a second portion of the maneuver. In some embodiments, the second portion is different from the first portion (e.g., as described above in relation to FIG. 3A). In some embodiments, at least partially while the angle of the first movement component is configured to be controlled in an automatic manner, the angle of the second movement component is configured to controlled in a manual manner. In some embodiments, at least partially while the angle of the first movement component is configured to be controlled in a manual manner, the angle of the second movement component is configured to controlled in an automatic manner. Configuring the angle of the first movement component to be controlled (1) in an automatic manner for a first portion of a maneuver and (2) in a manual manner for a second portion of the maneuver. In some embodiments, the second portion is different from the first portion allows the computer system to adapt to different portions of the maneuver and provide assistance where needed, thereby reducing the number of inputs needed to perform an operation, providing additional control options without cluttering the user interface with additional displayed controls, and/or performing an operation when a set of conditions has been met without requiring further user input.

In some embodiments, in response to detecting the event and in accordance with a determination that a fifth set of one or more criteria is satisfied, wherein the fifth set of one or more criteria is different from the first set of one or more criteria (e.g., the fifth set of one or more criteria is different from the respective set of one or more criteria), the computer system configures (e.g., maintains configuration or changes configuration of) (e.g., based on a distance, location, and/or direction of the target location relative to the computer system) (e.g., based on an angle of the second movement component) one or more angles of one or more movement components (e.g., 602 and/or 604) (e.g., a set of one or more movement components including the first movement component and the second movement component), wherein the first set of one or more criteria includes a criterion that is satisfied in accordance with a determination that the computer system (e.g., 600 and/or 1100) is a first direction relative to the target location (e.g., 606*b*) when (e.g., and/or at the time of) detecting the event, wherein the fifth set of one or more criteria includes a criterion that is satisfied in accordance with a determination that the computer system is a second direction relative to the target location when (e.g., and/or at the time of) detecting the event, wherein the second direction is different from (e.g., opposite of) the first direction, and wherein, after configuring the one or more angles of the one or more movement components in response to detecting the event and in accordance with the determination that the fifth set of one or more criteria is satisfied (e.g., as described above at FIGS. 3A and 4A): an angle of the first movement component (e.g., 602 and/or 604) is configured to be controlled in a manual manner (e.g., and/or while forgoing configuring the angle of the first movement component to be controlled by the computer system) and an angle of the second movement component (e.g., 602 and/or 604) is configured to be controlled in an automatic manner. In some embodiments, the fifth set of one or more criteria includes a criterion that is satisfied when the computer system is in the first (e.g., semi-autonomous) mode. In some embodiments, the fifth set of one or more criteria includes a criterion that is satisfied when the computer system is within a predefined distance from and/or direction to the target location. In some embodiments, the fifth set of one or more criteria includes a criterion that is satisfied when input was detected that corresponds to a request to navigate to the target location. In some embodiments, a steering mechanism (e.g., a steering wheel, a steering yoke, an input device, a touch screen, a physical hardware device, and/or any combination thereof) in communication with the computer system does not directly control the angle of the second movement component when the fifth set of one or more criteria is satisfied. In some embodiments, the steering mechanism does not directly control the angle of the first movement component when the fifth set of one or more criteria is satisfied. In some embodiments, the angle of the second movement component is reactive to the angle of the first movement component. In some embodiments, the angle of the second movement component is continued to be automatically modified until the computer system is a predefined distance (e.g., 0-2 feet) from the target location. Controlling different movement components depending on a direction of the computer system relative to the target location allows the computer system to adapt to different orientations and/or approaches to the target location, thereby reducing the number of inputs needed to perform an operation, providing additional control options without cluttering the user interface with additional displayed controls, and/or performing an operation when a set of conditions has been met without requiring further user input.

In some embodiments, after detecting the event and while navigating to the target location (e.g., 606*b*) (e.g., and/or while an angle of the first movement component is configured to be controlled in an automatic manner and an angle of the second movement component is configured to be controlled in a manual manner), the computer system detects misalignment of the second movement component (e.g., 602 and/or 604) relative to the target location (e.g., while the second movement component is being controlled in a manual manner). In some embodiments, in response to detecting misalignment of the second movement component relative to the target location, the computer system provides, via one or more output devices (e.g., a speaker, a display generation component, and/or a steering mechanism) in communication with the computer system (e.g., 600 and/or 1100), feedback (e.g., visual, auditory, and/or haptic feedback) with respect to a current angle of the second movement component (e.g., as described above in relation to FIG. 2B). In some embodiments, the feedback corresponds to an angle different from the current angle (e.g., suggesting to change the current angle of the second movement component to the angle different from the current angle). Providing feedback with respect to a current angle of the second movement component in response to detecting misalignment of the second movement component relative to the target location allows the computer system to prompt a user when the misalignment occurs and enable the user to fix the misalignment, thereby providing improved feedback and/or performing an operation when a set of conditions has been met without requiring further user input.

In some embodiments, while an angle of the first movement component (e.g., 602 and/or 604) is configured to be controlled in an automatic manner and before reaching the target location (e.g., **606*b*) (e.g., and, in some embodiments, while automatically modifying a current angle of the first movement component), the computer system detects, via one or more input devices in communication with the computer system (e.g., 600 and/or 1100), a second input. In some embodiments, the second input corresponds to a request to stop controlling the first movement component in an automatic manner. In some embodiments, in response to detecting the second input, the computer system configures an angle of the first movement component to be controlled in a manual manner (e.g., as described above in relation to FIG. 2**A). Configuring an angle of the first movement component to be controlled in a manual manner instead of an automatic manner in response to detecting input while the angle of the first movement component is controlled in an automatic manner allows the computer system to respond to input by a user and switch modes in an efficient manner, thereby providing improved feedback, reducing the number of inputs needed to perform an operation, providing additional control options without cluttering the user interface with additional displayed controls, and/or performing an operation when a set of conditions has been met without requiring further user input.

In some embodiments, while an angle of the first movement component (e.g., 602 and/or 604) is configured to be controlled in an automatic manner and before reaching the target location (e.g., **606*b*) (e.g., and, in some embodiments, while automatically modifying a current angle of the first movement component), the computer system detects, via one or more input devices in communication with the computer system (e.g., 600 and/or 1100), an object. In some embodiments, object is detected in and/or relative to a direction of motion of the computer system. In some embodiments, in response to detecting the object, the computer system configures an angle of the first movement component to be controlled in an automatic manner using a first path, wherein, before detecting the object, configuring the one or more angles of the one or more movement components (e.g., 602 and/or 604) in response to detecting the event includes configuring an angle of the first movement component to be controlled in an automatic manner using a second path different from the first path (e.g., as described above in relation to FIG. 2**A). Configuring an angle of the first movement component to be controlled in an automatic manner using a different path in response to detecting an object allows the computer system to avoid the object, thereby reducing the number of inputs needed to perform an operation, providing additional control options without cluttering the user interface with additional displayed controls, and/or performing an operation when a set of conditions has been met without requiring further user input.

In some embodiments, after configuring the one or more angles of the one or more movement components (e.g., 602 and/or 604) in response to detecting the event and in conjunction with configuring an angle of the first movement component (e.g., 602 and/or 604) to be controlled in an automatic manner (e.g., and/or in conjunction with automatically modifying a current angle of the first movement component), the computer system causes the computer system (e.g., 600 and/or 1100) to accelerate (e.g., when not going quick enough to reach a particular location within the target location) or deaccelerate (e.g., as described above in relation to FIG. 2A) (e.g., in response to detecting that the computer system is within a predefined distance of (e.g., 0-5 feet) the target location) (e.g., while the second movement component is configured to be controlled in a manual manner). Causing the computer system to accelerate or decelerate when automatically controlling an angle of the first movement components allows the computer system to ensure that the computer system is going the right speed to reach and not exceed the target location, thereby reducing the number of inputs needed to perform an operation, providing additional control options without cluttering the user interface with additional displayed controls, and/or performing an operation when a set of conditions has been met without requiring further user input. In some embodiments, a computer-generated path to the target location is generated based on data captured by a different computer system separate from the computer system.

Note that details of the processes described above with respect to method 900 (e.g., FIG. 5) are also applicable in an analogous manner to other methods described herein. For example, method 1200 optionally includes one or more of the characteristics of the various methods described above with reference to method 900. For example, one or movement components can be configured to be controlled in an automatic and/or manual manner using one or more techniques described above in relation to method 900 where feedback can be provided once the one or more components are configured using one or more techniques described below in relation to method 1200. For brevity, these details are not repeated below.

FIGS. 6A-6B is a flow diagram illustrating a method (e.g., method 1000) for selectively modifying movement components of a movable computer system in accordance with some embodiments. Some operations in method 1000 are, optionally, combined, the orders of some operations are, optionally, changed, and some operations are, optionally, omitted.

As described below, method 1000 provides an intuitive way for selectively modifying movement components of a movable computer system. Method 1000 reduces the cognitive burden on a user for selectively modifying movement components of a movable computer system, thereby creating a more efficient human-machine interface. For battery-operated computing devices, enabling a user to use a movable computer system faster and more efficiently conserves power and increases the time between battery charges.

In some embodiments, method 1000 is performed at a computer system (e.g., 600 and/or 1100) (e.g., as described above with respect to method 900) that is in communication with a first movement component (e.g., 602 and/or 604) (e.g., as described above with respect to method 900) and a second movement component (e.g., 602 and/or 604) different from (e.g., separate from and/or not directly connected to) the first movement component.

The computer system detects (1002) a target location (e.g., 606*b*) (e.g., as described above with respect to method 900) in a physical environment.

While (1004) detecting the target location in the physical environment and in accordance with (1006) a determination that a first set of one or more criteria is satisfied, wherein the first set of one or more criteria includes a criterion that is satisfied when the computer system (e.g., 600 and/or 1100) is operating in a first mode (e.g., a semi-autonomous mode and/or a partially autonomous mode), the computer system automatically modifies (1008) (e.g., as described above with respect to method 900) the first movement component (e.g., 602 and/or 604) (e.g., an angle (e.g., a wheel angle, a direction, and/or any combination thereof) of and/or corresponding to the first movement component, a speed of and/or corresponding to the first movement component, an acceleration of and/or corresponding to the first movement component, a size of and/or corresponding to the first movement component, a shape of and/or corresponding to the first movement component, a temperature of and/or corresponding to the first movement component) (e.g., the first movement component is modified without detecting user input corresponding to a request to modify the first movement component) (e.g., as described above in relation to FIG. 2A).

While (1004) detecting the target location in the physical environment and in accordance with (1006) the determination that the first set of one or more criteria is satisfied, wherein the first set of one or more criteria includes the criterion that is satisfied when the computer system is operating in the first mode, the computer system forgoes (1010) automatically modifying (e.g., as described above with respect to method 900) the second movement component (e.g., as described above in relation to FIG. 2A) (e.g., 602 and/or 604) (e.g., an angle (e.g., a wheel angle, a direction, and/or any combination thereof) of and/or corresponding to the second movement component, a speed of and/or corresponding to the second movement component, an acceleration of and/or corresponding to the second movement component, a size of and/or corresponding to the second movement component, a shape of and/or corresponding to the second movement component, a temperature of and/or corresponding to the second movement component). In some embodiments, the first set of one or more criteria includes a criterion that is satisfied when the computer system is within a predefined distance from and/or direction to the target location. In some embodiments, the first set of one or more criteria includes a criterion that is satisfied when input was detected that corresponds to a request to navigate to the target location. In some embodiments, the first set of one or more criteria includes a criterion that is satisfied when the computer system is moving in a third direction (e.g., the same as or different from the first and/or second direction) (e.g., at least partially toward the target location). In some embodiments, a steering mechanism (e.g., a steering wheel, a steering yoke, an input device, a touch screen, a physical hardware device, and/or any combination thereof) in communication with the computer system does not directly control the first movement component. In some embodiments, a state of the first movement component is reactive to a state of the second movement component. In some embodiments, the first movement component is continued to be automatically modified until the computer system is a predefined distance (e.g., 0-2 feet) from the target location.

While (1004) detecting the target location in the physical environment and in accordance with a determination that a second set of one or more criteria is satisfied, wherein the second set of one or more criteria includes a criterion that is satisfied when the computer system (e.g., 600 and/or 1100) is operating in a second mode (e.g., a full autonomous mode and/or a mode that is more autonomous than the first mode) different from the first mode, the computer system automatically modifies (1012) the first movement component (e.g., 602 and/or 604) and the second movement component (e.g., 602 and/or 604), wherein the second set of one or more criteria is different from the first set of one or more criteria (e.g., as described above in relation to FIG. 2A). In some embodiments, the second set of one or more criteria includes a criterion that is satisfied when the computer system is within a predefined distance from and/or direction to the target location. In some embodiments, the second set of one or more criteria includes a criterion that is satisfied when input was detected that corresponds to a request to navigate to the target location. In some embodiments, the second set of one or more criteria includes a criterion that is satisfied when the computer system is moving in the third direction. In some embodiments, a steering mechanism (e.g., a steering wheel, a steering yoke, an input device, a touch screen, a physical hardware device, and/or any combination thereof) in communication with the computer system does not directly control the first movement component and/or the second movement component. In some embodiments, a state of the first movement component is reactive to a state of the second movement component. In some embodiments, the first movement component and/or the second movement component is continued to be automatically modified until the computer system is a predefined distance (e.g., 0-2 feet) from the target location.

While (1004) detecting the target location in the physical environment and in accordance with a determination that a third set of one or more criteria is satisfied, wherein the third set of one or more criteria includes a criterion that is satisfied when the computer system (e.g., 600 and/or 1100) is operating in a third mode (e.g., a manual mode, a non-autonomous mode, and/or a mode that is less autonomous than the first mode and the second mode) different from the second mode and the first mode, the computer system forgoes (1014) automatically modifying the first movement component (e.g., 602 and/or 604) and the second movement component (e.g., 602 and/or 604) (e.g., as described above in relation to FIG. 2A), wherein the third set of one or more criteria is different from the first set of one or more criteria and the second set of one or more criteria. In some embodiments, the third set of one or more criteria includes a criterion that is satisfied when the computer system is within a predefined distance from and/or direction to the target location. In some embodiments, the third set of one or more criteria includes a criterion that is satisfied when input was detected that corresponds to a request to navigate to the target location. In some embodiments, the third set of one or more criteria includes a criterion that is satisfied when the computer system is moving in the third direction. In some embodiments, a steering mechanism (e.g., a steering wheel, a steering yoke, an input device, a touch screen, a physical hardware device, and/or any combination thereof) in communication with the computer system directly controls the first movement component and/or the second movement component. In some embodiments, a state of the first movement component is not reactive to a state of the second movement component. In some embodiments, a state of the second movement component is not reactive to a state of the first movement component. The computer system operating in three different modes that each have a different amount of automatic modification of movement components allows the computer system to adjust to different situations and assist in different amounts depending on a current situation, thereby providing additional control options without cluttering the user interface with additional displayed controls and/or performing an operation when a set of conditions has been met without requiring further user input.

In some embodiments, while the computer system (e.g., 600 and/or 1100) is operating in the first mode and while navigating to the target location (e.g., 606*b*) (e.g., and/or while performing a maneuver (e.g., automatically modifying the first movement component)), the computer system detects a first event (e.g., input corresponding to a request to change a mode that the computer is currently operating, input directed to one or more input devices in communication with the computer system, and/or input corresponding to manually changing a current angle of the second movement component). In some embodiments, in response to detecting the first event, the computer system automatically modifies the second movement component (e.g., 602 and/or 604) In some embodiments, in response to detecting the first event, the computer system forgoes automatically modifying the first movement component (e.g., 602 and/or 604) (e.g., as described above in relation to FIG. 2A). In some embodiments, in response to detecting the first event, the computer system causes the computer system to operate in the second mode or the third mode. In some embodiments, while the computer system is operating in the second mode and while navigating to the target location (e.g., and/or while performing a maneuver (e.g., automatically modifying the first movement component or the second movement component)), the computer system detects a second event (e.g., input corresponding to a request to change a mode that the computer is currently operating, input directed to one or more input devices in communication with the computer system, and/or input corresponding to manually changing a current angle of the first movement component and/or the second movement component). In some embodiments, in response to detecting the second event, the computer system forgoes automatically modifying the first movement component. In some embodiments, in response to detecting the second event, the computer system forgoes automatically modifying the second movement component (e.g., as described above in relation to FIG. 2A). In some embodiments, in response to detecting the second event, the computer system causes the computer system to operate in the first mode or the third mode. In some embodiments, while the computer system is operating in the third mode and while detecting the target location in the physical environment, the computer system detects a third event (e.g., input corresponding to a request to change a mode that the computer is currently operating, input directed to one or more input devices in communication with the computer system, and/or input corresponding to manually changing a current angle of the first movement component and/or the second movement component). In some embodiments, in response to detecting the third event, the computer system automatically modifies the first movement component. In some embodiments, in response to detecting the third event, the computer system automatically modifies the second movement component (e.g., as described above in relation to FIG. 2A). In some embodiments, in response to detecting the third event, the computer system causes the computer system to operate in the first mode or the second mode. Changing the mode that the computer is operating in while navigating to the target location allows the computer system to adjust to different situations and assist in different amounts depending on a current situation, thereby providing additional control options without cluttering the user interface with additional displayed controls and/or performing an operation when a set of conditions has been met without requiring further user input.

In some embodiments, automatically modifying the first movement component (e.g., 602 and/or 604) includes automatically modifying an angle or (e.g., and/or) a speed of the first movement component. In some embodiments, automatically modifying the second movement component (e.g., 602 and/or 604) includes automatically modifying an angle or (e.g., and/or) a speed of the second movement component (e.g., as described above in relation to FIG. 2A). Automatically modifying an angle or a speed of a movement components depending on a current mode allows the computer system to adjust to different situations and assist in different amounts and/or ways depending on a current situation, thereby providing additional control options without cluttering the user interface with additional displayed controls and/or performing an operation when a set of conditions has been met without requiring further user input.

In some embodiments, the computer system (e.g., 600 and/or 1100) operates in the first mode (e.g., while detecting the target location in the physical environment) in accordance with a determination that the target location (e.g., 606*b*) is a first type. In some embodiments, the computer system operates in the second mode (e.g., while detecting the target location in the physical environment) in accordance with a determination that the target location is a second type different from the first type. In some embodiments, the computer system operates in the third mode (e.g., while detecting the target location in the physical environment) in accordance with a determination that the target location is a third type different from the first type and the second type (e.g., as described above in relation to FIG. 2A). In some embodiments, a mode of the computer system is selected based on a type of the target location. In some embodiments, a type of the target location is with respect to the target location and not with respect to the computer system (e.g., a type of the target location is based on the target location) (e.g., a type of the target location is not based on the computer system). In some embodiments, a type of the target location is with respect to the target location and the computer system (e.g., a type of the target location is based on the target location and the computer system). In some embodiments, a type of the target location is with respect to a direction of the target location relative to the computer system. Selecting which mode to operate depending on which type the target location is allows the computer system to adjust to different situations and assist in different amounts depending on a current situation, thereby providing additional control options without cluttering the user interface with additional displayed controls and/or performing an operation when a set of conditions has been met without requiring further user input.

In some embodiments, before automatically modifying the first movement component (e.g., 602 and/or 604) or the second movement component (e.g., 602 and/or 604) (e.g., and/or before or while detecting the target location) (e.g., and/or before navigating to the target location) (e.g., and/or before or while navigating to a target destination corresponding to and/or including the target location), the computer system detects, via one or more input devices (e.g., the first movement component, the second movement component, a different movement component, a camera, a touch-sensitive surface, a physical input mechanism, a steering mechanism, and/or another computer system separate from the computer system) in communication with the computer system (e.g., 600 and/or 1100), an input (e.g., a tap input and/or non-tap input (e.g. a verbal instruction, a hand motion, a swipe motion, and/or a gaze direction)) corresponding to selection of a respective mode to operate the computer system. In some embodiments, in response to detecting the input corresponding to selection of the respective mode to operate the computer system and in accordance with a determination that the respective mode is the first mode, the computer system operates the computer system in the first mode (e.g., as described above in relation to FIG. 2A). In some embodiments, in response to detecting the input corresponding to selection of the respective mode to operate the computer system and in accordance with a determination that the respective mode is the second mode, the computer system operates the computer system in the second mode (e.g., as described above in relation to FIG. 2A). In some embodiments, before forgoing automatically modifying the first movement component or the second movement component (e.g., and/or before or while detecting the target location) (e.g., and/or before navigating to the target location) (e.g., and/or before or while navigating to a target destination corresponding to and/or including the target location), the computer system detects, via one or more input devices in communication with the computer system, a second input corresponding to selection of a respective mode to operate the computer system; and in response to detecting the second input corresponding to selection of the respective mode to operate the computer system in accordance with a determination that the respective mode is the first mode, the computer system operates the computer system in the first mode and in accordance with a determination that the respective mode is the second mode, the computer system operates the computer system in the second mode and in accordance with a determination that the respective mode is the third mode, the computer system operates the computer system in the third mode.

In some embodiments, the input corresponding to selection of the respective mode to operate the computer system includes an input corresponding to (e.g., changing, modifying, and/or maintaining) an angle of the first movement component (e.g., 602 and/or 604) or (e.g., and/or) the second movement component (e.g., 602 and/or 604) (e.g., as described above in relation to FIG. 2A). Selecting different modes based on an angle of a movement component allows the computer system to adjust to different situations while detecting normal navigation inputs and without requiring an explicit request to change to a mode, thereby providing additional control options without cluttering the user interface with additional displayed controls and/or performing an operation when a set of conditions has been met without requiring further user input.

In some embodiments, while detecting the target location (e.g., 606*b*) in the physical environment, while navigating to the target location (e.g., before reaching the target location), while the computer system (e.g., 600 and/or 1100) is operating in the first mode, and after automatically modifying the first movement component (e.g., 602 and/or 604) (e.g., and/or while the second movement component is configured to be controlled in a manual manner), the computer system detects an event (e.g., detecting that the computer system is within a predefined distance from the target location, detecting that the computer system is a predefined direction and/or orientation with respect to the target location, and/or detecting that the computer system performed a particular operation and/or portion of a maneuver). In some embodiments, in response to detecting the event, the computer system forgoes automatically modifying the first movement component. In some embodiments, in response to detecting the event, the computer system automatically modifies the second movement component (e.g., 602 and/or 604) (e.g., while the computer system continues to operate in the first mode) (e.g., as described above in relation to FIG. 2A). In some embodiments, in response to detecting the event, the computer system configures (1) the first movement component to be controlled in a manual manner and (2) the second movement component to be controlled in an automatic manner. Changing which movement component is automatically controlled while navigating to the target location allows the computer system to adapt to different portions of the maneuver and provide assistance where needed, thereby reducing the number of inputs needed to perform an operation, providing additional control options without cluttering the user interface with additional displayed controls, and/or performing an operation when a set of conditions has been met without requiring further user input. In some embodiments, a computer-generated path to the target location is generated based on data captured by a different computer system separate from the computer system.

Note that details of the processes described above with respect to method 1000 (e.g., FIGS. 6A-6B) are also applicable in an analogous manner to other methods described herein. For example, method 900 optionally includes one or more of the characteristics of the various methods described above with reference to method 1000. For example, one or movement components can be configured to be controlled in an automatic and/or manual manner using one or more techniques described above in relation to method 900 where the computer system can adjust the one or more movement component based on how the one or more movement components are configured using one or more techniques described above in relation to method 1000. For brevity, these details are not repeated below.

FIGS. 7A-7D illustrate exemplary user interfaces for redirecting a movable computer system in accordance with some embodiments. The user interfaces in these figures are used to illustrate the processes described below, including the processes in FIGS. 8 and 9.

In some embodiments, FIGS. 7A-7D illustrate one or more scenarios, where navigation of a computer system is updated based on whether an error is detected in navigation (e.g., a failure to turn left within a time period and/or failure to turn right into a particular parking spot). In some embodiments, based on the error being detected in navigation, a user is provided with one or more options to change the navigation (e.g., change to navigate to a different target destination, such as a parking spot and/or a different type of location) and maintain the navigation (e.g., maintain the current navigation path and/or change navigation path to the original target destination).

In some embodiments, the navigation is automatically changed based on the error being detected in navigation. For example, a nearest possible destination (e.g., a parking spot) that is reachable is changed to be the target destination. For another example, one or more preferences of the user, one or more previous trips by the movable computer system, an object in nearest possible destination, an environmental state (e.g., shade and/or covering) of a possible destination, and/or a type of surface of a possible destination can be used, amongst other things, to determine where and/or how to change the navigation.

In some embodiments, feedback is generated at a portion of a computer system, such as a steering wheel, based on the error being detected in navigation. In some embodiments, the feedback guides a user to correct and/or automatically cause a computer system (e.g., a movable computer system, a smart phone, a smart watch, a tablet, and/or a laptop) to correct a navigation error for a desired navigational path, to avoid a navigation error for the desired navigational path, and/or continue to navigate on a desired navigational path.

Figure 7A:
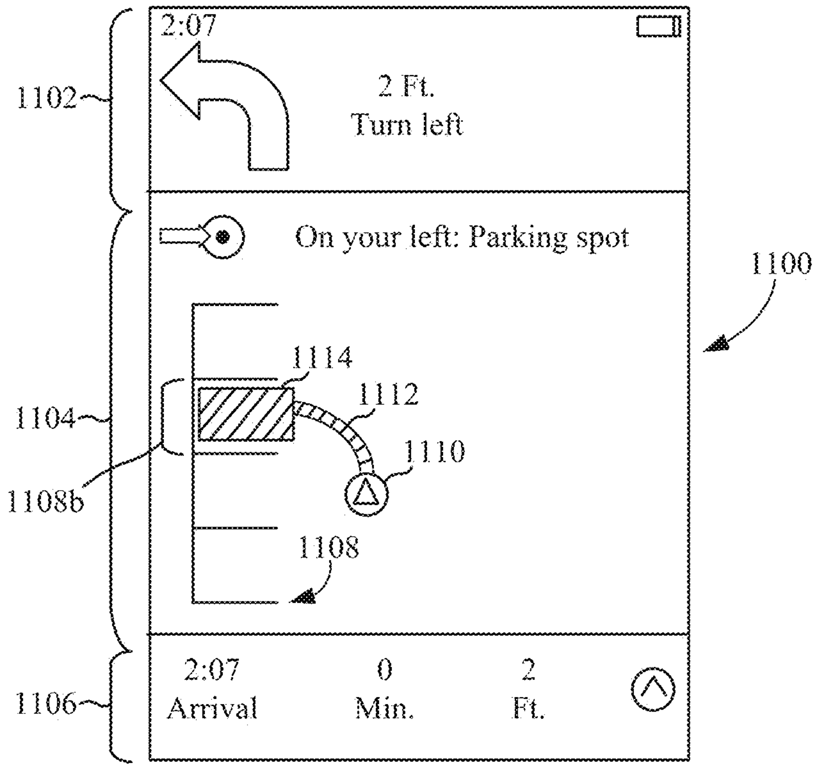
FIGS. 7A-7D illustrate exemplary diagrams for redirecting a movable computer system in accordance with some embodiments.

FIG. 7A illustrates computer system 1100. In some embodiments, computer system 1100 is the movable computer system. In other embodiments, computer system 1100 is in communication with the movable computer system. As illustrated in FIG. 7A, computer system 1100 displays navigation user interface 1122. Navigation user interface 1122 is displayed as a visual tool to assist a user in navigating to a target destination (e.g., a parking spot, a grocery store, an office building, and/or a home). At FIG. 7A, the target destination is a parking spot. As illustrated in FIG. 7A, navigation user interface 1122 includes navigation instructions 1102, navigation representation 1104, and destination information 1106. Navigation instructions 1102 includes both graphical (e.g., an arrow and/or a representation of a traffic signal) and textual instructions (e.g., turn left, turn right, and/or turn around) to assist the user in navigating towards the target destination. At FIG. 7A, navigation instructions 1102 indicate that the movable computer system must turn left in two feet.

Navigation representation 1104 includes movable computer system representation 1110, path representation 1112, parking spots representation 1108, target position representation 1114, and target destination representation 1108*b*. Target destination representation 1108*b* is a representation of the target destination of the movable computer system. In some embodiments, movable computer system representation 1110 is a real-time representation of the movable computer system that is navigating towards the target destination. The positioning of movable computer system representation 1110 and target destination representation 1108*b* within navigation user interface 1122 is representative of a real-world representation of the movable computer system relative to the target destination. Representation of path 1112 is a representation of the path that the movable computer system must travel such that the movable computer system navigates from the current position of the movable computer system to the target destination. Target position representation 1114 is a representation of a target position of the movable computer system once the movable computer system has arrived at the target destination.

Destination information 1106 includes information regarding the distance between the movable computer system and the target destination, the amount of time left that the movable computer system must travel before the movable computer system arrives at the target destination, and the estimated time at which the movable computer system will arrive at the target destination. At FIG. 7A, the movable computer system is traveling along in a forward direction along the path that is represented by path representation 1112.

Figure 7B:
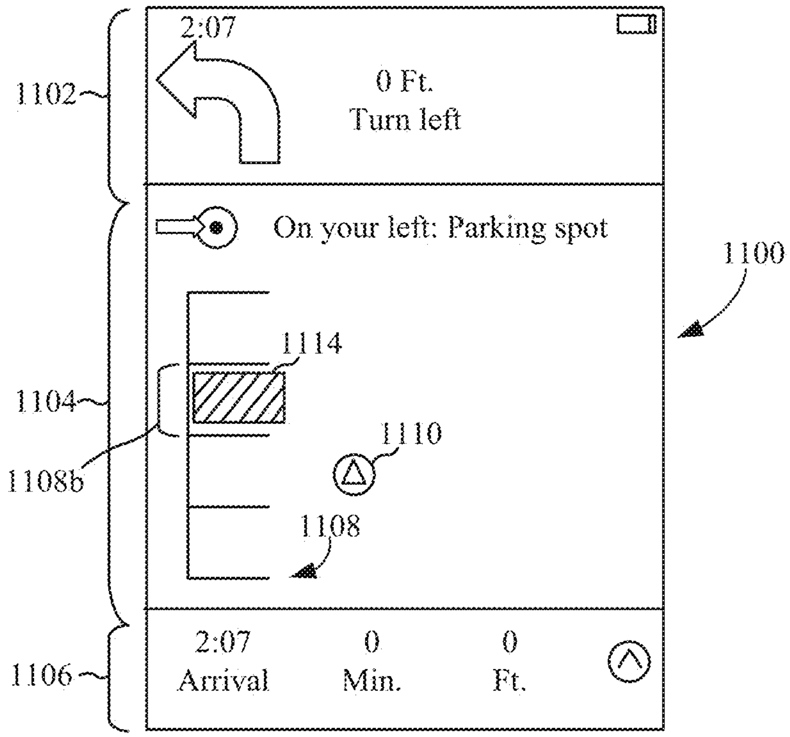

At FIG. 7B, a determination is made (e.g., by the movable computer system and/or by another computer system that is in communication with the movable computer system) that the movable computer system must turn left for the movable computer system to arrive at the target destination. Because a determination is made (e.g., by the movable computer system and/or by another computer system that is in communication with the movable computer system) that the movable computer system must turn left in order for the movable computer system to arrive at the target destination, computer system 1100 updates navigation instructions 1102 to indicate that the movable computer system must turn left in zero feet. Further, at FIG. 7B, computer system 1100 updates the display of path representation 1112 to indicate that the movable computer system must turn left to arrive at the target destination. At FIG. 7B, the movable computer system continues in a forward direction along the path and does not turn left.

Figure 7C:
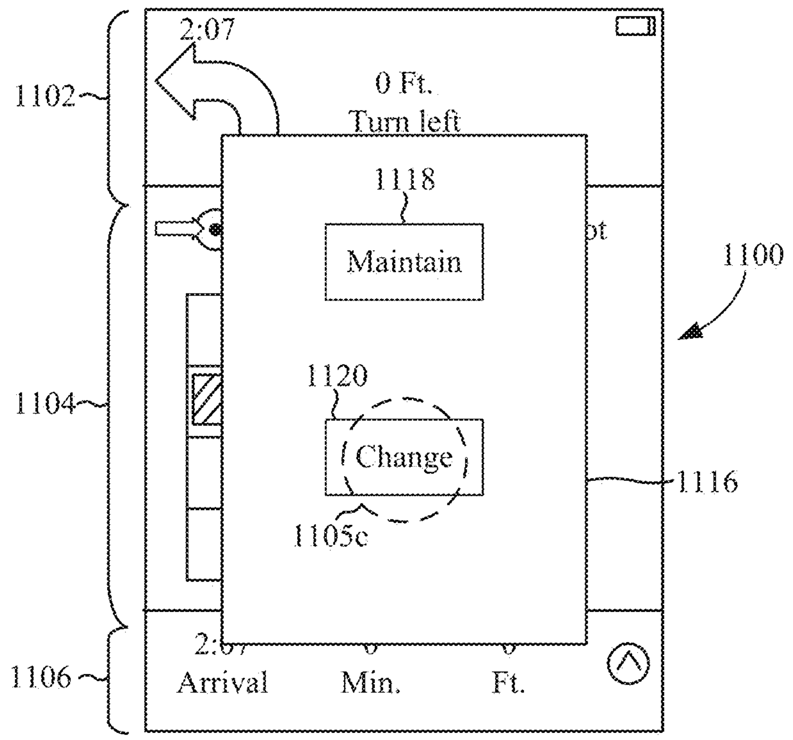

At FIG. 7C, a determination is made that the movable computer system has gone too far and cannot reach target position representation 1114 (or cannot park inside the parking spot, indicated by target destination representation 1108*b*). In order words, at FIG. 7C, a determination is made that an error has occur with respect to navigating to the target destination. As illustrated in FIG. 7C, computer system 1100 displays navigation decision user interface 1116, which includes maintain navigation control 1118 and change navigation control 1120. In some embodiments, maintain navigation control 1118 includes a representation (e.g., text, symbols, and/or arrows) of the current target destination and change navigation control 1120 includes a representation of a new target destination (e.g., target destination representation 1108*a* of FIG. 7D).

In some embodiments, navigation decision user interface 1116 includes an indication of an error, such as an indication of the movable computer system being out of range of the target destination, an indication that navigation of the movable computer system cannot be corrected to reach the target destination (e.g., cannot turn left when you are zero feet from the parking spot to enter into the parking spot). In some embodiments, in response to detecting an input directed to maintain navigation control 1118, computer system 1100 maintains display of navigation user interface 1122 of FIG. 7B and/or the movable computer system continues to navigate based on the previous navigation instructions (e.g., navigation instructions described above in relation to FIGS. 7A-7B). In some embodiments, in response to detecting an input directed to maintain navigation control 1118, computer system 1100 displays a new path to the target destination (e.g., target destination representation 1108*b* and not a new target destination, such as target destination representation 1108*a* of FIG. 7D). At FIG. 7C, movable computer system 600 detects input 1105*c*, which is directed to change navigation control 1120. In some embodiments, input 1105*c* includes a verbal input and/or one or more other inputs, such as a tap input, an air gesture, and/or a pressing input.

Figure 7D:
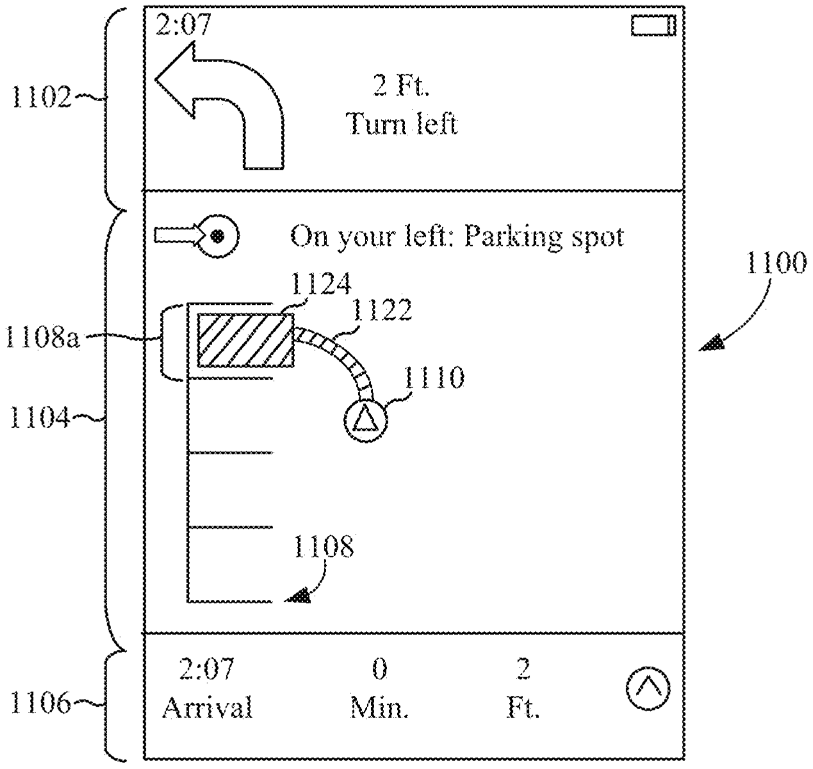

As illustrated in FIG. 7D, in response to detecting input 1105*c*, computer system 1100 updates display of navigation user interface 1122 with new navigation instructions. As illustrated in FIG. 7D, navigation user interface 1122 includes target position representation 1124 at target destination representation 1108*a*, which is a different parking spot than target destination representation 1108*b* of FIG. 7B. Target destination representation 1108*a* is further away from the movable computer system (e.g., as indicated by 1110) in FIG. 7D than target destination representation 1108*b* is from the movable computer system in FIG. 7D. At FIG. 7D, in response to detecting input 1105*c*, computer system 1100 has selected a different parking spot to which the movable computer system is able to navigate using navigation instructions 1102 of FIG. 7D. In some embodiments, in response to detecting input 1105*c*, computer system 1100, the movable computer system, or another computer system causes the movable computer system to automatically navigate differently (e.g., to navigate according to the changed navigation) (e.g., without detecting user input after detecting input 1105c) (e.g., at least partially navigate, where at least some components of the computer system are automatically controlled, or more-fully navigate, where an increased number and/or all components of the movable computer system are automatically controlled). In some embodiments, in response to detecting input 1105c, computer system 1100, the movable computer system, or another computer system does not cause the movable computer system to automatically navigate differently, rather the movable computer system is manually navigated. In some embodiments, maintain navigation control 1118 and/or change navigation control 1120 is provided via audio output, where a user is informed that options to maintain the current navigation and/or change the current navigation are available.

Looking back at FIG. 7C, one or more additional operations can be performed when the determination is made that an error has occur with respect to navigating to the target destination. In some embodiments, feedback is generated at a portion of the movable computer system (e.g., represented by movable computer system representation 1110). In some embodiments, the portion of the movable computer system is an input component, such as steering wheel, and/or a component that allows a user to navigate the movable computer system. In some embodiments, feedback includes one or more of visual, auditory, and/or haptic feedback. For example, feedback can include one or more lights of and/or that are in communication with the movable computer system to flash, one or more playback devices of and/or that are in communication with the movable computer system to output an audible tone, and/or one or more hardware components of and/or that are in communication with the movable computer system to pulsate.

In some embodiments, feedback can be generated at different portions of the movable computer system based on the determination is made that an error has occur with respect to navigating to the target destination. In some embodiments, feedback can be generated at a screen portion of the movable computer system and other feedback can be generated at a steering wheel portion of the movable computer system. In some embodiments, feedback can be generated at a particular portion of the movable computer system based on the distance that the moveable computer system is away from the target destination and/or how the movable computer system is currently moving with respect to the target destination. In some embodiments, feedback can be generated at the portion of the movable computer system based on an external object being detected (e.g., feedback can be generated that would prevent a steering wheel from being turned such that the movable computer system would hit a wall, tree, and/or stump).

In some embodiments, generating the feedback includes automatically rotating the portion of the movable computer system in a direction. Using the example above, in some embodiments, the portion of the movable computer system would be automatically rotated at FIG. 7C so that the movable computer system would start turning left according to navigation instructions 1102. Besides for automatically rotating the portion of the movable computer system in a direction, resistance could be increased and/or decreased to the portion of the movable computer system to generate the feedback. In such examples, an application of resistance could be increased to the portion of the movable computer system to prevent the user to turn right (e.g., because the user needs to turn left according to navigation instructions 1102) and/or an application of resistance could be decreased to the portion of the movable computer system to make turning the portion left easier. In some embodiments, feedback can be generated at the portion differently based on the distance from the target destination. In some embodiments, automatically rotating the portion of the movable computer system in a direction and/or increased and/or decreased to the portion of the movable computer system to generate the feedback can occur at a magnitude based on the distance between the movable computer system and a target destination and/or an obstacle. In some of these examples, the portion of the movable computer system is automatically rotated at a greater force as the movable computer system gets closer to the target destination (and a determination is made that the movable computer system is not on the correct path and/or is not navigating according to navigation instructions 1102).

FIG. 8 is a flow diagram illustrating a method (e.g., method 1200) for providing feedback based on an orientation of movable computer system in accordance with some embodiments. Some operations in method 1200 are, optionally, combined, the orders of some operations are, optionally, changed, and some operations are, optionally, omitted.

As described below, method 1200 provides an intuitive way for providing feedback based on an orientation of a movable computer system. Method 1200 reduces the cognitive burden on a user for providing feedback based on an orientation of a movable computer system, thereby creating a more efficient human-machine interface. For battery-operated computing devices, enabling a user to provide feedback based on an orientation of a movable computer system faster and more efficiently conserves power and increases the time between battery charges.

In some embodiments, method 1200 is performed at a computer system (e.g., 600 and/or 1100) (e.g., as described above with respect to method 900) that is in communication with an input component (e.g., a steering mechanism, a steering wheel, a steering yoke, an input device, a touch screen, a camera, and/or a physical hardware device) and an output component (e.g., 602 and/or 604) (e.g., an actuator, a wheel, and/or an axel), wherein the input component is configured to control an orientation (e.g., a direction and/or an angle) of the output component. In some embodiments, the input component is configured to detect input, such as input corresponding to a user of the computer system. In some embodiments, the input component detects input within an at least partial enclosure of the computer system. In some embodiments, the output movement is located on a first side of the computer system. In some embodiments, the output component primarily causes a change in orientation of the first side of the computer system. In some embodiments, the output component causes a change in direction, speed, and/or acceleration of the computer system.

The computer system detects (1202) a target location (606b, 706, 806, 1108b, and/or 1108a) (e.g., as described above with respect to method 900 and/or method 1000) in a physical environment.

While (1204) detecting the target location (606b, 706, 806, 1108b, and/or 1108a) in the physical environment (e.g., and while the output component is moving in a first direction) (e.g., and/or in response to detecting a current location of the computer system relative to the target location) (e.g., and while the computer system is in a first (e.g., semi-automatic) and/or a third (e.g., manual) mode, as described above with respect to method 1000) and in accordance with a determination that a first set of one or more criteria is satisfied, wherein the first set of one or more criteria includes a criterion that is satisfied when the computer system (e.g., 600 and/or 1100) is in a first orientation with respect to the target location (606b, 706, 806, 1108b, and/or 1108a), the computer system provides (1206) first feedback (e.g., visual, auditory, and/or haptic) with respect to (e.g., using, based on, via, by, and/or in proximity to) the input component (e.g., as described above in relation to FIG. 7C). In some embodiments, the first feedback does not change an orientation and/or position of the computer system. In some embodiments, the first feedback indicates, corresponds to, and/or is with respect to a new orientation with respect to the target location, the new orientation different from the first orientation. In some embodiments, the first feedback is provided internal to an enclosure corresponding to the computer system.

While (1204) detecting the target location in the physical environment and in accordance with a determination that a second set of one or more criteria is satisfied, wherein the second set of one or more criteria includes a criterion that is satisfied when the computer system (e.g., 600 and/or 1100) is in a second orientation with respect to the target location (606*b*, 706, 806, 1108*b*, and/or 1108*a*), the computer system provides (1208) second feedback (e.g., visual, auditory, and/or haptic) with respect to the input component, wherein the second set of one or more criteria is different from the first set of one or more criteria, wherein the second orientation is different from the first orientation, and wherein the second feedback is different from the first feedback (e.g., as described above in relation to FIG. 7C). In some embodiments, the second feedback is a different type of feedback than the first feedback. In some embodiments, the second feedback is the same type of feedback as the first feedback. In some embodiments, the second feedback does not change an orientation and/or position of the computer system. In some embodiments, the second feedback indicates, corresponds to, and/or is with respect to a new orientation with respect to the target location, the new orientation different from the first orientation. In some embodiments, the second feedback is provided internal to an enclosure corresponding to the computer system. Providing different feedback depending on an orientation of the computer system with respect to the target location allows the computer system to guide and/or assist with navigating to the target location, thereby providing improved feedback, reducing the number of inputs needed to perform an operation, and/or performing an operation when a set of conditions has been met without requiring further user input.

In some embodiments, providing the first feedback includes rotating the input component (e.g., a rotatable input mechanism). In some embodiments, providing the second feedback includes rotating the input component (e.g., as described above in relation to FIG. 7C). In some embodiments, providing the first feedback includes rotating the input component a first amount. In some embodiments, providing the second feedback includes rotating the input component a second amount different from the first amount. In some embodiments, providing the first feedback includes rotating the input component a first direction. In some embodiments, providing the second feedback includes rotating the input component a second direction different from the first direction. Rotating the input component to provide feedback allows the computer system to assist navigation with respect to an input component used for the navigation, thereby providing improved feedback, reducing the number of inputs needed to perform an operation, and/or performing an operation when a set of conditions has been met without requiring further user input.

In some embodiments, providing the first feedback includes adding or reducing an amount of resistance to movement of the input component (e.g., as described above in relation to FIG. 7C) (e.g., the input component becomes harder (e.g., when adding the amount of resistance) or easier (e.g., when reducing the amount of resistance) to rotate and/or more). Adding or reducing an amount of resistance of the input component allows the computer system to assist navigation with respect to an input component used for the navigation, thereby providing improved feedback, reducing the number of inputs needed to perform an operation, and/or performing an operation when a set of conditions has been met without requiring further user input.

In some embodiments, while detecting the target location (606*b*, 706, 806, 1108*b*, and/or 1108*a*) in the physical environment and in accordance with a determination that a third set of one or more criteria is satisfied, wherein the third set of one or more criteria includes a criterion that is satisfied when the computer system (e.g., 600 and/or 1100) is at a first location with respect (e.g., relative) to the target location, the computer system provides third feedback (e.g., visual, auditory, and/or haptic) with respect to (e.g., using, based on, via, by, and/or in proximity to) the input component (e.g., as described above in relation to FIG. 7C). In some embodiments, the third feedback does not change an orientation and/or position of the computer system. In some embodiments, the third feedback indicates, corresponds to, and/or is with respect to a new location with respect to the target location, the new location different from the first location and/or the second location. In some embodiments, the third feedback is provided internal to an enclosure corresponding to the computer system. In some embodiments, the third feedback is different from the first feedback and the second feedback. In some embodiments, the third feedback is the same as the first feedback or the second feedback. In some embodiments, while detecting the target location in the physical environment and in accordance with a determination that a fourth set of one or more criteria is satisfied, wherein the fourth set of one or more criteria includes a criterion that is satisfied when the computer system is at a second location with respect to the target location, the computer system provides fourth feedback (e.g., visual, auditory, and/or haptic) with respect to the input component, wherein the fourth set of one or more criteria is different from the third set of one or more criteria, wherein the second location is different from the first location, and wherein the fourth feedback is different from the third feedback (e.g., as described above in relation to FIG. 7C). In some embodiments, the fourth feedback is a different type of feedback than the third feedback. In some embodiments, the fourth feedback is the same type of feedback as the third feedback. In some embodiments, the fourth feedback does not change an orientation and/or position of the computer system. In some embodiments, the third feedback indicates, corresponds to, and/or is with respect to a new location with respect to the target location, the new location different from the third location, the second location, and/or the first location. In some embodiments, the fourth feedback is provided internal to an enclosure corresponding to the computer system. In some embodiments, the fourth feedback is different from the first feedback and the second feedback. In some embodiments, the fourth feedback is the same as the first feedback or the second feedback. Providing different feedback depending on a location of the computer system with respect to the target location allows the computer system to guide and/or assist with navigating to the target location, thereby providing improved feedback, reducing the number of inputs needed to perform an operation, and/or performing an operation when a set of conditions has been met without requiring further user input.

In some embodiments, while detecting the target location (606*b*, 706, 806, 1108*b*, and/or 1108*a*) in the physical environment and in accordance with a determination that a fifth set of one or more criteria is satisfied, wherein the fifth set of one or more criteria includes a criterion that is satisfied in accordance with detection of an object external to the computer system (e.g., 600 and/or 1100), the computer system provides fifth feedback (e.g., visual, auditory, and/or haptic) with respect to (e.g., using, based on, via, by, and/or in proximity to) the input component (e.g., as described above in relation to FIG. 7C). In some embodiments, the fifth feedback does not change an orientation and/or position of the computer system. In some embodiments, the fifth feedback indicates, corresponds to, and/or is with respect to a new location and/or a new orientation with respect to the target location. In some embodiments, the fifth feedback is provided internal to an enclosure corresponding to the computer system. In some embodiments, the fifth feedback is different from the first feedback, the second feedback, the third feedback, and/or the fourth feedback. In some embodiments, the third feedback is the same as the first feedback, the second feedback, the third feedback, and/or the fourth feedback. In some embodiments, while detecting the target location in the physical environment and in accordance with a determination that the fifth set of one or more criteria is not satisfied (e.g., in accordance with a determination that the object and/or no object is detected with respect to the target location), the computer system forgoes providing the fifth feedback with respect to the input component (e.g., as described above in relation to FIG. 7C). In some embodiments, in accordance with a determination that the fifth set of one or more criteria is not satisfied (e.g., in accordance with a determination that the object and/or no object is detected with respect to the target location), forgoing providing feedback (e.g., any feedback) with respect to the input component. Providing different feedback depending on whether an object external to the computer system is detected allows the computer system to guide and/or assist with navigating to the target location, thereby providing improved feedback, reducing the number of inputs needed to perform an operation, and/or performing an operation when a set of conditions has been met without requiring further user input.

In some embodiments, while detecting the target location (606*b*, 706, 806, 1108*b*, and/or 1108*a*) in the physical environment and in accordance with a determination that a sixth set of one or more criteria is satisfied, wherein the sixth set of one or more criteria includes a criterion that is satisfied when the computer system (e.g., 600 and/or 1100) is a first distance from the target location, the computer system provides sixth feedback (e.g., visual, auditory, and/or haptic) with respect to (e.g., using, based on, via, by, and/or in proximity to) the input component (e.g., as described above in relation to FIG. 7C). In some embodiments, the sixth feedback does not change an orientation and/or position of the computer system. In some embodiments, the sixth feedback indicates, corresponds to, and/or is with respect to a new location and/or a new orientation with respect to the target location. In some embodiments, the sixth feedback is provided internal to an enclosure corresponding to the computer system. In some embodiments, the sixth feedback is different from the first feedback, the second feedback, the third feedback, the fourth feedback, and/or the fifth feedback. In some embodiments, the sixth feedback is the same as the first feedback, the second feedback, the third feedback, the fourth feedback, and/or the fifth feedback. In some embodiments, while detecting the target location in the physical environment and in accordance with a determination that a seventh set of one or more criteria is satisfied, wherein the seventh set of one or more criteria includes a criterion that is satisfied when the computer system is a second distance from the target location, the computer system provides seventh feedback (e.g., visual, auditory, and/or haptic) with respect to the input component (e.g., without providing the sixth feedback), wherein the seventh set of one or more criteria is different from the sixth set of one or more criteria, wherein the second distance is different from the first distance, and wherein the seventh feedback is different from the sixth feedback (e.g., as described above in relation to FIG. 7C). In some embodiments, the seventh feedback is a different type of feedback than the sixth feedback. In some embodiments, the seventh feedback is the same type of feedback as the sixth feedback. In some embodiments, the seventh feedback does not change an orientation and/or position of the computer system. In some embodiments, the seventh feedback indicates, corresponds to, and/or is with respect to a new location with respect to the target location. In some embodiments, the seventh feedback is provided internal to an enclosure corresponding to the computer system. In some embodiments, the seventh feedback is different from the first feedback, the second feedback, the third feedback, the fourth feedback, the fifth feedback, and/or the sixth feedback. In some embodiments, the fourth feedback is the same as the first feedback, the second feedback, the third feedback, the fourth feedback, the fifth feedback, and/or the sixth feedback. In some embodiments, in accordance with a determination that the sixth set of one or more criteria is satisfied, the computer system does not provide the seventh feedback. Providing different feedback depending on a distance of the computer system from the target location allows the computer system to guide and/or assist with navigating to the target location, thereby providing improved feedback, reducing the number of inputs needed to perform an operation, and/or performing an operation when a set of conditions has been met without requiring further user input.

In some embodiments, while detecting the target location (606*b*, 706, 806, 1108*b*, and/or 1108*a*) in the physical environment, the computer system performs a movement maneuver (e.g., as described above in relation to FIGS. 2A-2D, 3A, and/or 4A) with respect to the target location, wherein performing the movement maneuver includes: in accordance with a determination that a current portion (e.g., a previous operation, a current operation, and/or a next operation) of the movement maneuver is a first portion (and/or that one or more criteria is satisfied), providing eighth feedback (e.g., visual, auditory, and/or haptic) with respect to (e.g., using, based on, via, by, and/or in proximity to) the input component (e.g., as described above in relation to FIG. 7C) and in accordance with a determination that the current portion of the movement maneuver is a second portion different from the first portion (and/or that one or more criteria is satisfied), providing ninth feedback (e.g., visual, auditory, and/or haptic) with respect to the input component (e.g., without providing the eighth feedback), wherein the ninth feedback is different from the eighth feedback (e.g., as described above in relation to FIG. 7C). In some embodiments, the eighth feedback does not change an orientation and/or position of the computer system. In some embodiments, the eighth feedback indicates, corresponds to, and/or is with respect to a new location and/or a new orientation with respect to the target location. In some embodiments, the eighth feedback is provided internal to an enclosure corresponding to the computer system. In some embodiments, the eighth feedback is different from the first feedback, the second feedback, the third feedback, the fourth feedback, the fifth feedback, the sixth feedback, and/or the seventh feedback. In some embodiments, the eighth feedback is the same as the first feedback, the second feedback, the third feedback, the fourth feedback, the fifth feedback, the sixth feedback, and/or the seventh feedback. In some embodiments, the ninth feedback is a different type of feedback than the eighth feedback. In some embodiments, the ninth feedback is the same type of feedback as the eighth feedback. In some embodiments, the ninth feedback does not change an orientation and/or position of the computer system. In some embodiments, the ninth feedback indicates, corresponds to, and/or is with respect to a new location with respect to the target location. In some embodiments, the ninth feedback is provided internal to an enclosure corresponding to the computer system. In some embodiments, the ninth feedback is different from the first feedback, the second feedback, the third feedback, the fourth feedback, the fifth feedback, the sixth feedback, and/or the seventh feedback. In some embodiments, the ninth feedback is the same as the first feedback, the second feedback, the third feedback, the fourth feedback, the fifth feedback, the sixth feedback, the seventh feedback, and/or the eighth feedback. In some embodiments, in accordance with a determination that the current portion of the movement maneuver is the first portion, the computer system does not provide the ninth feedback. Providing different feedback depending on a current portion of a maneuver allows the computer system to guide and/or assist with navigating to the target location, thereby providing improved feedback, reducing the number of inputs needed to perform an operation, and/or performing an operation when a set of conditions has been met without requiring further user input.

In some embodiments, the ninth feedback is a different type of feedback (e.g., from auditory to visual to haptic to physical rotation) than the eighth feedback (e.g., as described above in relation to FIG. 7C). Providing different types of feedback depending on a current portion of a maneuver allows the computer system to guide and/or assist with navigating to the target location, thereby providing improved feedback, reducing the number of inputs needed to perform an operation, and/or performing an operation when a set of conditions has been met without requiring further user input.

In some embodiments, providing the first feedback includes displaying a visual cue, providing an auditory cue, or (e.g., and/or) providing haptic feedback (e.g., as described above in relation to FIG. 7C). In some embodiments, a computer-generated path to the target location is generated based on data captured by a different computer system separate from the computer system.

Note that details of the processes described above with respect to method 1200 (e.g., FIG. 8) are also applicable in an analogous manner to other methods described herein. For example, method 1200 optionally includes one or more of the characteristics of the various methods described above with reference to method 1200. For example, one or movement components can be configured to be controlled in an automatic and/or manual manner using one or more techniques described above in relation to method 900 where feedback can be provided once the one or more components are configured using one or more techniques described above in relation to method 1200. For brevity, these details are not repeated below.

FIG. 9 is a flow diagram illustrating a method (e.g., method 1300) for redirecting a movable computer system in accordance with some embodiments. Some operations in method 1300 are, optionally, combined, the orders of some operations are, optionally, changed, and some operations are, optionally, omitted.

As described below, method 1300 provides an intuitive way for redirecting a movable computer system. Method 1300 reduces the cognitive burden on a user for redirecting a movable computer system, thereby creating a more efficient human-machine interface. For battery-operated computing devices, enabling a user to redirect a movable computer system faster and more efficiently conserves power and increases the time between battery charges.

In some embodiments, method 1300 is performed at a computer system (e.g., 600 and/or 1100) (e.g., as described above with respect to method 900) in communication with an input component (e.g., a steering mechanism, a steering wheel, a steering yoke, an input device, a touch screen, a camera, and/or a physical hardware device). In some embodiments, the computer system is in communication with an output component (e.g., a touch screen, a speaker, and/or a display generation component). In some embodiments, the input component is configured to detect input, such as input corresponding to a user of the computer system. In some embodiments, the input component detects input within an at least partial enclosure of the computer system.

After detecting, via the input component, a first set of one or more inputs corresponding to selection of a first target location (e.g., 1108*a* and/or 1108*b*) (e.g., a target destination, a stopping location, a parking spot, a demarcated area, and/or a pre-defined area) (examples of the first input include a tap input and/or non-tap input (e.g. a verbal instruction, a hand motion, a swipe motion, and/or a gaze direction) on a location corresponding to the target location and/or a control corresponding to the target location) and while navigating (e.g., manually, via providing one or more instructions, and/or at least partially automatically via the computer system) to the first target location (e.g., and/or after performing one or more operations corresponding to navigating to the target location), the computer system detects (1302) (e.g., via one or more sensors in communication with the computer system and/or via receiving a message from another computer system different from the computer system) an error (e.g., (1) an instruction of the one or more instructions not followed (2) a difficulty and/or impossibility with respect to a current location (e.g., target location has been blocked, target location is no longer in path of computer system, and/or target location has does not currently satisfy one or more criteria (e.g., is no longer and/or more desirable and/or is no longer and/or more convenient) and navigating to the target location according to a previously determined path, and/or (3) a statement and/or request made by a user of the computer system and/or detected via the one or more sensors) with respect to navigating to the first target location (e.g., as described above in relation to FIGS. 7B and 7C). In some embodiments, a sensor of the one or more sensors includes a camera, a gyroscope, and/or a depth sensor). In some embodiments, the error is detected after detecting, via the input component, a first set of one or more inputs corresponding to selection of the first target location (examples of the first input include a tap input and/or non-tap input (e.g. a verbal instruction, a hand motion, a swipe motion, and/or a gaze direction) on a location corresponding to the target location and/or a control corresponding to the target location).

In response to detecting the error, the computer system initiates (1304) a process to select a respective target location (e.g., as described above in relation to FIG. 7C) (e.g., 1108*a* and/or 1108*b*) (e.g., maintain the first target location or change to a second target location different from the first target location). In some embodiments, initiating the process to select the respective target location includes providing (e.g., displays and/or outputs (e.g., auditorily and/or visually)), via the output component, a control (e.g., a user-interface element that, when selected, performs an operation). In some embodiments, the control is displayed on top of (e.g., at least partially overlays) a user interface displayed when the error is detected. In some embodiments, the control is displayed with and/or instead of a user interface displayed when the error is detected. In some embodiments, a user interface, displayed when the error is detected, is visually changed to include display of the control. In some embodiments, after providing (e.g., when the providing is verbal) (and, in some embodiments, while providing (e.g., when the providing is verbal and/or visual)) (e.g., within a predefined time of providing) the control, detecting, via the input component, a second set of one or more inputs (e.g., a tap input and/or non-tap input (e.g. a verbal instruction, a hand motion, a swipe motion, a gaze direction, and/or any combination there)) corresponding to the control (e.g., selection of the control). In some embodiments, in response to detecting the second set of one or more inputs: in accordance with a determination that the control corresponds to maintaining the first target location, the computer system initiates a process to maintain the first target location (e.g., updating and/or providing one or more new instructions) (e.g., changing a path to the target location) (e.g., providing one or more new options for navigating to the target location) (e.g., providing a control to confirm that the target location should be maintained) and in accordance with a determination that the control corresponds to changing the first target location, the computer system initiates a process to change the first target location. In some embodiments, a single control is displayed that, when selected at different portions, either initiates a process to maintain the first target location or initiates a process to change the first target location. In some embodiments, a first control is configured to initiate a process to maintain the first target location, and a second control different from the first control is configured to initiate a process to change the first target location. In some embodiments, the control corresponds to a new target location. In some embodiments, the process to change the first target location includes displaying a user interface including one or more representations of different target locations. In some embodiments, the process to change the first target location includes displaying a user interface including a confirmation element to confirm a new target location. Initiating a process to select a respective target location in response to detecting an error with respect to navigating to the first target location allows the computer system to provide options to react to the error and, in some embodiments, navigate to a different location, thereby providing improved feedback reducing the number of inputs needed to perform an operation, providing additional control options without cluttering the user interface with additional displayed controls, and/or performing an operation when a set of conditions has been met without requiring further user input.

In some embodiments, the process to select a respective target location (e.g., 1108*a* and/or 1108*b*) includes: providing (e.g., displaying and/or outputting audio) a first control (e.g., 1118) to maintain the first target location and providing (e.g., concurrently with or separate from providing the first control) a second control (1120) to select a new target location different from the first target location. In some embodiments, the second control is different from the first control. Providing two separate controls to select different target locations in response to detecting an error with respect to navigating to the first target location allows the computer system to provide options to react to the error and, in some embodiments, navigate to a different location, thereby providing improved feedback reducing the number of inputs needed to perform an operation, providing additional control options without cluttering the user interface with additional displayed controls, and/or performing an operation when a set of conditions has been met without requiring further user input.

In some embodiments, the computer system (e.g., 600 and/or 1100) is in communication with a display generation component. In some embodiments, providing the second control (e.g., 1120) includes displaying, via the display generation component, an indication corresponding to the new target location (e.g., 1108*a* and/or 1108*b*) (e.g., as described above in relation to FIG. 7C) (e.g., a representation of the new target location relative to the first target location) (e.g., an outline and/or other visual indication at location corresponding to the new target location). Displaying an indication corresponding to the new target location when providing two separate controls to select different target locations in response to detecting an error with respect to navigating to the first target location allows the computer system to provide options to react to the error and, in some embodiments, navigate to a different location, thereby providing improved feedback reducing the number of inputs needed to perform an operation, providing additional control options without cluttering the user interface with additional displayed controls, and/or performing an operation when a set of conditions has been met without requiring further user input.

In some embodiments, the computer system (e.g., 600 and/or 1100) is in communication with a movement component (e.g., as described above with respect to method 900). In some embodiments, navigating to the first target location (e.g., 1108*a* and/or 1108*b*) includes automatically causing, by the computer system, the movement component to change operation (e.g., as described above in relation to FIG. 7D) (e.g., change to a new direction, orientation, location, speed, and/or acceleration). In some embodiments, navigating to the first target location is performed in an at least partial automatic and/or autonomous manner. In some embodiments, navigating to the first target location is performed in a partially assisted manner (e.g., a first part of navigating is performed in a manual manner and a second part of navigating is performed in an automatic manner) (e.g., a first movement component is controlled in an automatic manner while a second movement component is controlled in a manual manner). Automatically causing the movement component to change operation when navigating to the first target location allows the computer system to assist in navigation, thereby providing improved feedback, reducing the number of inputs needed to perform an operation, and/or performing an operation when a set of conditions has been met without requiring further user input.

In some embodiments, navigating to the first target location (e.g., 1108*a* and/or 1108*b*) is manual (e.g., navigating to the first target location is fully controlled by a user) (e.g., a direction of navigating to the first target location is fully controlled by a user) (e.g., from the perspective of a user causing the computer system to turn and/or move) (e.g., fully manual and/or without substantial automatic steering). In some embodiments, the computer system is in communication with one or more output components (e.g., a display generation component and/or a speaker). In some embodiments, navigating to the first target location consists of outputting, via the output component, content (e.g., does not include automatically modifying an angle and/or orientation of one or more movement components (as described above)). In some embodiments, the computer system is in communication with a movement component (e.g., as described above with respect to method 900). In some embodiments, navigating to the first target location does not include the computer system causing the movement component to be automatically modified. In some embodiments, navigating to the first target location includes outputting, via the one or more output components, an indication of a next maneuver to navigate to the target location.

In some embodiments, detecting the error includes detecting that the computer system (e.g., 600 and/or 1100) is at least a predefined distance from the first target location (e.g., 1108*a* and/or 1108*b*) (e.g., as described above in relation to FIG. 7C). In some embodiments, the error is not detected in accordance with a determination that the computer system is within the predefined distance from the first target location. Detecting the error including detecting that the computer system is at least a predefined distance from the first target location allows the computer system to recognize when the computer system has missed and/or passed the first target location and provide a way to fix the error, thereby providing improved feedback, reducing the number of inputs needed to perform an operation, and/or performing an operation when a set of conditions has been met without requiring further user input.

In some embodiments, detecting the error includes detecting that a current orientation of the computer system (e.g., 600 and/or 1100) is a first orientation (e.g., an orientation that is not able to be corrected by the computer system using a current path to the first target location) with respect to the first target location (e.g., 1108*a* and/or 1108*b*) (e.g., as described above in relation to FIG. 7C). In some embodiments, the error is not detected in accordance with a determination that the computer system is a second orientation with respect to the first target location, where the second orientation is different from the first orientation. Detecting the error including detecting that a current orientation of the computer system is a first orientation with respect to the first target location allows the computer system to recognize when the computer system is in an orientation not able to be corrected with a current path and provide a way to fix the error, thereby providing improved feedback, reducing the number of inputs needed to perform an operation, and/or performing an operation when a set of conditions has been met without requiring further user input.

In some embodiments, the computer system (e.g., 600 and/or 1100) is in communication with an output component. In some embodiments, after initiating the process to select a respective target location (e.g., 1108*a* and/or 1108*b*) (e.g., as part of the process to select a respective target location), the computer system provides, via the output component, a third control (e.g., 1116) to select a new target location different from the first target location, wherein the new target location is the same type of location as the first target location (e.g., as described above in FIGS. 7C-7D) (e.g., the first target location and the new target location are both parking spots with lines defining a respective parking spot). In some embodiments, while providing the control to select a new target location, the computer system does not provide a control to select a new target location that is a different type of location than the first target location. Providing a control to select a new target location that is the same type as the first target location allows the computer system to intelligently provide alternatives, thereby providing improved feedback, reducing the number of inputs needed to perform an operation, and/or performing an operation when a set of conditions has been met without requiring further user input.

In some embodiments, the computer system (e.g., 600 and/or 1100) is in communication with a second display generation component. In some embodiments, after initiating the process to select a respective target location (e.g., 1108*a* and/or 1108*b*) (e.g., as part of the process to select a respective target location), the computer system displays, via the second display generation component, a fourth control (e.g., 1116) to select the respective target location (e.g., as described above at FIG. 7C).

In some embodiments, while displaying the fourth control to select the respective target location (e.g., 1108*a* and/or 1108*b*), the computer system detects, via a second input component in communication with the computer system (e.g., 600 and/or 1100), a verbal input corresponding to selection of the fourth control (e.g., as described above in relation to FIG. 7C). In some embodiments, in response to detecting the verbal input corresponding to selection of the fourth control, the computer system initiates a process to navigate to the respective target location (e.g., as described above in relation to FIG. 7D). Allowing verbal input to select a visual control allows the computer system to provide different ways to provide input particularly when some ways, in some embodiments, may be harder to provide (e.g., hands might be occupied) than others, thereby reducing the number of inputs needed to perform an operation and/or performing an operation when a set of conditions has been met without requiring further user input.

In some embodiments, the computer system (e.g., 600 and/or 1100) is in communication with an audio generation component. In some embodiments, after initiating the process to select a respective target location (e.g., 1108*a* and/or 1108*b*) (e.g., as part of the process to select a respective target location), the computer system outputs, via the audio generation component, an auditory indication of a fifth control to select the respective target location (e.g., as described above at FIG. 7C). Outputting an auditory indication of a control to select the respective target location allows the computer system to provide different ways to provide output particularly when some ways, in some embodiments, may be harder to receive (e.g., gaze might be occupied such that seeing what is displayed may be harder) than others, thereby providing improved feedback, reducing the number of inputs needed to perform an operation, and/or performing an operation when a set of conditions has been met without requiring further user input.

In some embodiments, the computer system (e.g., 600 and/or 1100) is in communication with an output component and a second input component. In some embodiments, after initiating the process to select a respective target location (e.g., 1108*a* and/or 1108*b*) (e.g., as part of the process to select a respective target location), the computer system detects, via the second input component, an input corresponding to selection of a sixth control (e.g., 1118) to maintain the first target location (e.g., 1108*a* and/or 1108*b*). In some embodiments, in response to detecting the input corresponding to the selection of the sixth control (1118) to maintain the first target location, the computer system outputs, via the output component, an indication of a new path to the first target location (e.g., as described above in relation to FIGS. 7C and 7D). In some embodiments, before outputting the indication of the new path to the first target location (and/or while navigating to the first target location), the computer system outputs, via the output component, an indication of a path to the first target location, where the path is different from the new path. Outputting an indication of a new path to the first target location in response to detecting the input corresponding to the selection of the control to maintain the first target location allows the computer system to correct an error and provide instruction to a user for how to correct the error, thereby providing improved feedback, reducing the number of inputs needed to perform an operation, and/or performing an operation when a set of conditions has been met without requiring further user input.

In some embodiments, the output component includes a display generation component. In some embodiments, outputting, via the output component, the indication of the new path to the first target location (e.g., 1108*a* and/or 1108*b*) includes displaying, via the display generation component, the indication of the new path to the first target location (e.g., as described above in relation to FIGS. 7C and 7D).

In some embodiments, the computer system (e.g., 600 and/or 1100) is in communication with a second input component. In some embodiments, after initiating the process to select a respective target location (e.g., 1108*a* and/or 1108*b*) (e.g., as part of the process to select a respective target location), the computer system detects, via the second input component, an input (1105*c*) corresponding to selection of a control (1120) to change the first target location to a second target location different from the first target location. In some embodiments, in response to detecting the input corresponding to the selection of the control to change the first target location to the second target location, the computer system navigates at least partially automatically to the second target location (e.g., as described above in relation to FIG. 7D). Navigating at least partially automatically to the second target location in response to detecting the input corresponding to the selection of the control to change the first target location to the second target location allows the computer system to assist with navigation when an error is detected, thereby providing improved feedback, reducing the number of inputs needed to perform an operation, and/or performing an operation when a set of conditions has been met without requiring further user input. In some embodiments, a computer-generated path to the target location is generated based on data captured by a different computer system separate from the computer system.

Note that details of the processes described above with respect to method 1300 (e.g., FIG. 9) are also applicable in an analogous manner to the methods described herein. For example, method 900 optionally includes one or more of the characteristics of the various methods described above with reference to method 1300. For example, one or movement components can be configured to be controlled in an automatic and/or manual manner using one or more techniques described above in relation to method 900 based on the detection of an error using one or more techniques described above in relation to method 1300. For brevity, these details are not repeated below.

This disclosure, for purpose of explanation, has been described with reference to specific embodiments. The discussions above are not intended to be exhaustive or to limit the disclosure and/or the claims to the specific embodiments. Modifications and/or variations are possible in view of the disclosure. Some embodiments were chosen and described in order to explain principles of techniques and their practical applications. Others skilled in the art are thereby enabled to utilize the techniques and various embodiments with modifications and/or variations as are suited to a particular use contemplated.

Although the disclosure and embodiments have been fully described with reference to the accompanying drawings, it is to be noted that various changes and/or modifications will become apparent to those skilled in the art. Such changes and/or modifications are to be understood as being included within the scope of this disclosure and embodiments as defined by the claims.

It is the intent of this disclosure that any personal information of users should be gathered, managed, and handled in a way to minimize risks of unintentional and/or unauthorized access and/or use.

Therefore, although this disclosure broadly covers use of personal information to implement one or more embodiments, this disclosure also contemplates that embodiments can be implemented without the need for accessing such personal information.

What is claimed is:

1. A method, comprising:

at a computer system that is in communication with a first movement component and a second movement component different from the first movement component:

while detecting a target location in a physical environment, detecting an event with respect to the target location; and in response to detecting the event and in accordance with a determination that a first set of one or more criteria is satisfied, configuring one or more angles of one or more movement components, wherein, after configuring the one or more angles of the one or more movement components in response to detecting the event and in accordance with the determination that the first set of one or more criteria is satisfied:

an angle of the first movement component is configured to be controlled in an automatic manner; and an angle of the second movement component is configured to be controlled in a manual manner different from the automatic manner.

2. The method of claim 1, further comprising:

after configuring the one or more angles of the one or more movement components, detecting a current angle of the second movement component; and in response to detecting the current angle of the second movement component:

in accordance with a determination that the current angle of the second movement component is a first angle, automatically modifying a current angle of the first movement component to be a second angle; and in accordance with a determination that the current angle of the second movement component is a third angle different from the first angle, automatically modifying the current angle of the first movement component to be a fourth angle different from the second angle.

3. The method of claim 1, further comprising:

after configuring the one or more angles of the one or more movement components, detecting a current location of the computer system; and in response to detecting the current location of the computer system:

in accordance with a determination that the current location of the computer system is a first orientation relative to the target location, automatically modifying a current angle of the first movement component to be a fifth angle; and in accordance with a determination that the current location of the computer system is a second orientation relative to the target location, wherein the second orientation is different from the first orientation, automatically modifying the current angle of the first movement component to be a sixth angle different from the fifth angle.

4. The method of claim 1, further comprising:

after configuring the one or more angles of the one or more movement components, detecting a current location of an object external to the computer system; and in response to detecting the current location of the object external to the computer system:

in accordance with a determination that the current location of the object is a first location, automatically modifying a current angle of the first movement component to be a seventh angle; and in accordance with a determination that the current location of the object is a second location different from the first location, automatically modifying the current angle of the first movement component to be an eighth angle different from the seventh angle.

5. The method of claim 1, further comprising:

before detecting the event with respect to the target location, detecting, via one or more input devices in communication with the computer system, an input corresponding to selection of the target location from one or more available locations, wherein the event occurs while navigating to the target location.

6. The method of claim 5, wherein the input corresponds to an angle of the second movement component.

7. The method of claim 1, wherein, after configuring the one or more angles of the one or more movement components:

an angle of a third movement component is configured to be controlled in the automatic manner; and an angle of a fourth movement component is configured to be controlled in the manual manner, wherein the third movement component is different from the first movement component and the second movement component, and wherein the fourth movement component is different from the first movement component, the second movement component, and the third movement component.

8. The method of claim 1, wherein configuring the one or more angles of the one or more movement components includes, in accordance with a determination that the target location is a first type of target location, configuring the angle of the first movement component to converge to a target angle at the target location.

9. The method of claim 1, wherein configuring the one or more angles of the one or more movement components includes, in accordance with a determination that the target location is a second type of target location, configuring the angle of the first movement component to converge to:

a first target angle at a first point of navigating to the target location; and a second target angle at a second point of navigating to the target location, wherein the second target angle is different from the first target angle, and wherein the second point is different from the first point.

10. The method of claim 1, wherein configuring the one or more angles of the one or more movement components includes, in accordance with a determination that the target location is a third type of target location, configuring the angle of the first movement component to be controlled in an automatic manner for a first portion of a maneuver and in a manual manner for a second portion of the maneuver, and wherein the second portion is different from the first portion.

11. The method of claim 1, further comprising:

in response to detecting the event and in accordance with a determination that a fifth set of one or more criteria is satisfied, wherein the fifth set of one or more criteria is different from the first set of one or more criteria, configuring one or more angles of the one or more movement components, wherein the first set of one or more criteria includes a criterion that is satisfied in accordance with a determination that the computer system is a first direction relative to the target location when detecting the event, wherein the fifth set of one or more criteria includes a criterion that is satisfied in accordance with a determination that the computer system is a second direction relative to the target location when detecting the event, wherein the second direction is different from the first direction, and wherein, after configuring the one or more angles of the one or more movement components in response to detecting the event and in accordance with the determination that the fifth set of one or more criteria is satisfied:

an angle of the first movement component is configured to be controlled in a manual manner; and an angle of the second movement component is configured to be controlled in an automatic manner.

12. The method of claim 1, further comprising:

after detecting the event and while navigating to the target location, detecting misalignment of the second movement component relative to the target location; and in response to detecting misalignment of the second movement component relative to the target location, providing, via one or more output devices in communication with the computer system, feedback with respect to a current angle of the second movement component.

13. The method of claim 1, further comprising:

while an angle of the first movement component is configured to be controlled in an automatic manner and before reaching the target location, detecting, via one or more input devices in communication with the computer system, a second input; and in response to detecting the second input, configuring an angle of the first movement component to be controlled in a manual manner.

14. The method of claim 1, further comprising:

while an angle of the first movement component is configured to be controlled in an automatic manner and before reaching the target location, detecting, via one or more input devices in communication with the computer system, an object; and in response to detecting the object, configuring an angle of the first movement component to be controlled in an automatic manner using a first path, wherein, before detecting the object, configuring the one or more angles of the one or more movement components in response to detecting the event includes configuring an angle of the first movement component to be controlled in an automatic manner using a second path different from the first path.

15. The method of claim 1, further comprising:

after configuring the one or more angles of the one or more movement components in response to detecting the event and in conjunction with configuring an angle of the first movement component to be controlled in an automatic manner, causing the computer system to accelerate or deaccelerate.

16. A non-transitory computer-readable storage medium storing one or more programs configured to be executed by one or more processors of a computer system that is in communication with a first movement component and a second movement component different from the first movement component, the one or more programs including instructions for:

while detecting a target location in a physical environment, detecting an event with respect to the target location; and in response to detecting the event and in accordance with a determination that a first set of one or more criteria is satisfied, configuring one or more angles of one or more movement components, wherein, after configuring the one or more angles of the one or more movement components in response to detecting the event and in accordance with the determination that the first set of one or more criteria is satisfied:

an angle of the first movement component is configured to be controlled in an automatic manner; and an angle of the second movement component is configured to be controlled in a manual manner different from the automatic manner.

17. A computer system that is in communication with a first movement component and a second movement component different from the first movement component, the computer system comprising:

one or more processors; and memory storing one or more programs configured to be executed by the one or more processors, the one or more programs including instructions for:

while detecting a target location in a physical environment, detecting an event with respect to the target location; and in response to detecting the event and in accordance with a determination that a first set of one or more criteria is satisfied, configuring one or more angles of one or more movement components, wherein, after configuring the one or more angles of the one or more movement components in response to detecting the event and in accordance with the determination that the first set of one or more criteria is satisfied:

an angle of the first movement component is configured to be controlled in an automatic manner; and an angle of the second movement component is configured to be controlled in a manual manner different from the automatic manner.

18. The non-transitory computer-readable storage medium of claim 16, wherein the one or more programs further include instructions for:

after configuring the one or more angles of the one or more movement components, detecting a current angle of the second movement component; and in response to detecting the current angle of the second movement component:

in accordance with a determination that the current angle of the second movement component is a first angle, automatically modifying a current angle of the first movement component to be a second angle; and in accordance with a determination that the current angle of the second movement component is a third angle different from the first angle, automatically modifying the current angle of the first movement component to be a fourth angle different from the second angle.

19. The non-transitory computer-readable storage medium of claim 16, wherein the one or more programs further include instructions for:

after configuring the one or more angles of the one or more movement components, detecting a current location of the computer system; and in response to detecting the current location of the computer system:

in accordance with a determination that the current location of the computer system is a first orientation relative to the target location, automatically modifying a current angle of the first movement component to be a fifth angle; and in accordance with a determination that the current location of the computer system is a second orientation relative to the target location, wherein the second orientation is different from the first orientation, automatically modifying the current angle of the first movement component to be a sixth angle different from the fifth angle.

20. The non-transitory computer-readable storage medium of claim 16, wherein the one or more programs further include instructions for:

after configuring the one or more angles of the one or more movement components, detecting a current location of an object external to the computer system; and in response to detecting the current location of the object external to the computer system:

in accordance with a determination that the current location of the object is a first location, automatically modifying a current angle of the first movement component to be a seventh angle; and in accordance with a determination that the current location of the object is a second location different from the first location, automatically modifying the current angle of the first movement component to be an eighth angle different from the seventh angle.

21. The non-transitory computer-readable storage medium of claim 16, wherein the one or more programs further include instructions for:

before detecting the event with respect to the target location, detecting, via one or more input devices in communication with the computer system, an input corresponding to selection of the target location from one or more available locations, wherein the event occurs while navigating to the target location.

22. The non-transitory computer-readable storage medium of claim 21, wherein the input corresponds to an angle of the second movement component.

23. The non-transitory computer-readable storage medium of claim 16, wherein, after configuring the one or more angles of the one or more movement components:

an angle of a third movement component is configured to be controlled in the automatic manner; and an angle of a fourth movement component is configured to be controlled in the manual manner, wherein the third movement component is different from the first movement component and the second movement component, and wherein the fourth movement component is different from the first movement component, the second movement component, and the third movement component.

24. The non-transitory computer-readable storage medium of claim 16, wherein configuring the one or more angles of the one or more movement components includes, in accordance with a determination that the target location is a first type of target location, configuring the angle of the first movement component to converge to a target angle at the target location.

25. The non-transitory computer-readable storage medium of claim 16, wherein configuring the one or more angles of the one or more movement components includes, in accordance with a determination that the target location is a second type of target location, configuring the angle of the first movement component to converge to:

a first target angle at a first point of navigating to the target location; and a second target angle at a second point of navigating to the target location, wherein the second target angle is different from the first target angle, and wherein the second point is different from the first point.

26. The non-transitory computer-readable storage medium of claim 16, wherein configuring the one or more angles of the one or more movement components includes, in accordance with a determination that the target location is a third type of target location, configuring the angle of the first movement component to be controlled in an automatic manner for a first portion of a maneuver and in a manual manner for a second portion of the maneuver, and wherein the second portion is different from the first portion.

27. The non-transitory computer-readable storage medium of claim 16, wherein the one or more programs further include instructions for:

in response to detecting the event and in accordance with a determination that a fifth set of one or more criteria is satisfied, wherein the fifth set of one or more criteria is different from the first set of one or more criteria, configuring one or more angles of the one or more movement components, wherein the first set of one or more criteria includes a criterion that is satisfied in accordance with a determination that the computer system is a first direction relative to the target location when detecting the event, wherein the fifth set of one or more criteria includes a criterion that is satisfied in accordance with a determination that the computer system is a second direction relative to the target location when detecting the event, wherein the second direction is different from the first direction, and wherein, after configuring the one or more angles of the one or more movement components in response to detecting the event and in accordance with the determination that the fifth set of one or more criteria is satisfied:

an angle of the first movement component is configured to be controlled in a manual manner; and an angle of the second movement component is configured to be controlled in an automatic manner.

28. The non-transitory computer-readable storage medium of claim 16, wherein the one or more programs further include instructions for:

after detecting the event and while navigating to the target location, detecting misalignment of the second movement component relative to the target location; and in response to detecting misalignment of the second movement component relative to the target location, providing, via one or more output devices in communication with the computer system, feedback with respect to a current angle of the second movement component.

29. The non-transitory computer-readable storage medium of claim 16, wherein the one or more programs further include instructions for:

while an angle of the first movement component is configured to be controlled in an automatic manner and before reaching the target location, detecting, via one or more input devices in communication with the computer system, a second input; and in response to detecting the second input, configuring an angle of the first movement component to be controlled in a manual manner.

30. The non-transitory computer-readable storage medium of claim 16, wherein the one or more programs further include instructions for:

while an angle of the first movement component is configured to be controlled in an automatic manner and before reaching the target location, detecting, via one or more input devices in communication with the computer system, an object; and in response to detecting the object, configuring an angle of the first movement component to be controlled in an automatic manner using a first path, wherein, before detecting the object, configuring the one or more angles of the one or more movement components in response to detecting the event includes configuring an angle of the first movement component to be controlled in an automatic manner using a second path different from the first path.

31. The non-transitory computer-readable storage medium of claim 16, wherein the one or more programs further include instructions for:

after configuring the one or more angles of the one or more movement components in response to detecting the event and in conjunction with configuring an angle of the first movement component to be controlled in an automatic manner, causing the computer system to accelerate or deaccelerate.

32. The computer system of claim 17, wherein the one or more programs further include instructions for:

after configuring the one or more angles of the one or more movement components, detecting a current angle of the second movement component; and in response to detecting the current angle of the second movement component:

in accordance with a determination that the current angle of the second movement component is a first angle, automatically modifying a current angle of the first movement component to be a second angle; and in accordance with a determination that the current angle of the second movement component is a third angle different from the first angle, automatically modifying the current angle of the first movement component to be a fourth angle different from the second angle.

33. The computer system of claim 17, wherein the one or more programs further include instructions for:

after configuring the one or more angles of the one or more movement components, detecting a current location of the computer system; and in response to detecting the current location of the computer system:

in accordance with a determination that the current location of the computer system is a first orientation relative to the target location, automatically modifying a current angle of the first movement component to be a fifth angle; and in accordance with a determination that the current location of the computer system is a second orientation relative to the target location, wherein the second orientation is different from the first orientation, automatically modifying the current angle of the first movement component to be a sixth angle different from the fifth angle.

34. The computer system of claim 17, wherein the one or more programs further include instructions for:

after configuring the one or more angles of the one or more movement components, detecting a current location of an object external to the computer system; and in response to detecting the current location of the object external to the computer system:

in accordance with a determination that the current location of the object is a first location, automatically modifying a current angle of the first movement component to be a seventh angle; and in accordance with a determination that the current location of the object is a second location different from the first location, automatically modifying the current angle of the first movement component to be an eighth angle different from the seventh angle.

35. The computer system of claim 17, wherein the one or more programs further include instructions for:

before detecting the event with respect to the target location, detecting, via one or more input devices in communication with the computer system, an input corresponding to selection of the target location from one or more available locations, wherein the event occurs while navigating to the target location.

36. The computer system of claim 35, wherein the input corresponds to an angle of the second movement component.

37. The computer system of claim 17, wherein, after configuring the one or more angles of the one or more movement components:

an angle of a third movement component is configured to be controlled in the automatic manner; and an angle of a fourth movement component is configured to be controlled in the manual manner, wherein the third movement component is different from the first movement component and the second movement component, and wherein the fourth movement component is different from the first movement component, the second movement component, and the third movement component.

38. The computer system of claim 17, wherein configuring the one or more angles of the one or more movement components includes, in accordance with a determination that the target location is a first type of target location, configuring the angle of the first movement component to converge to a target angle at the target location.

39. The computer system of claim 17, wherein configuring the one or more angles of the one or more movement components includes, in accordance with a determination that the target location is a second type of target location, configuring the angle of the first movement component to converge to:

a first target angle at a first point of navigating to the target location; and a second target angle at a second point of navigating to the target location, wherein the second target angle is different from the first target angle, and wherein the second point is different from the first point.

40. The computer system of claim 17, wherein configuring the one or more angles of the one or more movement components includes, in accordance with a determination that the target location is a third type of target location, configuring the angle of the first movement component to be controlled in an automatic manner for a first portion of a maneuver and in a manual manner for a second portion of the maneuver, and wherein the second portion is different from the first portion.

41. The computer system of claim 17, wherein the one or more programs further include instructions for:

in response to detecting the event and in accordance with a determination that a fifth set of one or more criteria is satisfied, wherein the fifth set of one or more criteria is different from the first set of one or more criteria, configuring one or more angles of the one or more movement components, wherein the first set of one or more criteria includes a criterion that is satisfied in accordance with a determination that the computer system is a first direction relative to the target location when detecting the event, wherein the fifth set of one or more criteria includes a criterion that is satisfied in accordance with a determination that the computer system is a second direction relative to the target location when detecting the event, wherein the second direction is different from the first direction, and wherein, after configuring the one or more angles of the one or more movement components in response to detecting the event and in accordance with the determination that the fifth set of one or more criteria is satisfied:

an angle of the first movement component is configured to be controlled in a manual manner; and an angle of the second movement component is configured to be controlled in an automatic manner.

42. The computer system of claim 17, wherein the one or more programs further include instructions for:

after detecting the event and while navigating to the target location, detecting misalignment of the second movement component relative to the target location; and in response to detecting misalignment of the second movement component relative to the target location, providing, via one or more output devices in communication with the computer system, feedback with respect to a current angle of the second movement component.

43. The computer system of claim 17, wherein the one or more programs further include instructions for:

while an angle of the first movement component is configured to be controlled in an automatic manner and before reaching the target location, detecting, via one or more input devices in communication with the computer system, a second input; and in response to detecting the second input, configuring an angle of the first movement component to be controlled in a manual manner.

44. The computer system of claim 17, wherein the one or more programs further include instructions for:

while an angle of the first movement component is configured to be controlled in an automatic manner and before reaching the target location, detecting, via one or more input devices in communication with the computer system, an object; and in response to detecting the object, configuring an angle of the first movement component to be controlled in an automatic manner using a first path, wherein, before detecting the object, configuring the one or more angles of the one or more movement components in response to detecting the event includes configuring an angle of the first movement component to be controlled in an automatic manner using a second path different from the first path.

45. The computer system of claim 17, wherein the one or more programs further include instructions for:

after configuring the one or more angles of the one or more movement components in response to detecting the event and in conjunction with configuring an angle of the first movement component to be controlled in an automatic manner, causing the computer system to accelerate or deaccelerate.

* * * * *